April 22, 1952 — R. H. ROBINSON — 2,593,714
METHOD OF MAKING CELLULAR STRUCTURES
Filed June 30, 1943 — 12 Sheets-Sheet 1
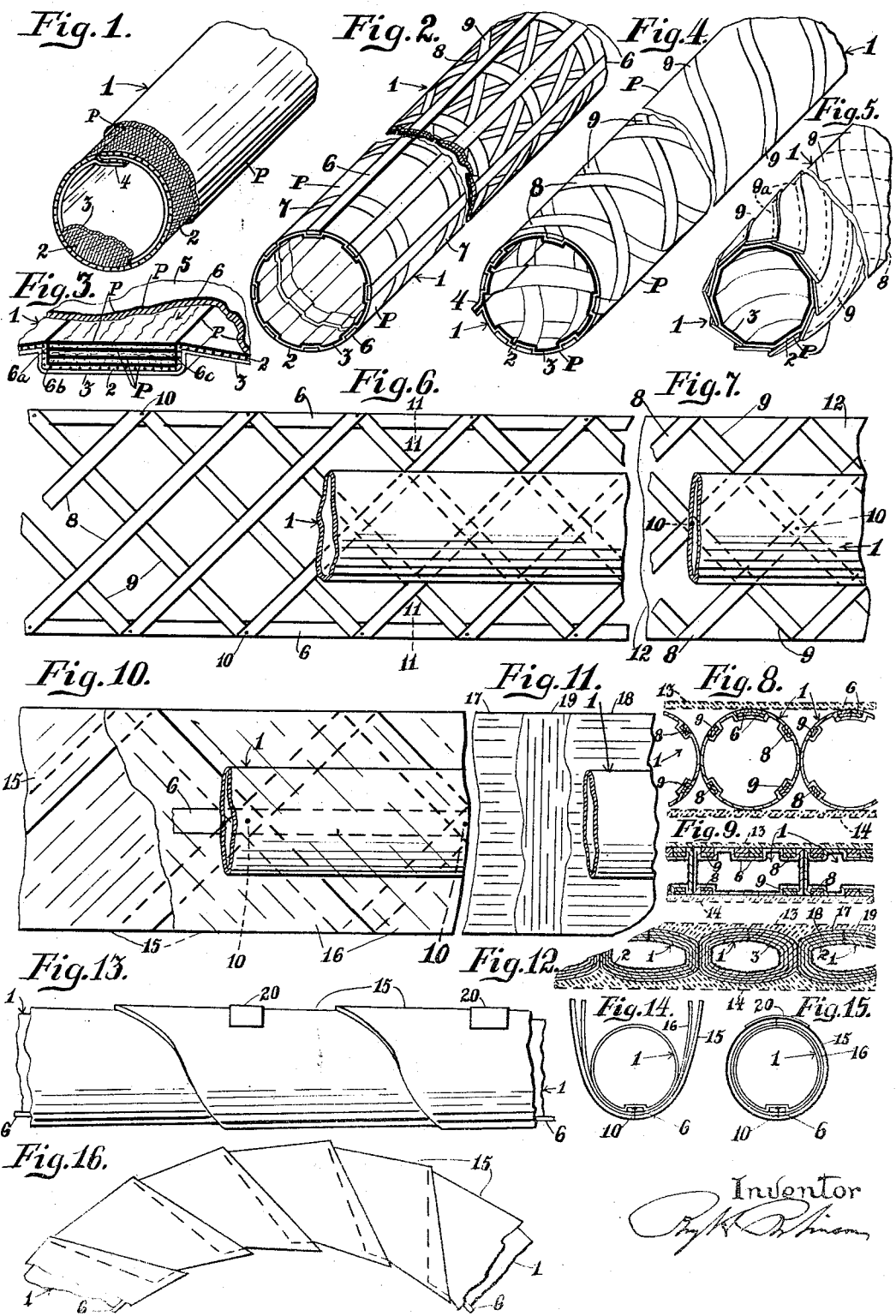

April 22, 1952  R. H. ROBINSON  2,593,714
METHOD OF MAKING CELLULAR STRUCTURES
Filed June 30, 1943  12 Sheets-Sheet 2
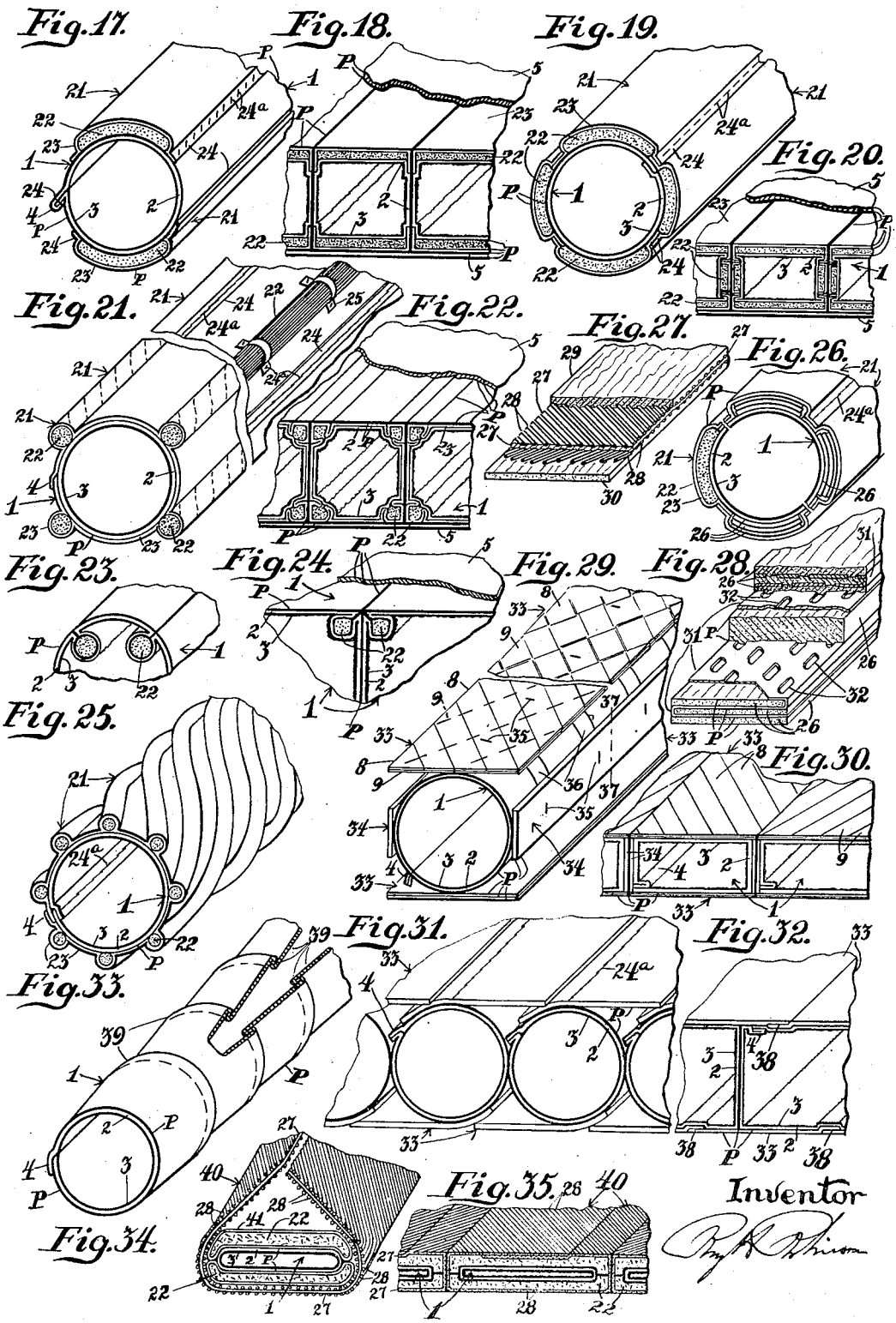
Inventor
R. H. Robinson

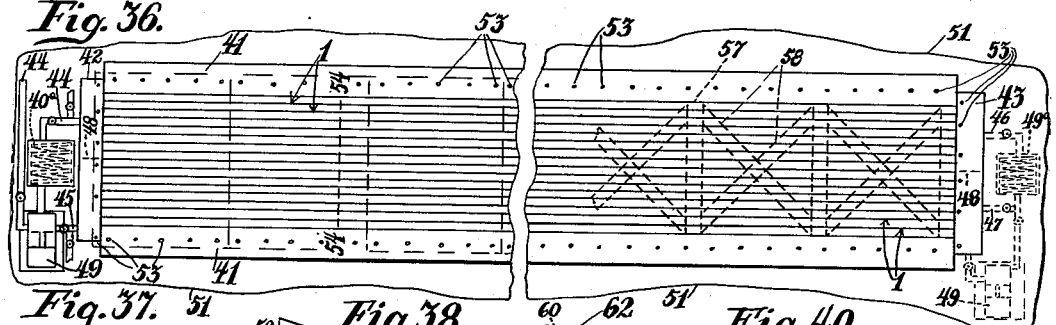

April 22, 1952  R. H. ROBINSON  2,593,714
METHOD OF MAKING CELLULAR STRUCTURES
Filed June 30, 1943  12 Sheets-Sheet 4
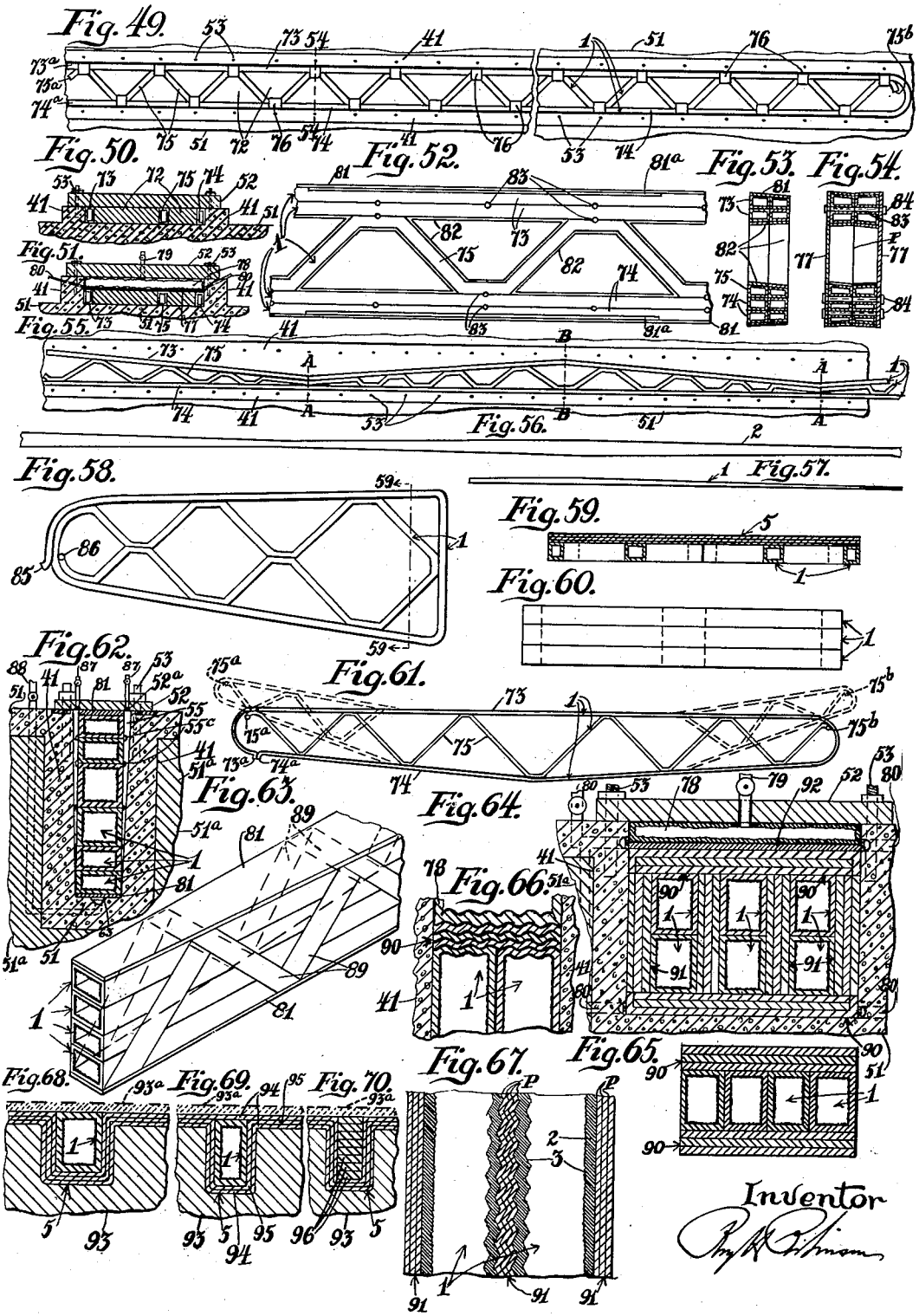

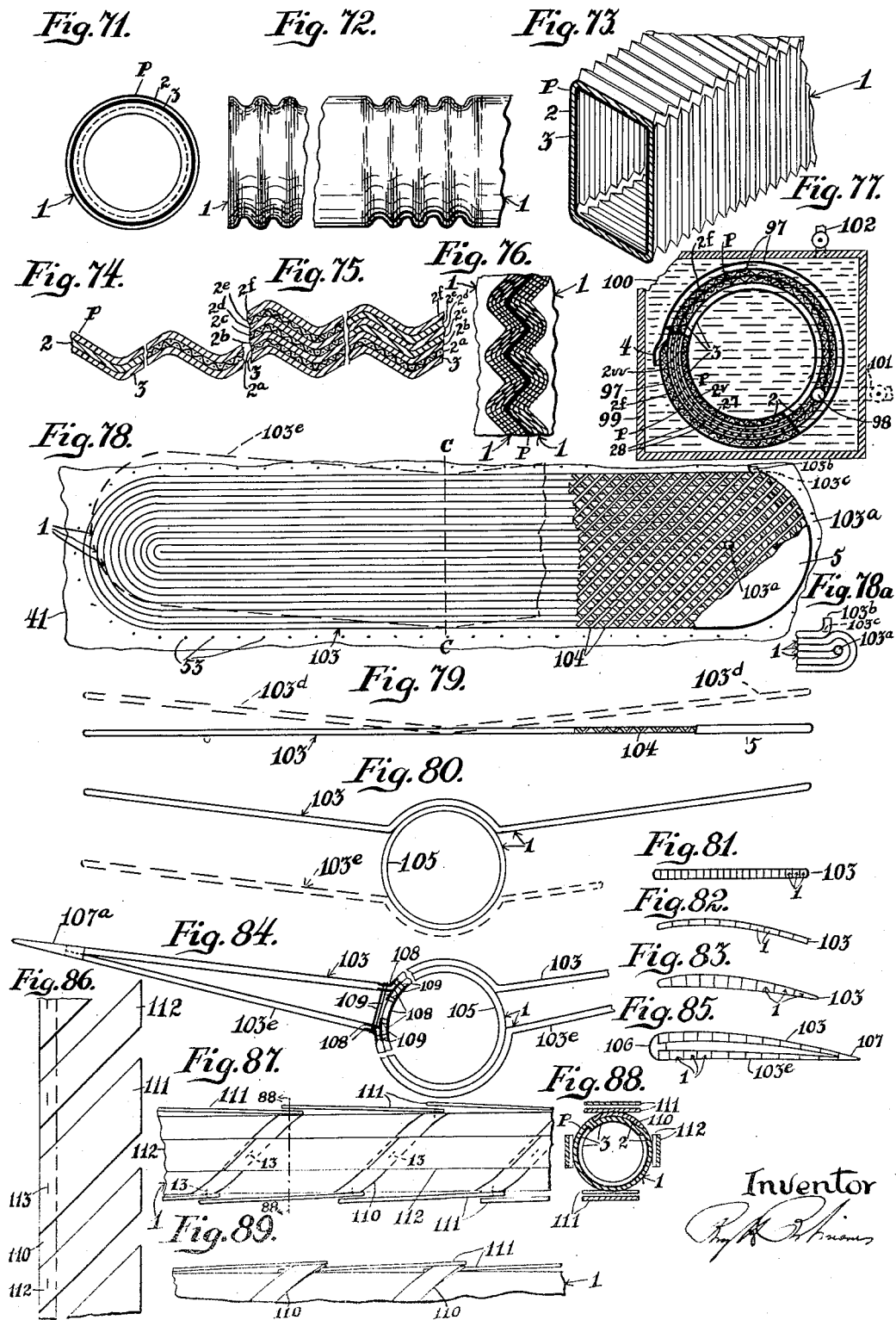

April 22, 1952 R. H. ROBINSON 2,593,714
METHOD OF MAKING CELLULAR STRUCTURES
Filed June 30, 1943 12 Sheets-Sheet 6
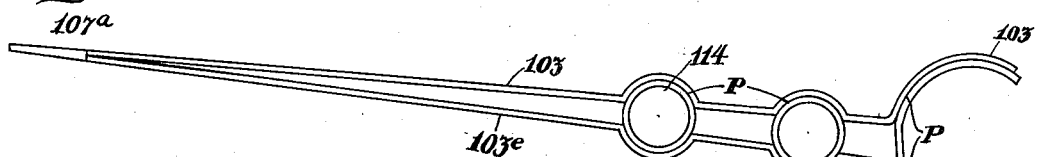
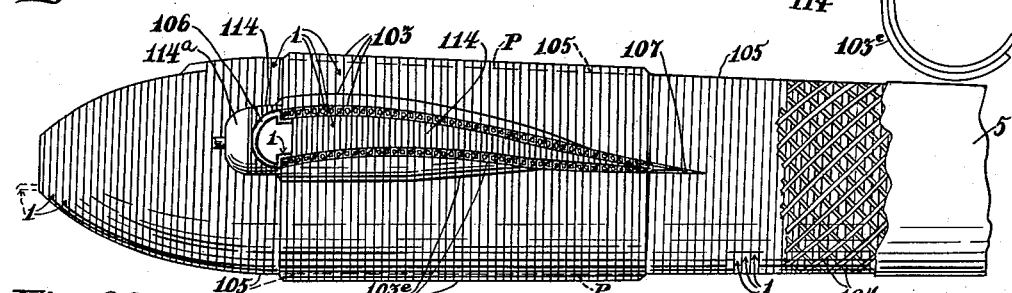
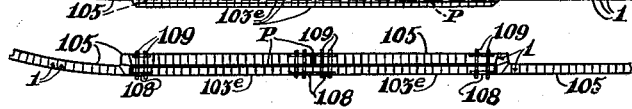
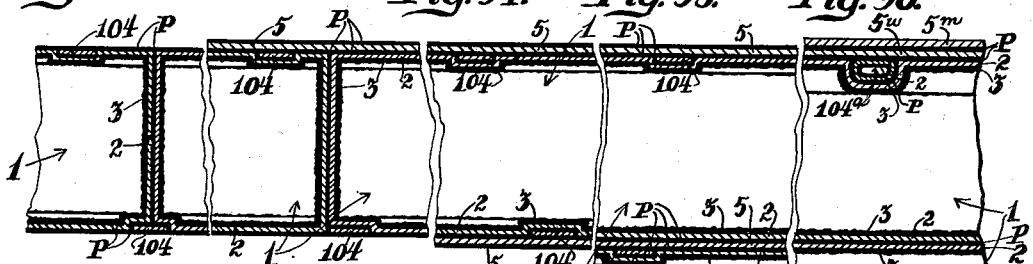

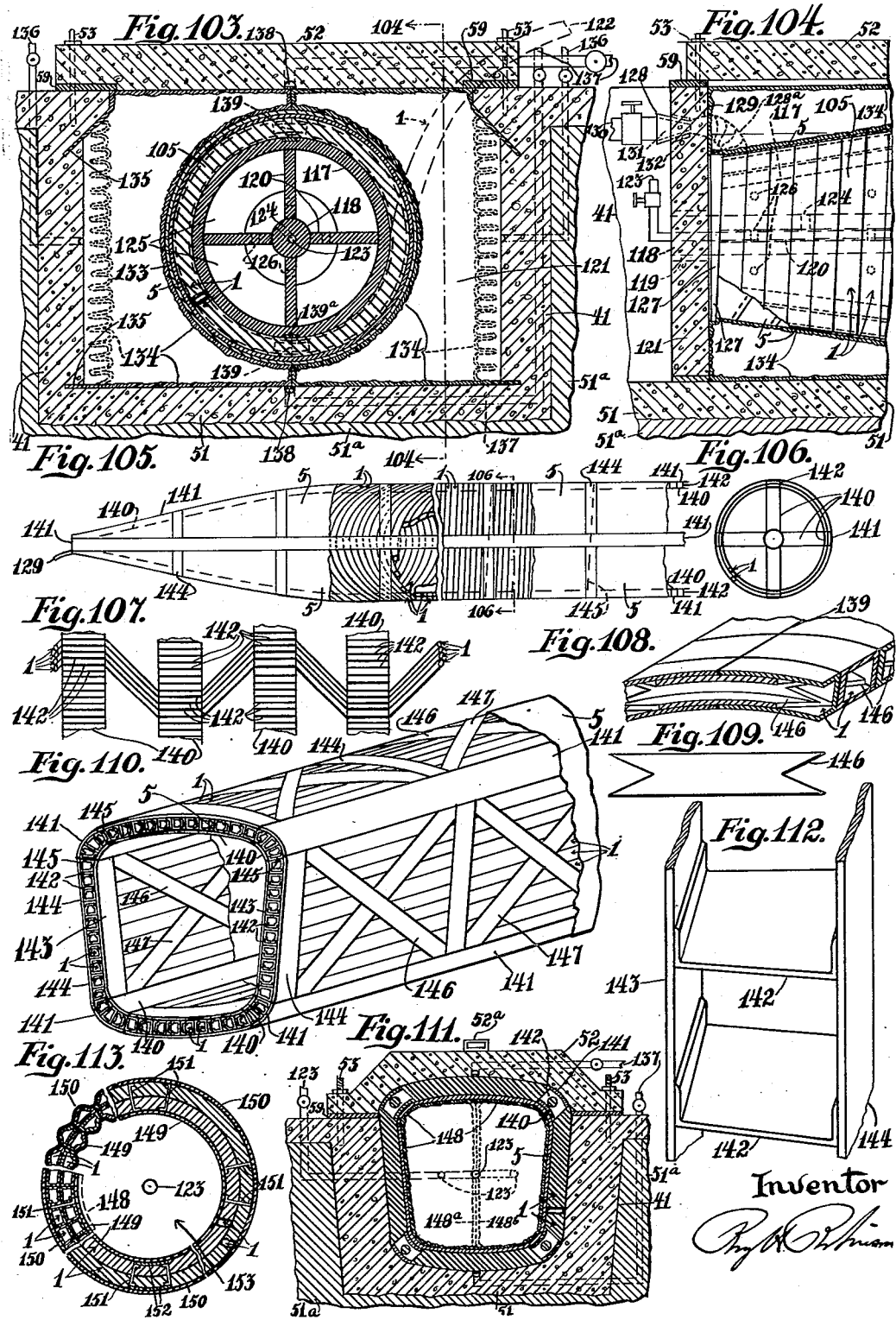

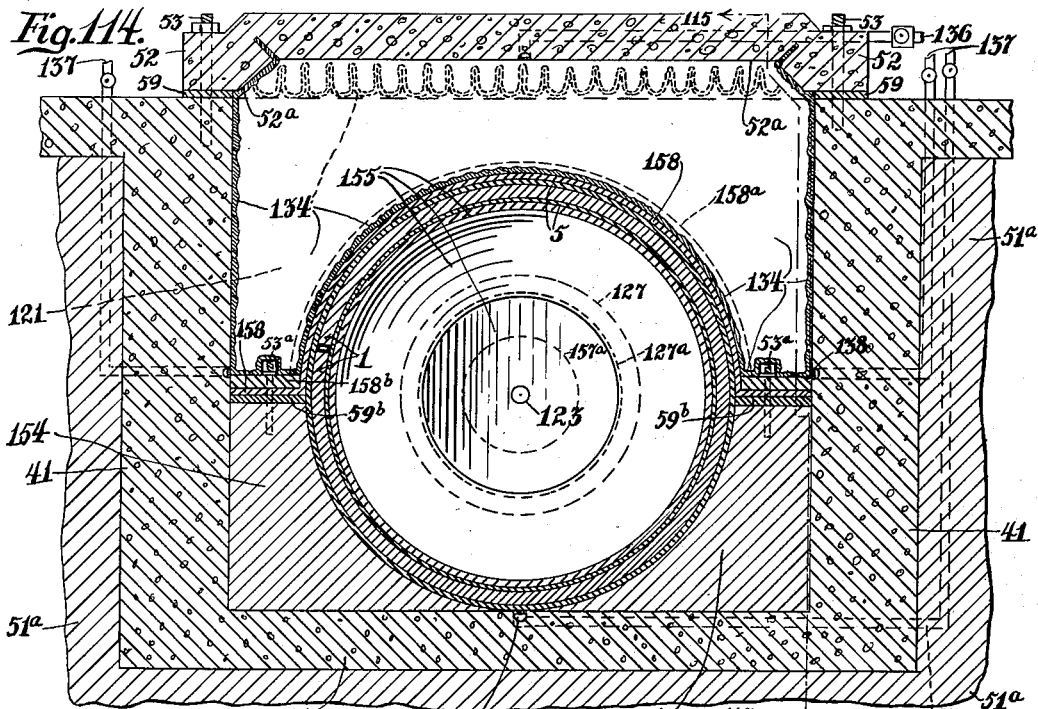
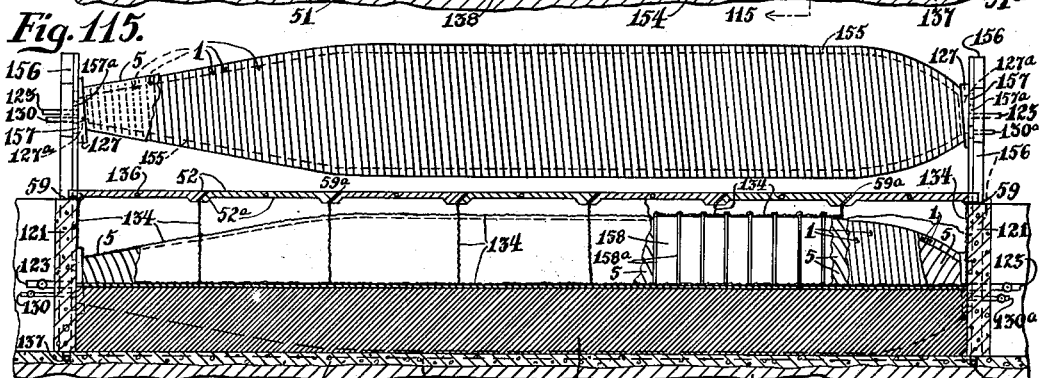
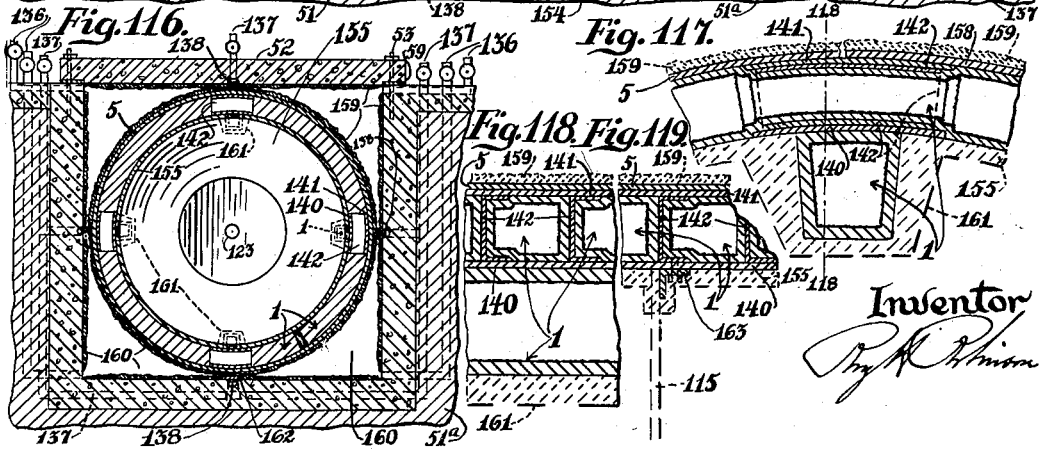

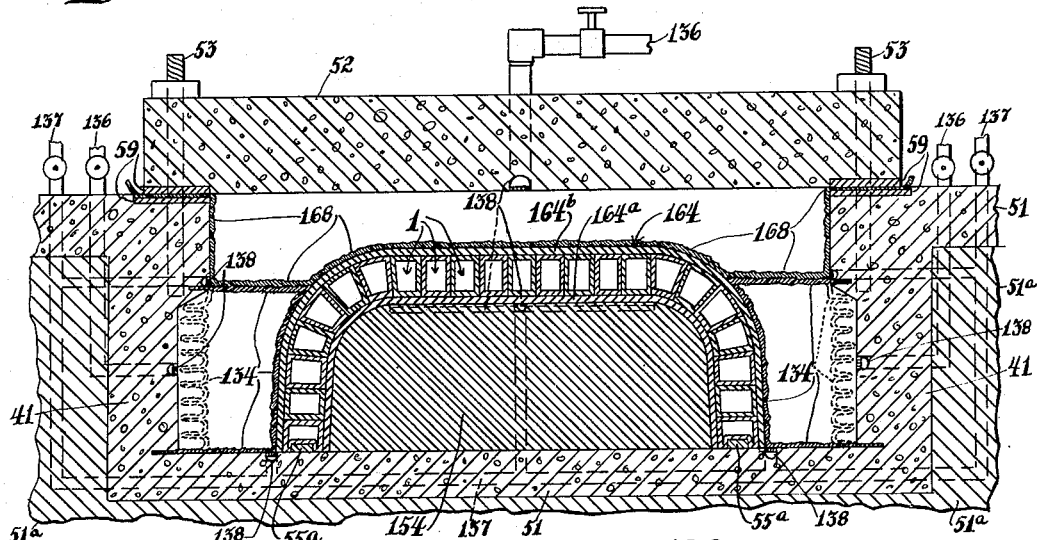
Fig.120.
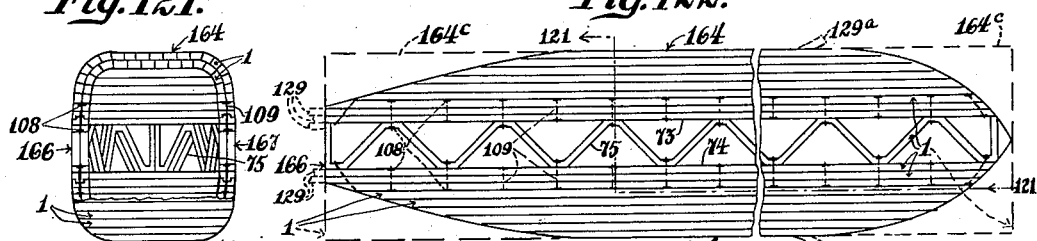
Fig.121. Fig.122.
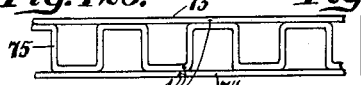
Fig.123. Fig.124.
Fig.126.
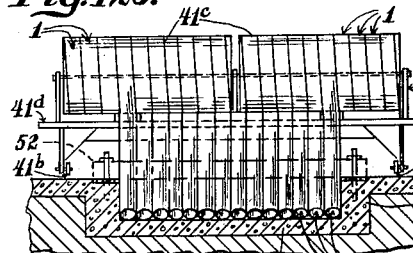
Fig.125.
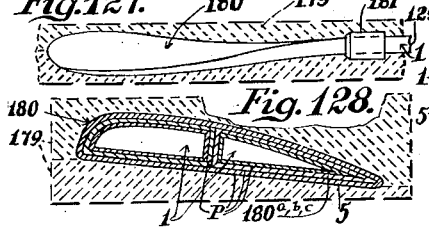
Fig.127. Fig.129.
Fig.128.
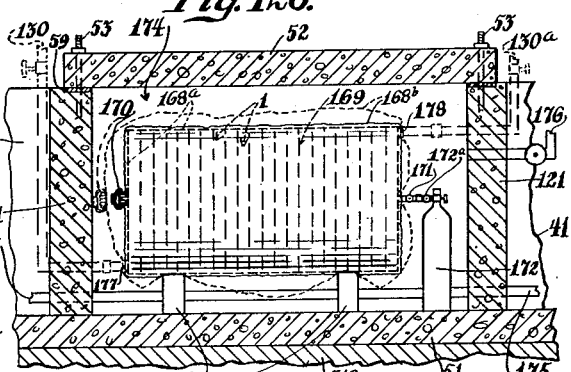
Inventor
R. H. Robinson

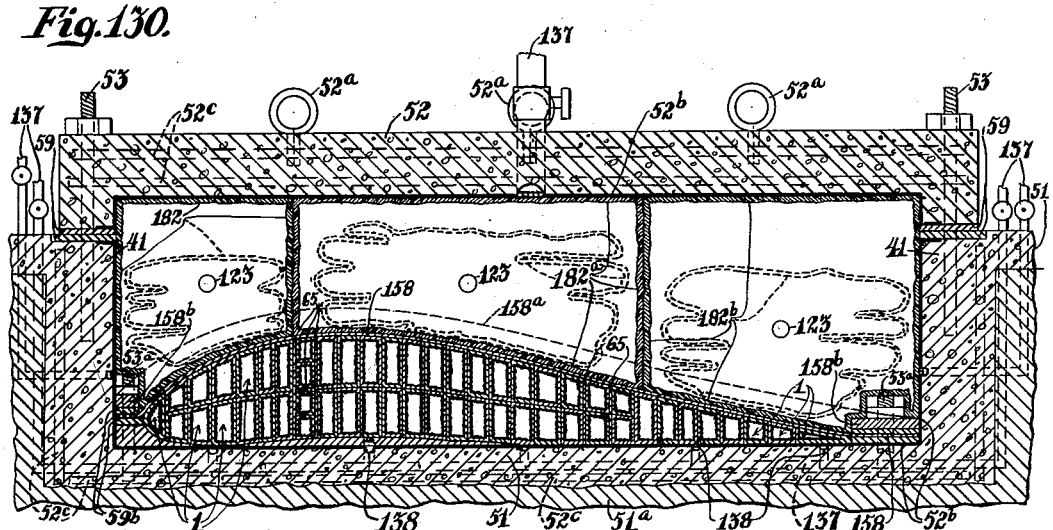
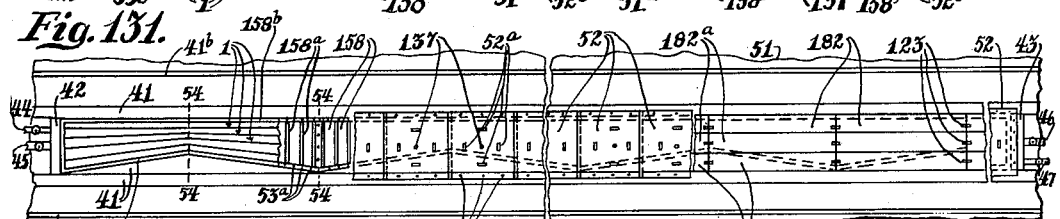
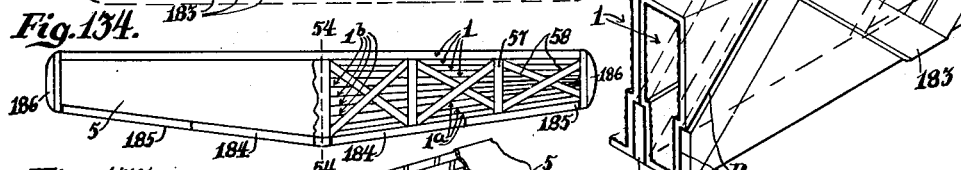
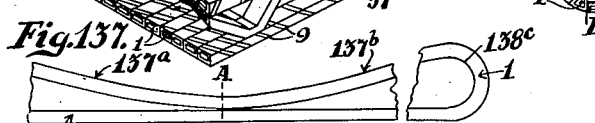

April 22, 1952 R. H. ROBINSON 2,593,714
METHOD OF MAKING CELLULAR STRUCTURES
Filed June 30, 1943 12 Sheets-Sheet 11
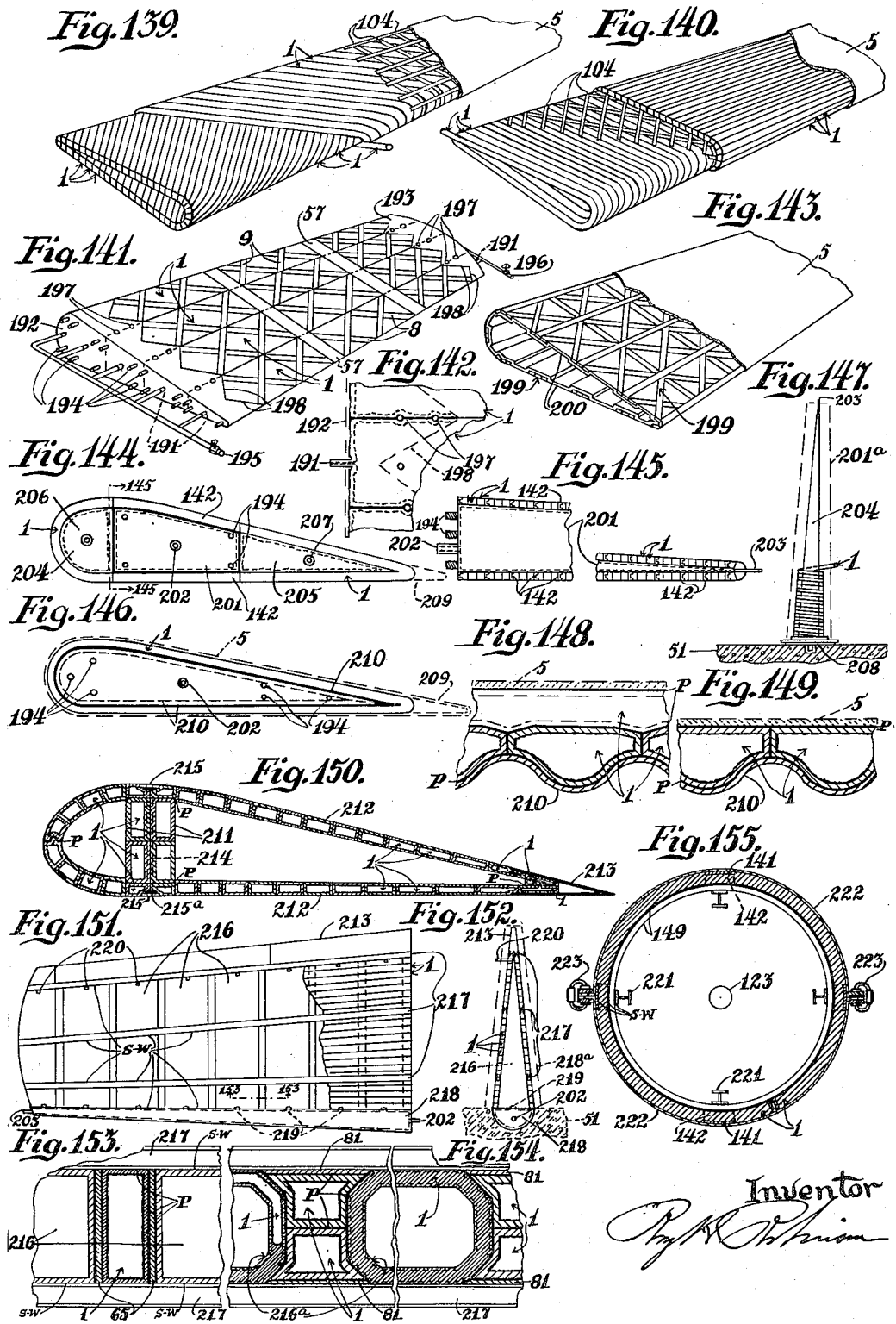

April 22, 1952 R. H. ROBINSON 2,593,714
METHOD OF MAKING CELLULAR STRUCTURES
Filed June 30, 1943 12 Sheets-Sheet 12
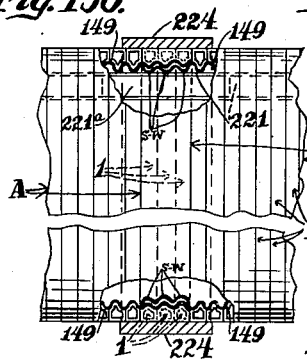
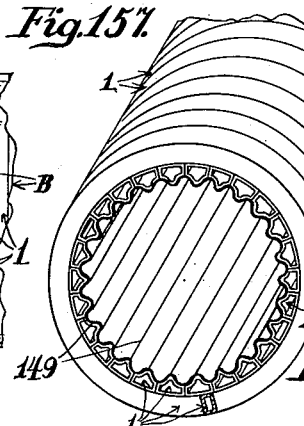
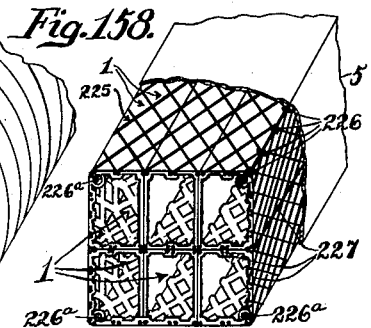
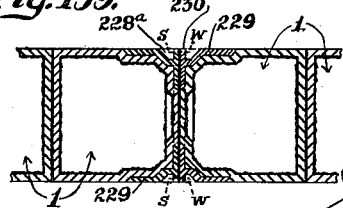
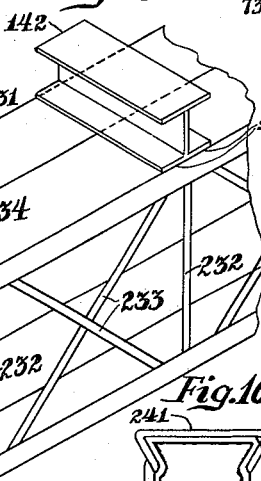
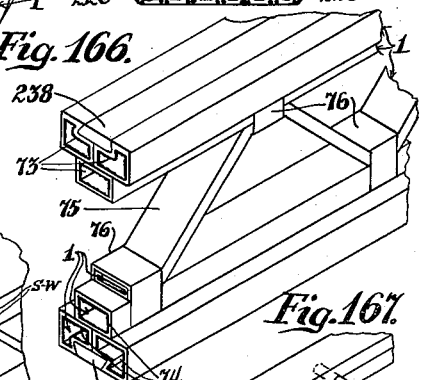
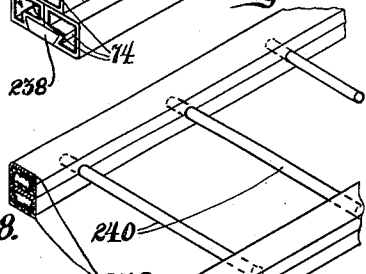
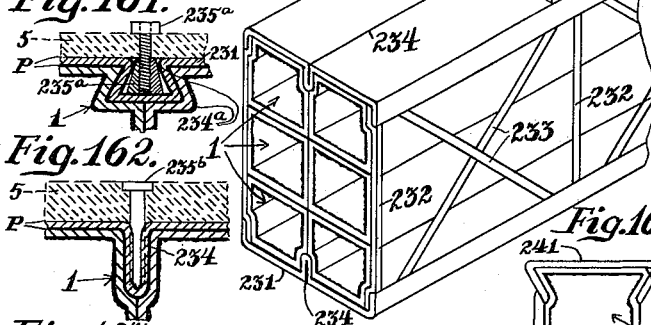
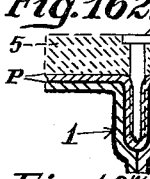
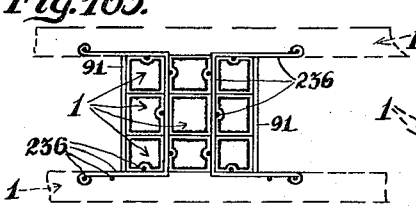
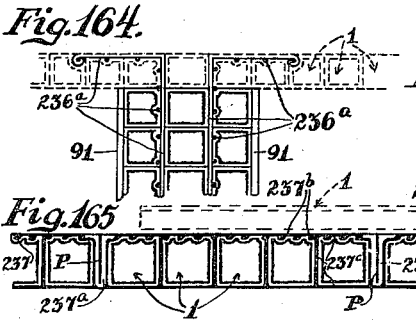
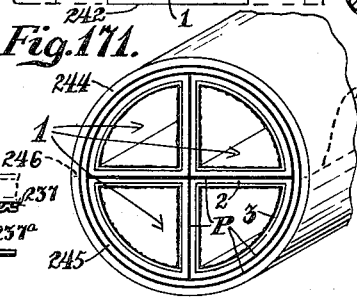
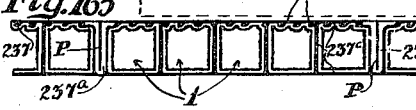
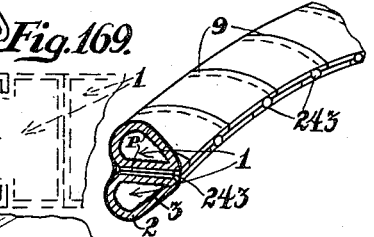
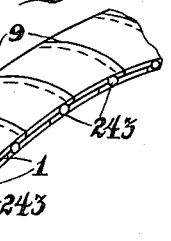
Inventor Patented Apr. 22, 1952

2,593,714

UNITED STATES PATENT OFFICE 2,593,714

METHOD OF MAKING CELLULAR STRUCTURES

Roy H. Robinson, Chicago, Ill.

Application June 30, 1943, Serial No. 492,914

10 Claims. (Cl. 154—83)

1

This invention is directed to the development for aircraft, boats, cars and general structural purposes, of light cellular structural shells, framing and other elements formed or molded under pressure at predetermined temperatures with plastic materials and particularly those combining plastic, as a bonding agent, with wood veneers, fabrics, fibrous or metallic elements, or combinations of same, and consists of certain novel improvements and variations in the construction disclosed in my co-pending application Ser. No. 455,350, filed August 19, 1942, now abandoned, of which the instant application is a continuation-in-part, as well as embodying other additional features which improve the structures as well as greatly facilitate the speed and economy of manufacture.

A further important object of the invention is to make possible the forming of these cellular structures with thin interior walls and in all manner of curved or irregular shapes and sizes not heretofore feasible with the use of interior shaping mandrels which this invention novelly eliminates; to furthermore and at the same time secure the same forming pressure on the interior walls of the structure in any and all positions, the same as on the exterior surfaces; and by new and novel methods for forming and pressure treatment as well as novel structural designs make possible and practicable, economical and expeditious mass production on a large scale not heretofore attained in plastic and pressure forming.

A further object is to introduce new and greatly improved methods for easily providing molds and pressure chambers on an unlimited scale and in certain instances even to eliminate in whole or part either the heretofore required molds or the pressure tank or both and to provide novel and more simple means for applying the curing fluid pressure and temperature required in plastic molding and bonding and, particularly, quickly and without injury to the interior of structures of substantial depth, a matter which has heretofore presented a difficult problem.

A still further object is to make possible the forming of large plastic or plastic bonded bodies and structures in multiple in one operation and, among still other important purposes, to bring about important savings in the use of critical war materials and minimize the employment of metal both in the structures themselves and likewise in the molds and pressure tanks for plastically forming or bonding same.

The many other objects and advantages of my invention will be better understood by reference to the following specification when considered in connection with the accompanying drawings illustrating certain embodiments thereof in which:

Fig. 1 is a fragmentary perspective view of a simple form of tube for use in forming cellular structures, etc.

Fig. 2 is a fragmentary perspective view of the tube including additional reinforcements.

Fig. 3 is a fragmentary perspective view of a portion of the tube and reinforcing as in Fig. 2.

Fig. 4 is a fragmentary perspective view of the tube with modified reinforcing arrangement.

Fig. 5 is a fragmentary perspective view of the tube with further modified reinforcing arrangement.

Fig. 6 is a fragmentary plan of one form of jacket reinforcing for the tube.

Fig. 7 is a fragmentary plan of a modified form of jacket reinforcing.

Fig. 8 is a fragmentary cross section showing a group of tubes with reinforcing jacket in assembly position in form before compression.

Fig. 9 is a fragmentary cross section showing the tubes of Fig. 8 after compression in the form.

Fig. 10 is a fragmentary plan of a modified form of jacket reinforcing.

Fig. 11 is a fragmentary plan of a modified form of jacket reinforcing.

Fig. 12 is a fragmentary cross section showing a group of tubes with reinforcing jacket similar to that of Fig. 11 compressed in a form to form a corrugated shell structure.

Fig. 13 is a fragmentary side elevation of a tube encased in the jacket of Fig. 10.

Fig. 14 is an end view of a tube such as in Fig. 13 with the jacket before same is closed.

Fig. 15 is an end view of the tube of Fig. 14 after the jacket wrapping is closed about same.

Fig. 16 is a fragmentary side elevation in diagrammatic form showing how an articulated jacket of the type of Figs. 10 and 13 permits the adaption of the tube to a curved surface with greater facility, etc.

Fig. 17 is a fragmentary perspective view of a modified tube and reinforcement.

Fig. 18 is a fragmentary perspective view of a group of tubes of the type of Fig. 17 after compression in the form after assemblage and with an all-over shell sheathing included.

Fig. 19 is a fragmentary perspective view of a modified tube and reinforcement.

Fig. 20 is a fragmentary perspective view of a group of tubes of the type of Fig. 19 after compression and with sheathing.

Fig. 21 is a fragmentary perspective view of a modified form of tube and reinforcement.

Fig. 22 is a fragmentary perspective view of a group of tubes of the type of Fig. 21 after compression and with sheathing.

Fig. 23 is a fragmentary perspective view of a modified tube and reinforcing.

Fig. 24 is a fragmentary perspective view of a group of tubes of the type of Fig. 23 after compression and with sheathing.

Fig. 25 is a fragmentary perspective view of a modified tube with reinforcing.

Fig. 26 is a fragmentary perspective view of a modified tube and reinforcing.

Fig. 27 is a fragmentary perspective view of plastic bonded and reinforced veneer ply employed in the tube reinforcing, sheathing, etc.

Fig. 28 is a fragmentary perspective view of a modified form of plastic bonded and reinforced veneer ply likewise employed.

Fig. 29 is a fragmentary perspective view of a modified form of tube reinforcing.

Fig. 30 is a fragmentary perspective view of a group of tubes of the type of Fig. 29 after compression.

Fig. 31 is a fragmentary perspective view of a group of tubes and reinforcing in modified form in assembled position before compression, etc.

Fig. 32 is a fragmentary perspective view of the assembled tubes of Fig. 31 after compression, etc.

Fig. 33 is a fragmentary perspective view of a modified form of tube (with broken away wall.)

Fig. 34 is a fragmentary perspective view of a tube and reinforcements laid in a containing and reinforcing envelope.

Fig. 35 is a fragmentary perspective view of a group of tube and envelope assemblages similar to Fig. 34 after compression in assembled position.

Fig. 36 is a fragmentary plan of tubes, etc., in assembled position in the form.

Fig. 37 is a fragmentary cross section of the tubes in the form before compression.

Fig. 38 is a fragmentary cross section similar to Fig. 37 showing same after the tubes are compressed in the form with the closure lids in place.

Fig. 39 is a fragmentary cross section of tubes compressed in a modified form, etc.

Fig. 40 is a fragmentary perspective view of a modified type of form, filled with tubes and compressed under a cellular membrane closure covering.

Fig. 41 is a fragmentary cross section of diagrammatic form showing a cellular shell formed by interior fluid pressure in the assembled tubes and shaped for tongue and grooved joining.

Fig. 42 is a similar fragmentary cross section of the cellular shell and including integrated exterior sheathings and additional web members inserted between the tubes and their reinforcements of whatever type employed.

Fig. 43 is a fragmentary side elevation of one type of web reinforcement indicated in Fig. 41.

Fig. 44 is a fragmentary cross section showing the tubes compressed in the form to provide a corrugated cellular shell.

Fig. 45 is a similar fragmentary cross section showing the tubes compressed in the form to provide another corrugated shell but with the corrugating or curves extending crosswise of the tubes instead of longitudinally as in Fig. 44.

Fig. 46 is a fragmentary cross sectional plan taken on line 46—46 of Fig. 47 and showing details of the manifold connections with the plastic tubes assembled in the pressure form as in Fig. 36.

Fig. 47 is a fragmentary side elevation of the manifold injection or outlet connections, etc., of Fig. 36.

Fig. 48 is a fragmentary perspective view of a reinforced plastically formed cellular shell formed as in Fig. 36, etc.

Fig. 49 is a fragmentary plan of tubes, etc., in assembled position in the form producing cellular truss frames, etc., after the manner of Fig. 36, etc.

Fig. 50 is a fragmentary cross section of the form of Fig. 49 with the closure lids in place and the tubes, etc., in compression.

Fig. 51 is a fragmentary cross section of the form of Fig. 49 of a modified type distinct from that of Fig. 50 in having a sheathing extending across the upper side of the truss and a compression bag (or bags) included in the form for completing the plastic pressure treatment of same.

Fig. 52 is a fragmentary side elevation of a modified form of cellular truss plastically formed and integrated after the manner of Figs. 49 and 50.

Fig. 53 is an end view of a truss of the type of Fig. 52 formed with a plurality of tube tiers laid in the form.

Fig. 54 is a cross section of a truss formed by connecting and joining together two veneer or ply sheathed trusses individually formed as in Fig. 51 and of the design of Fig. 52.

Fig. 55 is a fragmentary plan showing a modified form of the cellular truss framing for spars, ribs, etc., the tubes, etc., being placed in the forms similarly to Figs. 49, etc.

Fig. 56 is a fragmentary plan of the tube wall (in the flat before jointing) where it is desired to use a tube of changing or varying diameter in a structure such as that of Fig. 55 instead of the tubes of constant diameter there indicated.

Fig. 57 is a fragmentary side elevation of the tube formed on the plan lay-out of Fig. 56 and joint seamed so providing tapering cord members, etc., for the truss of Fig. 55 or other structures.

Fig. 58 is a plan of plastic tube framing for a wing, formed after the manner of Figs. 49, etc., and with the use of a single continuous tube.

Fig. 59 is a fragmentary cross section of a frame of the type of Fig. 58 on line 59—59, with the addition of sheathing across the upper face after the manner of Fig. 51.

Fig. 60 is an end view showing a frame of the type of Fig. 58 in three tier construction.

Fig. 61 is a plan of plastic tube framing for a double wing, or other structural framing.

Fig. 62 is a fragmentary cross section of a plastic tube formed girder, spar or shell structure and trench form for forming same.

Fig. 63 is a fragmentary perspective showing a cellular spar or other frame of tapering depth formed with constant diameter tubes and having truss reinforcements, etc.

Fig. 64 is a fragmentary cross section of a sheathed and web reinforced cellular frame or shell and the form for compressing same.

Fig. 65 is a cross section of a modified form of frame or shell of the type of Fig. 64.

Fig. 66 is a fragmentary cross section of modified cellular shell or frame similar to that of Fig. 65.

Fig. 67 is a fragmentary longitudinal cross section showing a modified web reinforcing in a cellular frame or shell similar to that of Fig. 64.

Fig. 68 is a fragmentary cross section of a laminated shell plastically formed with a tubular beam member.

Fig. 69 is a fragmentary cross section of a modified form of shell and beam member similar to that of Fig. 68.

Fig. 70 is a fragmentary cross section of another modified form of shell and beam member similar to Fig. 68.

Fig. 71 is an end view of a modified form of tube for forming cellular shells, etc.

Fig. 72 is a fragmentary side elevation of tubes of the type of Fig. 71.

Fig. 73 is a fragmentary cross sectional perspective view of a modified form of tube.

Fig. 74 is a diagrammatic fragmentary cross section of the laminated construction of a tube wall of the type of Figs. 71 and 72.

Fig. 75 is a diagrammatic fragmentary cross section of modified tube wall constructions similar to Fig. 74.

Fig. 76 is a diagrammatic fragmentary longitudinal cross section showing the plastic joining of the walls of assembled adjacent tubes of the type of Figs. 71 and 74 in the forming of a cellular shell or frame.

Fig. 77 is a fragmentary cross sectional view of a modified form of tube or tubular structure and container for pressure forming same.

Fig. 78 is a plan showing the tubular formation of a mat coiled type suitable for airplane wings and other cellular shells.

Fig. 78a is a fragmentary plan showing alternate offset coil terminal.

Fig. 79 is a front elevation of the shell shown in Fig. 78.

Fig. 80 is a front elevation of a modified form of shell formed similarly to that of Figs. 78 and 79 and indicating possible application to a fuselage.

Fig. 81 is a diagrammatic transverse cross section of a wing or other shell similar to that of Fig. 78, etc.

Fig. 82 is a diagrammatic transverse cross section of a modified form of curved wing or other shell formed after the manner of Fig. 78, etc.

Fig. 83 is a diagrammatic transverse cross section of a modified form of wing formed after the manner of Fig. 82 but with varying thickness of cellular shell to provide a predetermined aerodynamic shape.

Fig. 84 is a fragmentary front elevation of cellular wing shells similar to that of Fig. 80 and joined with a fuselage.

Fig. 85 is a diagrammatic transverse cross section of a wing formed after the manner of Figs. 84 and 83, with the additional leading edge and trailing edge closing members added thereto.

Fig. 86 is a fragmentary plan of a veneer band assemblage for providing a reinforcing wrapping of tubes for forming the cellular structures.

Fig. 87 is a fragmentary side elevation of a tube with the jacket wrapping of Fig. 86.

Fig. 88 is a cross section of the wrapped tube of Fig. 87.

Fig. 89 is a fragmentary longitudinal side elevation showing a modified way of applying the wrapping band of Fig. 86 on the tube.

Fig. 90 is a diagrammatic fragmentary front elevation of a wing shell formed similarly to that of Fig. 84 but embracing wing nacelle shells as well as fuselage.

Fig. 91 is a fragmentary side elevation of a coil formed fuselage with wings and nacelles similar to Fig. 90.

Fig. 92 is a fragmentary longitudinal cross section showing the fuselage and wing shell joinings in a fuselage of the type of Fig. 91 but made in two joined sections.

Fig. 93 is a fragmentary cross section of the tubular wall shell of the type of Fig. 91 in relation to the lattice shell wrappings with and without sheathing.

Fig. 94 is a fragmentary cross section of the shell similar to Fig. 93 but including an exterior and also an interior sheathing over the lattice.

Fig. 95 is a fragmentary cross section of the shell similar to Fig. 94 but in two tier construction and with an intermediate lattice and sheathing wrapping between tiers as well as on the two outer surfaces.

Fig. 96 is a fragmentary cross section of the shell similar to Fig. 95 but without intermediate lattice and sheathing wrappings between the two tube tiers and having a tubular lattice covering.

Fig. 97 is a fragmentary cross section of a tube formed shell formed in combination with a tube formed beam member, with the shell tubes extending transversely of the beam tube.

Fig. 98 is a fragmentary cross section of a tube formed shell, etc., similar to Fig. 97 but with the shell tube extending parallel with the tube beam.

Fig. 99 is a fragmentary longitudinal cross section of a tube formed shell with graduated or stepped up sheathing reinforcing.

Fig. 99a is a fragmentary cross section of Fig. 99 on line 99a—99a.

Fig. 100 is a fragmentary cross section of a two tier shell similar to that of Fig. 96 but with staggered tube cross joints and meshed wire in lieu of the latticed strip or tube wrappings and without exterior sheathing.

Fig. 101 is a fragmentary cross section of a shell similar to Fig. 100 but with tube joints aligned instead of staggered and with wire ties between the tubes and anchoring the outer wire mesh wrappings together on predetermined spacings and including exterior sheathings over the wire mesh wrappings.

Fig. 102 is a fragmentary cross section of a two tier shell with veneer sheathing in combination with an outer wall of metal and showing reinforcing webs between tubes and exterior means of connections.

Fig. 103 is a cross section of a coil formed fuselage and pressure chamber for same.

Fig. 104 is a fragmentary side elevation of the fuselage and longitudinal cross section of the pressure chamber of Fig. 103.

Fig. 105 is a fragmentary side elevation of a fuselage showing certain types of tube coiling and forming.

Fig. 106 is a cross section of the fuselage of Fig. 105 on line 106—106.

Fig. 107 is a diagrammatic plan of one the novel tube windings of Fig. 105.

Fig. 108 is a fragmentary perspective of the dowelled shell joining of the two sections as severed in Figure 103.

Fig. 109 is a diagrammatic side elevation of the tubular dowel connections used in Fig. 108.

Fig. 110 is a fragmentary perspective of a tubular body with shell of longitudinally disposed tubing and with body framing, etc.

Fig. 111 is a cross section of a tubular body of the type of Fig. 110 but with transverse coiled tubing and showing cross section of molding pressure chamber for forming.

Fig. 112 is a fragmentary perspective of framing members employed in Figs. 110, 111 and the like.

Fig. 113 is a cross section of a modified form of tubular body with the cellular shell.

Fig. 114 is a cross section of a coiled form of fuselage and forming pressure chamber and modified means of molding.

Fig. 115 is a side elevation of a coiled form of fuselage and modified pressure chamber and means of molding.

Fig. 116 is a cross section of a coiled formed fuselage of the type of Figs. 105 and 106, with framing and alternate tube formed interior framing and pressure chamber and modified means of molding.

Fig. 117 is a fragmentary cross section showing the longitudinal plates and separator spacers and tube beam of the fuselage shell of Fig. 116.

Fig. 118 is a fragmentary cross section of the frame and beam of Fig. 117 on the line 118—118.

Fig. 119 is a fragmentary cross section similar to Fig. 118 but with longitudinal tube formed interior frames omitted and showing external connections for bulkhead, etc.

Fig. 120 is a cross section of a portion of a fuselage or tubular body, made in separate sections, and the pressure chamber and means of molding.

Fig. 121 is an end view of an assembled fuselage of the type of Fig. 120.

Fig. 122 is a fragmentary side elevation of the fuselage of Fig. 121.

Fig. 123 is a fragmentary side elevation of a modified form of side section truss elements shown in Fig. 122.

Fig. 124 is an end view of the truss form of Fig. 123.

Fig. 125 is an end elevation of tube reel carrier laying tubes in trench form.

Fig. 126 is a cross section of a pressure chamber showing modified bag method of forming plastic molded elements.

Fig. 127 is a fragmentary side elevation of plastic tube formed propeller blades.

Fig. 128 is a cross section of the tube formed propeller blade in molding form.

Fig. 129 is a fragmentary diagrammatic longitudinal cross section showing wall features of the tube formed propeller blade.

Fig. 130 is a cross section of a tube formed wing in forming and pressure chamber.

Fig. 131 is a fragmentary plan showing form and manner of forming wings of the type of Fig. 131 in continuous multiples.

Fig. 132 is a cross section of a modified form of tube formed wing.

Fig. 133 is a fragmentary perspective showing tube and truss insert construction as in Fig. 132.

Fig. 134 is a plan showing tube formed wing construction similar to Fig. 132.

Fig. 135 is a fragmentary perspective of a modified form of tube formed wing.

Fig. 136 is an end elevation of wing of the type of Fig. 135.

Fig. 137 is a fragmentary cross section showing method of forming two tube coiled wings, edge to edge in a continuous coiling.

Fig. 138 is a fragmentary cross section showing means for more readily coiling tubing for wings, etc., around the trailing edge or an abrupt turn of similar nature.

Fig. 139 is a fragmentary perspective showing a modified form of tube formed wing with diagonally coiled formation.

Fig. 140 is a fragmentary perspective of a modified form of tube formed wing.

Fig. 141 is a perspective of a modified form of tube formed wing.

Fig. 142 is a fragmentary plan of the tube end construction in Fig. 141.

Fig. 143 is a fragmentary perspective of another modified form of wing.

Fig. 144 is an end elevation of a modified form of wing.

Fig. 145 is a fragmentary side elevation of the central tubular spar of Fig. 144 on line 145—145.

Fig. 146 is an end elevation of a modified form of wing.

Fig. 147 is an end elevation showing method of coiling wing of the type of Fig. 146 in vertical position.

Fig. 148 is a fragmentary cross section of a tube formed shell of the type of Fig. 146 but of two tier tube construction.

Fig. 149 is a fragmentary cross section of a tube formed shell of the type of Fig. 146 in single tier tube construction.

Fig. 150 is a cross section of a modified form of cellular shelled wing made in sections and then joined.

Fig. 151 is a plan of another modified form of wing.

Fig. 152 is an end view of the wing of Fig. 151 in position of assembling and molding.

Fig. 153 is a fragmentary cross section taken through the wing of Fig. 151 on line 153—153.

Fig. 154 is a fragmentary cross section of a modified form of the construction shown in Fig. 153.

Fig. 155 is a cross section showing another modified form of tube coiled fuselage or tubular body and means of pressure molding same.

Fig. 156 is a fragmentary longitudinal side elevation showing the joining of preformed cellular shelled sections for fuselage or tubular bodies.

Fig. 157 is a fragmentary perspective of a modified form of tubular body with cellular shell.

Fig. 158 is a fragmentary perspective of a modified form of cellular girder, spar or frame member.

Fig. 159 is a fragmentary cross section showing a form of metal framing and joining for cellular formed shell sections, etc.

Fig. 160 is a fragmentary perspective of another modified form of cellular girder, spar or frame member.

Fig. 161 is a fragmentary cross section showing anchor or expansion bolt connection for sheathing, etc., to a cellular spar or girder similar to that of Fig. 160.

Fig. 162 is a fragmentary cross section showing nailing connection for plywood sheathing, etc., to a cellular spar or girder shown in Fig. 160.

Fig. 163 is a fragmentary end elevation of a modified form of wire mesh reinforced tube formed girder, spar or frame member and indicating its joining with a tube formed shell extending transversely thereof.

Fig. 164 is a fragmentary end elevation of another modified form of wire mesh reinforced tube formed girder, spar or frame member and indicating its joining with a tube formed shell having tubes extending longitudinally therewith.

Fig. 165 is a fragmentary end view of a tube formed shell in combination with ribbed expanded metal.

Fig. 166 is a fragmentary perspective of a modified form of tube formed truss or spar.

Fig. 167 is a fragmentary perspective of a plastic tube formed ladder or frame member.

Fig. 168 is an end view of a plastic tube formed beam with reinforcements.

Fig. 169 is an end view of a modified plastic tube formed beam with indicated joinings with preformed cellular tube formed panel shells.

Fig. 170 is a fragmentary perspective of a plastic tube formed frame for tennis or other rackets.

Fig. 171 is a fragmentary persepctive of a plastic tube reinforced or formed tube with interior reinforcing walls.

Referring in detail to the drawings, Fig. 1 represents one of the various forms of tubes which I novelly employ in forming my various cellular plastic, veneer and other compound structures where any suitable materials are integrally united and bonded together by any of the various so-called plastics, or the like, in the curing and hardening of the adhesive material so employed. The hollow or tubular elements I are susceptible to a wide variation in construction. My chief aim is to provide these in most economical forms suitable to mass production and to procure a maximum of strength and durability. In this intance the tube I is formed with a wall 2 of fabric of good tensile strength which is properly coated or impregnated with water-proofing or fluid-proofing material 3 which will resist the pressure of water, air, steam, or whatever fluid it is preferred to use in subsequently inflating the tube with interior pressure. This fluid-tight wall 3 may be the innermost one, as shown, but it may also be otherwise located as in the case of covering same with a further inner lining of protective paper or cellophane or other film (not shown) which may be found helpful in forming or curing the fluid-tight wall or coating, or for structural or other reasons. The fluid-proof material may in normal times be of natural or synthetic rubber but under present war conditions and the necessity of avoiding the use of critical materials which is also one of the purposes of this invention, I prefer to use the commercially produced material known under the trade name of "Fairprene," either as a coating or as a sheet or film which forms in itself a strong pliable and fluid-proof wall with numerous other desirable qualities. Another suitable commercial material is known as "Saflex." This is a modified polyvinyl butyral prepared for fluid-proofing fabrics and the like which is thermosetting, curing at 260 degrees F., so as to produce a tought pliable coating, with many excellent qualities. If the conditions to be met with permit the use of thermoplastic material rather than thermosetting, another possible material of such fluid-tight, pliable and elastic walls can be formed is "ethyl rubber" produced from ethyl cellulose. It will be understood however that I no not limit my construction to these or to any one specific material and many coacting or wall or film of suitable material which best meets the requirements of the particular situation may be employed or a variety or combination of different materials may be used for this purpose in the same structure. It will also be understood that while generally the fluid-proofing 3 is preferably coated on the wall 2 (which can be either fabric, paper, tensile film, or other adaptable material), it may be made as a separate wall in itself and embodied or inserted in the tube and in any desired way. Where only air pressure is employed in the subsequent pressure treatment for hardening the plastic or adhesive components, it is not necessary to employ more expensive waterproof or steam-proof wall or coating materials and where water pressure is employed but without special heat requirements inexpensive coating substitutes can be used meeting these more limited requirements and particularly and in combination with paper walls providing the cheaper cellular structures for less exacting uses. Where the lining is water-proof, however, and especially when wood veneer is incorporated in the tube wrappings, jackets or other parts of the tube wall or the assembled structures, it should be noted that this water-proofing lining serves a double purpose both as the fluid-tight member making the interior water or steam pressure treatment possible and also, thereafter, in the completed structure a permanent means for keeping the atmospheric or other moisture from reaching the wood members interiorly, and so minimizing deterioration and warping tendencies, etc. It should also be understood that the wall 2 in the form of fabric can be entirely omitted and the water-proof or fluid-tight wall 3 used merely with intervening plastic and an outer wall of veneer or other fibrous or tensile wrappings or jackets. It will also be understood that the water-tight, air-tight or fluid-tight lining or wall 3 included in the tube may serve as only a temporary protective element permitting the use of inexpensive protective coating or wall materials which are only required to remain water-proof, air-tight or other fluid-tight, as the case may be, for the pressure hardening period which may be as short as ten minutes with some plastic materials.

The base material 2 forming the tube, if of fabric, can be a seamless braided tube, or if a seamed tube, as indicated in this particular Fig. 1, the weave of the material is preferably although not necessarily disposed diagonally or on the bias. In all these cases the tube so formed with its weave diagonally disposed will so better conform to changing curves when laid in forms requiring curved structures. The material so diagonally disposed also provides additional strength for resisting torsion and shear in the finished structure. If the seamed tube form is used the flat material may be joined by any suitable lapped or locked joint 4 with the adhesive material disposed to set within the joint which is preferably stitched to secure the best strength. One of the features of my invention is to do away in whole or part with the necessity of mandrels in the preliminary forming of the tube while my novelly dispensing with finishing mandrels in the final forming of the cellular structure, as hitherto found necessary, makes possible the forming in mass production, as will be later brought out, cellular structures of practically unlimited length and size and of curved and irregular shapes not feasible with interior finishing mandrels. As my tubes are not so-called "pre-formed tubes" but instead receive their final forming within the assembled structure, it is possible to seam the fabric material into a tube form without a mandrel or anyway a shaping mandrel. This fabric material in the case of the seamed tube is preferably coated with the fluid resisting material in the flat prior to the seaming but it also can be fluid-proofed after seaming or braiding. The wall 2 may be single or of laminated or multiple construction and with further fluid-proofing if desirable, between layers and, in such case, seamed joints may be staggered to secure maximum pressure resistance where such is needed. In its simpler form as shown in Fig. 1, however, I use a single wall for 3 for minimum cost of production. In consideration of cost, etc., I also form the wall 3, when desired, of suitable paper in single or multiple ply and similarly, for some cases, of cardboard.

The fluid-proofed wall 2 is provided as noted with an exterior coating or an impregnation of plastic material P in any preferred form and becomes, it should be particularly noted, a structural part and reinforcement of the finished pressure hardened structure. The service required, cost, etc., will determine the selection of the plastic and either a thermosetting or thermoplastic adhesive may be used and of the type most suited to the case in hand. Also in lieu of a coating, impregnation or the like, this plastic wall may be provided as an independent plastic wall, film or bonding sheet, or the plastic bonding material may instead be applied to adjoining members which will be brought to bear on the wall 2 when the subsequent pressure process is applied. For aircraft, boat structures, etc., I prefer to use, under the present state of the plastic art, the thermosetting type of plastic, particularly the phenol and urea types of synthetic resin which particularly recommend themselves for permanent structural superiority, which bond well with wood veneers and other filler or reinforcing material employed in my structures as well as being generally more economical. Where thermoplastic material is permissible or desired, cellulose acetate, or polyvinyl butyral or other accepted products can be used as the plastic bonding and strengthening agent. Any other suitable adhesive may be employed in lieu of any of these plastics as the bonding agent and different ones may be used in the same structure and at one and the same time.

The laminated walls of the tube 1 may have added any desired number of additional layers of preferred and varied material in wound, wrapped or other form, the same being combined in one form or another with interposing plastic or adhesive and with an outer wall of plastic or adhesive, applied in any of the various ways common to the art. The tubes 1 are made of any length but preferably of long continuous lengths and, as already noted, it is not necessary to make the same on a forming mandrel as they are not "preformed tubes" which, formed solely of plasticized veneer, have been made on forming mandrels and combined on finishing mandrels in a very limited and impractical way. My tubes, instead, doing away with final forming mandrels, are of a distinctly different nature and are finally formed, shaped and united by interior fluid pressure in all manner of shapes, lengths and sizes, without mandrels and their narrow limitations and great expense.

The tubes 1 are in most instances preferably combined with outer layers of reinforcing materials of good tensile strength associated and bonded with plastic. At the present time, one of the most preferred of these is wood veneer or plywood, although I also use other fibrous materials, fabrics, metals, etc., and often combine various of these in combination with the tubes 1 and the integrating adhesives. These reinforcing materials and fillers may either jacket the individual tubes or blanket or combine with assembled groups of same and I combine the various elements in many novel ways which will be subsequently indicated in part.

In Fig. 2 is shown one of these jacket arrangements. Instead of covering the tube 1 solidly with wood veneer or other tensile material, I novelly distribute same in depth rather than in area by forming open and lattice work jackets. The size of the jacket is preferably smaller than that of the encased tube so that when the tube is inflated its flexible and pliable walls have sufficient material to extend out and readily fill in the spaces between the lattice members, so producing a flush exterior and greatly enhancing the strength of the tube structures (which we will refer to as plastic tubes), by giving them a ribbed and corrugated wall structure as shown in Fig. 2. In the lower section of same, the tube is provided with longitudinal strips 6 and transverse strips 7, while in the upper section of same these are supplemented by diagonal strips 8 and 9 for resisting shear and torsion.

In Fig. 3 is shown in detail the construction of the tube 1 in relation to the reinforcing strips of the jacketing members such as the longitudinal strips 6 of Fig. 2. The construction, materials and arrangement employed in these structural jackets and wrappings for the tubes can be greatly varied and these become eventually an integral part of the tube to which they are loosely applied for assemblage purposes. In this instance the reinforcement 6 is shown in laminated ply although it may likewise be formed of single veneers or other tensile materials, including metal or combinations of same. In this figure a three ply veneer with plastic or adhesive interplayers or coatings P is indicated and with the face members 6a and 6b having their grain extending longitudinally of the strips (and in this position the tube as well) while the core member 6c extends crosswise in a typical balanced plywood construction, the several laminations of the plywood 6 and the outer surfaces of the tube wall 2 being combined at all points of contact with the thin layer of plastic P as indicated. A further wall or sheathing 5 of veneer, fabric or any desired material is shown plastically united to the plastic covered outer surface of the tube wall and any number of such laminations may be combined with these tubes as complete surrounding casings or as surface sheets of the finished cellular shell structure to form which these tubes are assembled and plastically united under pressure as will be subsequently brought out. This outer sheathing wall is also preferably covered with a finished coat of the plastic material (P) which can be either impregnated or coated or otherwise supplied and particularly by laying on sheets of thin plastic or plastic coated tissue or film material. In lieu of veneers for the strips 6, 7, 8, 9 and the like, thin flexible strips of metal may be used as already noted. These can be aluminum or magnesium or their alloys, for example, and so form the laminations 6a, 6b and 6c; or 6c may remain of wood veneer or again both 6b and 6c may be veneer forming an integrated wood backing for the metal member 6a. Any other desired combinations may be made and with other materials. Particularly desirable is the use of heat treated high tensile strength steel alloys such as stainless or chromium nickel steel, trade named 18–8, and the like. These can be metallically or molecularly joined by welding or brazing where wanted and particularly in the case of chrome steel alloy by spot welding to which it is especially suited as well as to heat treating for developing exceptional tensile strength and desirable physical properties. This welded joining can be so done where the ribs as 6 and 7 and 8 and 9 contact each other at points of crossing. If preferred, however, the welding can be omitted and plastic adhesives now especially and successfully developed for bonding metal surfaces can be used as coatings between the contacting surfaces as P in Fig. 3. The same may be done with the outer sheathing or sheeting 5 which may be similarly of sheet metal plastically bonded to the tube structures or wood backing laminations, etc.

It should be further noted as an important feature of my invention that not only light and flexible metal bands may be used for the wrapping or jacket tube reinforcement members such as 6, 7, 8, 9, and the like, but that similarly these may be supplied in the form of metal wires preferably light and flexible and or high tensile strength. These can be interwoven or joined by welding or other means at the contact points. Bands of such woven or joined wires may also be used in band or strip formation the same as the bands of Figs. 2, 3, 4, 5, and subsequent figures. The flexible tube walls on inflation or expansion of the plastic tube, press in between the wires of the mesh the same as with the equivalent strip elements so as to partially embrace or form flush exterior surfaces with same in the final pressure integrating. A further unique feature of my invention in relation to the employment of the metal strips or wire elements as reinforcing parts of my plastic tubes and cellular structures, is to provide these in metals which acquire great tensile strength and other advantageous physical properties such as fatigue resistance, etc., through heat treatment in connection with aging over a period of time rather than immediately through the quenching bath. Such metals of particular note are chrome steel alloy, as "18–8," and also Duralumin. In such cases I complete my assemblage, shaping and pressure treatment for the cellular structure to be formed subsequent to the heat treating of these metal elements but prior to their necessary aging and as a result they acquire their final flexed and bent shapes and position in the structure before their aging and stiffening and their final "set," so to speak, in their permanent positions and shapes as intended.

In Fig. 4, in the lower section, the tube is embraced with diagonal strips only, the strips 8 and 9 in this case may be interwoven in the winding or with one winding merely wound on top of the opposite lattice member. In the upper section of Fig. 4 only a single lattice winding is relied on, this simple arrangement being made more feasible owing to the fact that when a plurality of such tubes are combined side by side, the shearing stresses are met in opposite directions due to the fact that the diagonal windings of like adjacent tubes placed in similar manner dispose themselves as opposite diagonals on their opposing side walls which become ultimately united. In Fig. 5 is shown arrangements of windings for covering tubes solidly with the veneer, or other tensile material. In the lower section the winding 9 is lapped on itself as noted so that the tube is not only solidly encased but a double formed rib 9a is formed by the lappage, spiralling around the tube. In the upper sections the opposite diagonal windings are shown with abutting edges and forming an inner and a superimposed outer wall. In this case, also, the strips 8 and 9 may be similarly lapped as in the lower section, thus producing the double formed rib as 9a in opposite directions. If preferred, the strips 8 and 9 in the first instance may also be interwoven instead of in merely superimposed relationship.

In Fig. 6 is shown a novel method of providing my plastic tubes with lattice coverings in economic mass production without having to wind same on the tubes 1. On the longitudinal strips 6 are quickly attached cross diagonal strips 8 and 9, the same being preferably pinned, 10, as noted, to the longitudinals 6 so as to permit pivoting action and movement of the diagonals when the wrapped tubes are adapted to curves. The lattice jackets so formed are wrapped about the tubes 1 before or as these tubes are later coiled or laid on or in their form assemblages, the longitudinals 6 being normally laid on the short side of a curve where one-way curving surfaces are involved or coiling employed. Otherwise or in the case of compound curves requiring it, the longitudinals 6 may be cross cut as at 11 to better permit curve adaptation and, if desired, lap strips may then be added over the joints 11. Also abutting sections of jackets where they are not in continuous lengths may be similarly lap joined. When these lattice jackets are bent around the tubes 1, they are tied, clipped or otherwise suitably held or joined along the longitudinals 6 which can either lap or abut each other as desired. Where a solid veneer or sheet covering is permissible or wanted a similar jacket structure as indicated in Fig. 7 may be employed. In this arrangement I combine the shear strengthening strips 8 and 9 with a veneer, plywood, or other tensile sheet covering 12, the strips being pinned to same preferably at 10 or in any other way found desirable.

In Fig. 8 is indicated the manner in which tubes 1 of the type of Fig. 6, with the lattice jackets tied about same and the tube walls expanded or extended within same, are laid within forming platens 13 and 14 indicated in dotted lines. When the platens are brought together as indicated in Fig. 9 and my interior fluid pressure, as will be later more fully explained, applied at the proper temperature within the plastic tubes 1 for the final curing or polymerization of the plastic or adhesive bonding agent with which the tube walls and the jacket members are completely coated or impregnated or otherwise properly combined in any of the varied ways common to the art, the jacketed tubes 1 are finally shaped and formed in their compressed forms as noted and integrally united to form a plastically hardened and integral cellular structure, and one of great strength and lightness.

In Fig. 10 is shown a novel method I have of forming the tube jackets in veneer, etc., in a unique form which serves a threefold purpose at one and the same time, i. e., producing an articulated structure particularly adapted to conforming to curves, producing internal and oppositely crossing double walled lapped band construction and distributing veneer grain structure in opposite and diagonal directions for particular resistance to shear and torsion. Strips of veneer 15 and 16 are pinned (10) in lapped relation on a longitudinal holding and reinforcing strip 6 and superimposed one on the other to form a double walled jacket with the veneer grain of the two walls running in opposite and diagonal directions as indicated. In Fig. 11 is shown a three ply veneer jacket of balanced construction with the grain of the faces 17 and 18 running longitudinally in relation to the tube 1 and the core 19 grain extending crosswise. The reverse arrangement may similarly be used. This construction may be employed when a solid veneer or plywood wall is desired around the inner tubes when the plastic tubes are pressed. Where it is to be adapted to curves it also may be articulated by cutting the plied veneers in short lengths and lapping the ends so as to permit movement in adaptation to curves, after the veneer jacket has been bent around the tube walls after the manner of Fig. 12. In Fig. 12 the jacketed tubes are formed and united between the platens 13 and 14 after the manner of Fig. 9. Where it is desired to have a corrugated surface providing such additional strength the forms or platens as shown in Fig. 12 are correspondingly shaped as noted producing such a finished plastic cellular structure.

In Figs. 13, 14 and 15 is indicated the manner in which the jacketed structure of Fig. 13 is completed ready for pressing. The veneers 15 and 16 are bent around and their edges held together by the tapes 20 or other suitable or customary means so as to hold same temporarily in place about the tubes 1 until same are placed and held in the pressing forms, after the manner of Figs. 9 and 12. Fig. 16 indicates diagrammatically how this articulated tube may be conformed to a convex curve as the lapped veneers free to move on their outer edge, slip over one another to conform to a greater perimeter.

Fig. 17 shows a plastic tube 1 which has pockets, sleeves or containers 21, attached to the tube walls. These are formed of any suitable fabric or other reinforcing material 23 in combination with plastic by coating, impregnation or the like, attached to the tube wall 2 at desired points for stress reinforcement, in this case the top and bottom sides of the tube, by stitching 24a, cementing or other suitable anchoring along its extending edges 24. Where the tube wall is formed from flat sheet material rather than seamless (either can be used), this tube in this instance being shown as such with a stitched and locked joint 4, the containers 21 may be attached to the sheet material in the flat if desired to simplify the procedure prior to the forming and sealing of the joint 4. The containers are filled with tensile reinforcing material 22, such as any fibrous material including wood excelsior, vegetable or synthetic fibres, laminated material as veneers, light metal strips, etc., or a combination of same and these are properly combined with plastic so as to unite as a structural unit in the final pressure treatment. In Fig. 18 is indicated an assembled plurality of these tubes after such treatment, the containers 21 having been so located in the first instance as to now form a strong and continuous reinforced hardened integral top and bottom wall of high compression and tensile strength which, in combination with the web members formed by the plastic union of the adjacent side walls of the flattened tubes 1, create a box girder or I beam construction with a stressed skin. This stressed skin may be further augmented by a sheathing 5 of sheet metal, veneer, plywood, textile, or the like in combination with plastic which is also integrally united with the cellular structure in the pressure treatment of all these assembled elements. Fig. 19 indicates plastic tubes of similar nature to Fig. 17 but having the containers 21 disposed on four sides of the tube so that when the plastic tubes are pressure treated they create, as shown in Fig. 20, box girder or beam forms in which the web members, as well as the flanges or top and bottom shells, have the reinforced wall.

In Fig. 21 is shown in the lower section, small containers 21, containing small rope-like reinforcements 22 located at strategic stress points so that when pressed as in Fig. 22, they form beam-like structures with these rope-like reinforcements forming strong plastic flanges for the web members. The fabric or sheet material 23 for the containers may extend entirely around the tube as indicated in the lower portion of Fig. 21, to form an additional reinforced plastic wall lamination, or it may be simply in strips covering each rope with extending edges 24 anchored to the tube as indicated in two of the containers in the upper portion of the figure and the same as in Figs. 17 and 19. The rope-like reinforcements themselves may be fibres in twisted rope formation as indicated in the lower portion of the figure or may be laid in without twist. In the upper portion of the figure the untwisted fibres as indicated in the central rib and an alternate construction where the sheet walls 24 are omitted and instead merely anchor straps, tape or equivalent holding means 25, anchor the fibre bundles at suitably spaced apart points. The fibre bundles or ropes and the associated members are in all instances properly treated or associated with plastic prior to the final pressure treatment of the assembled structures. In Fig. 23 a modified form of the rope reinforcement similar to Fig. 21 is indicated. In this case the ropes or fibre bundles 22 are located interiorly instead of externally of the tube producing when pressed a structure similar but slightly different from that of Fig. 22 as indicated in Fig. 24. In this construction the container strips or sheets 23 can be omitted and the fibre bundles 22 held in place by tying or stitching the tube wall 2 together around each bundle as indicated. In Fig. 25 a tube structure reinforcement similar to that of Fig. 21 is shown only in this instance the rope of fibre containers 21 are attached spirally around the tube to produce strong shear and torsion reinforcement.

Fig. 26 discloses a plastic tube structure similar to that of Fig. 19 with the exception that in this instance the containers 21 hold laminated material 26, loose or united, as veneers, plywood, metal bands, etc., or a combination of same in lieu of loose fibrous material and in combination with the necessary plastic binder. The laminations may be used in all the containers as indicated in the right hand upper section of the figure, or instead, as indicated in the lower left hand portion, the top and bottom opposing containers may have the laminated material 26 and the side containers the loose fibrous material 22. These arrangements may be greatly varied and when the tubes are assembled and pressed, structures similar to those of Figs. 18 and 20, etc., are secured.

In Fig. 27 is shown a novel and strong form of plastic bonded laminated structure for either strips or sheets and suitable for use as strips for the members 6, 7, 8, 9, 26, etc., as well as complete jacket wrappers for my plastic tube structures and likewise for plied sheathing or stressed skins, 5, etc., for my cellular assemblages. In this I employ one of my novel bonding sheets consisting of plastic coated or impregnated tissue or film 27, on the opposite surfaces of which are embedded tensile fibre elements 28, preferably disposed in opposite diagonal directions, as noted. In some instances, however, it will be found preferable to position the fibres on both sides of the carrier film 27 in the same direction or to omit them entirely from one side and these and other variations I make as best fit the particular situation which is also affected by the number of ply laminations to be combined. This novel plastic bonding film is placed between the veneers 29 and 30 which in forming jacket strips such as those of Figs. 1, 2, 3, 4, 5, 6, 7, 10, 11, etc., preferably have their gain axis lengthwise while the fibres or strands 28 are placed diagonally of the grain at opposed 45 degree angles as indicated. When these laminations are subsequently pressure treated to form a hardened plastic plywood unit, a light-weight strip—or in the case of sheathing, a sheet—of great strength is secured. Plasticized fabric strips could be used for 27 but this would not only involve the greater cost of woven material but a weakening of the tensile resistance as it has been found that the tensile strength of fibres when woven and combined with plastic is materially reduced owing to the fact that the crossing of interwoven threads tends to cut them into separate beads when the plastic is hardened. My bonding arrangement avoids this and provides economical plastic bonding sheets for uniting the veneers and likewise adding greatly to their strength. As many laminations as is desired may be made in this way by placing the bonding sheets between the additional veneer layers and the directions of the grain and the sheet fibres may be varied at will to best suit requirements. It will be understood that these assembled laminations are held more or less loosely together prior to the pressure treatment and for that purpose may be so temporarily held by rivet fasteners, tape or any suitable and equivalent means (not shown).

In Fig. 28 I show a further variation of my plastic bonded plywood strips and sheets where enhancement of tensile strength, etc., is attained by the insertion of inexpensive high tensile film, 31, such as cellophane or the like, between the veneer strips 26, to be plastically bonded under pressure. Where the tensile film 31 is so lacking in porosity or grain, as in the case of cellophane, as to make strong bonding to veneers or other sheet material difficult, I arrange, as indicated, spaced apart slotted apertures 32 at suitably spaced apart intervals and in alignment so as to preserve a maximum area in unbroken continuity and along the tensile, shear and important stress lines as brought out for my veneer bonding in my pending application Serial No. 455,350, filed August 19, 1942, now abandoned. In this way when the perforated tensile film in association with plastic coating on either side is pressed, at the final curing temperature of the plastic, between opposed veneers 26, the plastic and veneer is forced down through the apertures 32 so as to meet from the opposite faces and so form strong through connections of plastically bonded wood which anchors and locks the tensile sheet 31 at each aperture and so provides a practically inseparable bond of the otherwise somewhat antagonistic materials. Taking advantage of this novel and successful combination of these materials I form in Fig. 28, a particularly strong and light beam-like structure for my strips and sheets by creating two strong tensile and compression faces so constructed of several laminations of veneers 26. These are impregnated, coated or otherwise suitably associated with the bonding plastic or adhesive. The cellophane or similar tensile film is perforated and preferably in sheets which are folded back and forth and cut to width to form strips 31 in which the veneer strips 26 are inserted between the folds. The veneer grain can all be lengthwise for maximum tensile resistance, as shown, or can be in conventional balanced ply. Between these two fold-embraced and plied members, the main core veneer 26 is inserted with its plastic impregnated or covered surfaces. This core, lying as it does in the neutral stress zone of the beam structure to be formed, can be of lighter or weaker veneer and maybe further lightened by perforations of its own (not shown). The number of laminations can be reduced or increased at will and the assembled laminations can be loosely held together by tape or fasteners or any suitable means (not shown) and used either in strip widths in the plastic tube jackets, etc., or in sheet form for the same or for the sheathings, etc. In the sheet form (as well as in the strip), the tensile film or cellophane members 31 can be laid on the veneers without the folding indicated. By plastically impregnating, and particularly with removal of the air from the wood cells (as in forming "impreg"), and curing the veneer under exceptionally high pressure (as in forming "compreg"), in accordance with modern developed methods of forming the so-called "impreg" and "compreg" plywoods, still more and remarkable additional strength approaching that of steel can be given to the laminated members. To facilitate the use of this high strength plastic compreg veneer in my reinforcing strips, sheathings and the like, when advantage of its superior strength is wanted, and at the same time avoid the use throughout the entire cellular plastic structure of the excessive pressure (several thousand pounds per square inch) necessary in forming compreg, I novelly first preform the compreg strips or sheets for later use in my tube reinforcements, sheathings, etc., in a plywood structure by forming the center core of plastically impregnated wood (preferably with vacuum removal of the air from the wood cells as in impreg) to which are joined outer faces of unimpregnated veneer which are not plastically treated except with possible coating of the surfaces contacting the center impregnated core. This ply so set up is then subjected to the high compression necessary to produce compreg which so produced has a high strength compreg core plastically united to the unimpregnated faces. These faces are then plastically coated or impregnated and the strips or sheets so prepared introduced into the assemblage for the jacket, etc., wrappings, webs, sheathings or other elements which are to plastically combine to form the cellular or other plastically integrated structure. When these ply with their compreg included portions are then subsequently repressed in the final pressure treatment of the assembled structure not necessarily requiring the high compression of compreg forming, the impregnated or coated faces bond perfectly with the adjacent tube walls or materials and by this means the compreg, already integrated with the faces, so becomes an integral part of the whole plastically integrated structure. This description can be applied to strip 6 as in Fig. 3 and the other structures throughout the specifications.

In Fig. 29 is shown another method of associating reinforcing or jacket members with the plastic tubes 1. The plastic tube has added to it top and bottom members 33 for forming a subsequent skin or sheathing. These can be of plastic and veneer ply in any desired arrangement of which a great variety can be made. One type of these is shown in the lower portion of the figure as the upper member 33. These can be inexpensively formed by laying veneer strips 8 on oppositely crossed veneer strips 9 (the veneers being single or plied), these preferably being at a 45 degree angle with the longitudinal axis of the tube and being suitably anchored to each other by taping, clinching or other suitable means (not shown). This anchorage can be loose and of the pivoting arrangement already noted so as to permit of movement and adaptation to curves, etc. The strips are properly coated or otherwise plasticized on all faces. Alternately, in place of the strips 8 being superimposed on the strips 9, they can be interwoven, if desired, as indicated in 33 in the upper portion of the Fig. 29. Or, instead, a common plywood of a plurality of laminated sheets can be used as indicated by the alternate 33 on the lower side of the plastic tube. If wanted, similar side members 34 can also be attached to the sides of the tube and these also can be of any of the types noted or other variations. The reinforcing jacket members 33 and 34 can be attached to the tube 1 by any preferred means. In this instance they are stitched (35) or otherwise secured around the tubes 1 at suitably spaced apart intervals. When the tubes are placed in form positions requiring curves to which the members 33 or 34 are not sufficiently adaptable these members can be severed or cross cut at desired points, as indicated on the dotted line 37—37 in the case of the side member 34, so as to permit better adaptation by lappage or spreading, as already noted in the case of Fig. 6 (11—11).

In Fig. 30 is indicated plastic tubes of the type of Fig. 29, grouped and pressed to form a cellular plastic shell or other structural element the same as in Figs. 9, 12, 18, 20, etc., Fig. 31 shows a portion of an assembled plastic tube structure where the tubes are of the type of those of Fig. 29 but has the attached reinforcing sheathing elements 33 of a widened width so that when the tubes are assembled beside each other the elements 33 overlap as noted instead of abutting as in Fig. 30. When subsequently pressure treated to produce the final integrated structure as indicated in Fig. 32 these lappings produce double thickness spaced apart ribs 38 providing extra stiffness in the stressed skin. The skin elements 33 may be attached to the tubes by taping, stitching 24a or other desirable means to temporarily hold same in place during handling and assemblage and may be so attached off-center of the tubes so as to be easily laid in the top and bottom overlapping arrangement as noted, or instead they may be centered on the tubes and lapping secured by having their width such as to produce overlapping with similar results. The sheathing members 33 may be of any of the types described for Fig. 29 or of any other wall structure, single or laminated as desired, in combination with the plastic material.

Fig. 33 shows one of my novel plastic tube forms particularly adapted to curved as well as other structures, by having its flexible wall tucked at spaced apart intervals so that the folds 39, so formed, provide extra expanding material when any side of the plastic tube is required to conform to extensive curvature when being set up in or on the forms. These folds 39 with their plastic coated walls P also provide strong structural ribs of multiple wall thickness when the plastic tubes are subsequently pressure treated. Other forms of folding and pleated plastic tubes will be subsequently shown in other figures (71, 72, 73, etc.).

In Fig. 34 is indicated the use of my plastic containing envelopes brought out in my previously noted co-pending application (Ser. No. 455,350) in combination with my plastic tubes. The container envelopes 40 are formed of suitable light sheet material or film, coated or impregnated with the plastic material. These can preferably be of the type of bonding sheet employed in Fig. 27 where the plastic coated or impregnated film or tissue or a strong paper or even wood veneer may form the wall 27, on which are preferably embedded the tensile fibres 28, distributed over its surface on one or both faces and also preferably disposed in opposed shear or torsion resisting diagonals, although they may also be disposed to particularly meet transverse or longitudinal strains by laying them in those directions. The envelopes 40 may be filled with any desired fibrous loose material 22 in combination with plastic and within this material is laid the plastic tube 1, preferably in collapse, as indicated. In this instance the fibrous material 22 which may be wood excelsior or the like is itself shown in paper wrappers 41 (a common commercial method of merchandising), and one of these packages is laid under and one over the tube. The fibres may instead, however, be laid without the wrappers 41, although the latter, in combination with the plastic, provide additional structural laminations in the finished product, and preferably so that the fibres or strands approximate the longitudinal axis of the envelope and tube. When properly filled the envelopes 40 are folded over or around same and laid in or around the forms for the final pressing and hardening of the plastic bonding agent so as to produce, by virtue of fluid pressure within my tubes 1, a strong light cellular structure as indicated in Fig. 35, the same as in the previous similar figures. The filler material 22 may also be strips of veneer or of any other desirable tensile sheets, placed singly on either side of the tube 1 within the envelope 40 or in plural layers forming loose laminations similar to 26 in the containers 21 of Fig. 26, all of course with the combination of plastic bonding material.

In Fig. 36 is indicated one of the ways in which I combine groups of my plastic tubes in any of their various, modified and reinforced or jacketed forms to form assembled cellular structures, which, by my novel pressure treatments in the presence of the plastic material in the form of coatings, impregnation, bonding films or the like, are transformed into integral hardened structural units with thin light walls and relatively great structural strength. My process is particularly directed to plastic structures involving wood veneer, this being an economical filler or reinforcement for the plastic with many desirable qualifications, but, as already noted, it is in no way confined to this material alone, but makes use of other materials of metal, fabrics, fibres, etc., and various combinations of same. At the present time the building and plastic bonding of veneer and plywood structures, particularly for aircraft and boat bodies, is accomplished by fluid pressure with what is commonly termed the "rubber bag process." The method, as is well known, consists of mounting the veneer in combination with suitable plastic bonding material on rigid male molds and inserting the mold so covered inside of a flexible rubber bag. The bag is then inserted in a round steel compression tank, known as an autoclave, through an end opening, the bag first having its open end sealed. The bag may either have the air first exhausted or instead be connected through the wall of the tank with the exterior atmosphere (or both). Pressure and such heat as is required for the polymerization or final curing of the plastic material employed, is then introduced into the tank either by use of steam, hot water or air or a combination of same. As the pressure is applied on the exterior of the rubber bag container, the latter is pressed tight against the assembled veneer and form within and the air, if still in the bag, is forced through the bag connection out of the bag into the outside atmosphere so far as possible. This process, it will be seen, has many undesirable limitations as well as requiring much critical steel in time of war for the making of the high pressure autoclave tanks which also, by their very nature, are quite limited in size and quite expensive. The placing of the assembled mount of veneer on its mold form inside of the rubber bag also obviously not only limits the practical size of the mold but also in itself is an inconvenience involving distinct limitations. Similarly the subsequent transfer and inserting of the bag and its contained mount through the end opening of the horizontal steel tank is an inconvenience involving practical limitations as to size and other restrictions. In contrast my novel invention of producing cellular plastic veneer and other plastic structures and novel means of fluid pressing same enables me to escape from these present day limitations and handicaps and form the structures in mass production in almost unlimited size and multiple numbers with facility, rapidity and economy.

In Figs. 36, 37, 38, 39, etc., are shown some of the novel means by which I secure these results. In the first place, as in the case of Fig. 36, I eliminate the necessity of the customary steel autoclave or compression tank, with its end opening, first by making the form itself serve at one and the same time as the compression chamber as well, and in so doing, making it possible to easily build these out of concrete or reinforced concrete, preferably as ground pits or trenches or with concrete curbs built on the concrete floor of the factory so that same can be economically and expeditiously formed and to any size and so that the ground backing against the concrete absorbs a large percentage of the high fluid pressures used within the form. It will be seen, as indicated in Fig. 36, that these trench forms can be readily built in any desired length so that plastic fluid pressed structures, hundreds or thousands of feet long, can be readily pressed in a single operation while little or no material is required for the forms which would ordinarily have to be provided, and little or no metal or steel. In Fig. 36 one of my curbed forms is shown with the side curbs 41 built on the floor slab 51 as better shown in Figs. 37 and 38, etc. Between these curbs the plastic tubes 1, with or without additional jacketing or reinforcing, as the case may be, are laid in proper alignment and positioning and in single or plural tiers as required for the structure to be formed. In the case of Fig. 36, long cellular sheets, panels, girders, partitioning or the like are to be made and the rows of plastic tubing 1, together with any reinforcing desired, are laid in juxtaposition to fill out the form between the curbs 41. This can be done by a single continuous or connected tube running the full length of the form which may be 100 or 1,000 feet long or of any length desired for extensive mass production as the procedure has little limitation and the longer the curb or trench form, the cheaper per square foot will be the finished cellular structure. The single or connected continuous tube 1, when used (as will be indicated in Fig. 78), is laid in place by turning it back when reaching the far end of the trench form and likewise again at the starting end, and so run back and forth until the form is filled. This provides a single intake opening at one end and an outlet opening at the other with a continuous circuit extending throughout the tubular setup so secured, and as will be further illustrated in further analogous set-ups. In lieu of this single continuous tube set-up and as shown in Fig. 36, I employ a series of single or connected plastic tubes aligned with each other throughout the length of the trench, starting with their intake ends connected to or anchored in the manifold 42 (shown in Fig. 46) and terminating at the other ends similarly in the manifold 43, which serves as an outlet manifold or if desired merely a return connection. Other variations of set-up, some of which will be shown, can be made without departing from the spirit of the invention. The manifolds are served by valve controlled intake and outlet pipes 44 and 45 and also if desired, and for certain set-up, 46 and 47. The connections and the makeup of the manifolds can be modified and greatly varied. For example, if the manifold box 42 is cross-partitioned in the center as indicated on the dotted line 48, fluid pressure in the form of hot air, steam or hot water can be injected into the tubes on the one side of the form at the desired pressure through the intake 44, and circulating through the unpartitioned manifold box 43 at the other end of the line, be drawn back through the remaining tubes on the other side of the form by the suction outlet 45, thus putting all the plastic tubes under inflating and forming pressure. In this way the tubes throughout are kept, for the brief hardening period required, at the proper pressure and temperature by keeping the heated fluid under circulation which can be accomplished by suitable means, such as one or more circulating pumps 49, and heating coils or equivalent 49a connected to the circuit at one or both ends as desired and indicated. Difficulty has heretofore been encountered in properly heating veneered structures and plywood of substantial depth in the curing of the plastic bonding veneer as it has to be externally heated and the outer wood is burnt in carrying sufficient heat to the inner wood. High frequency electric heaters have been employed to overcome this difficulty in some degree but even if it helps, such heating is expensive and requires expensive equipment and would be still more impractical and in no way feasible if unlimited areas in extensive mass production were to be treated which is so simply accomplished by my invention with its interior fluid heating and circulation in my plastic tubes. The consideration of pressure is also an equally important consideration. It should be understood that in the forming of plastic and plastic bonded veneer and other kindred structures the greatest strength is secured by the highest pressures and these in present day practice are secured only on small areas in small metal presses. With my tubular system, however, I easily can secure the highest of pressures if desired. The plastic tubes as in Fig. 36 can have their feed line, as 44, under hydraulic pressure with water as the pressure fluid. Thus any pressure applied on the feed line is equally transmitted to every square inch of surface within and throughout the entire assembled plasticized structure. At the same time no rupturing force is brought to bear on the plastic tube walls as my plastic tubes are carefully designed to be larger (or in case of elastic walls in no instance smaller than their safely expanded size) than the positions they fill when pressed, so that the pressure, whatever it may be raised to, is merely transmitted to the containing form without injury to the plastic tube itself, as its walls are so not brought into any threatening tension.

Referring further to Fig. 36, when the tubes 1 are placed in the holding trench or mold formed by the curbs 41 and the floor slab 51, they may be in collapsed condition or preferably in this and certain cases, inflated at low pressure sufficiently to expand them for easy handling and positioning if their walls are of a collapsible nature when deflated instead of resilient type which tends to hold an expanded or sustained shape whether inflated or not; tubes of either type are employed as found desirable. In Fig. 37 the tubes are shown in place in expanded or resilient self-sustaining form and in Fig. 38 is shown in the next step their subsequent reshaping and pressing tightly together when the closure lids 52, are laid in place and secured on the curbs 41, etc. In the case of collapsed tubes this final reshaping, etc., occurs as the tubes are inflated with air or the pressure fluid after the lids 52 are in position. The closure lids 52 can be made in suitable sections of metal, cement or reinforced concrete (I preferably employ heavy massive slabs of the latter which are swung into position by overhead cranes or other travelers). These are laid in position side by said on the curbs 41 and locked in place by suitable spaced apart holding or bolting means 53. In practice these would be any form of quick locking and wedging device common for such purposes. When the lids are in place and the plastic tubes confined in their closed form so created, the plastic curing or adhesive setting pressure is turned on within the plastic tubular circuit, the fluid-proof walls of which prevent the plastic members and fillers of the assembled structure being reached by the fluid which compresses and properly heats same throughout, polymerizing the plastic material and in a brief period creating a hard united integral cellular structure which is then removed from the holding form after removal of the cover lids. In the case of Figs. 36, 37, and 38, this is a cellular shell or slab of whatever length set up. Before removal from the form this can be cross-cut in short or desired lengths as on the dotted line 54—54 of Fig. 36. To secure ready release from the forms which are properly lubricated or otherwise protected on all necessary surfaces to prevent adherence to the plastic structure, the curb sides are slightly battered or otherwise provided with removable battered side linings 55, inserted in the forms as may be required, or in many cases the united structure may be "sprung" out of a straight form. If desired the lids 52 may be sealed with rubber or cushion bearings or connections 59, as indicated in Fig. 38 and in later figures, and the form or pressure chamber created made air-tight and the air exhausted, if desired, from the form after locking same. The plastic tubes are then inflated within the vacuum. By virtue of my interior fluid pressure, however, this is not a pre-requisite and, instead, the forms can be provided with suitable air vents in the lids as indicated 56, in Fig. 39, or in the sides or bottom of the forms (any or all of same), so that as the fluid pressure is applied within the plastic tubes the air is forced thereby out of the form through the vents which have suitable perforated and lubricated shields to prevent intrusion and adherence of the molded or bonded material.

While in Figs. 37 and 38 a single tier of plastic tubes is shown in the forms, any number of tiers may be laid as indicated in Fig. 39. Also several separate cellular structures superimposed on each other and separated by lubricated form sheets or plates 55b, may be made at one and the same time, thus cheapening and expediting the manufacture. The rows of plastic tubes when in tiers may be in aligned vertical rows as in the upper tiers of Fig. 39, or in staggered relation as in the lower portion of the form. The staggered relationship gives, as will be observed, a strong interlocking of the so irregularly distorted tubes between superimposed tiers and a strong cross sectional shape for the cellular structure formed. When the forms created by the concrete curbs 41 are deep and the internal pressure to be employed high, the trench form can be built by sinking same in the ground of the factory floor so that the ground pressure resists the fluid pressure on the concrete curbs or side walls as well as the floor of the form. Also the cover lids 52 may be made of heavy slabs of concrete as desired so that their weight also resists the upward pressure which can also be further met by temporary weight loading or bracing of the lids against overhead girders at desired points when necessary. The relatively inexpensive and readily available (under war conditions) concrete can be made as massive throughout for all sides of these trench forms as desired.

If, aside from any jacket reinforcement or extra walls on the plastic tubes 1, additional strength is wanted in the cellular structure, this is taken care of by additional reinforcements or structural members laid in the form. Thus, in Fig. 36 is shown in dotted lines, cross struts 57 and diagonal truss members 58. These can be laid on the bottom of the form before the plastic tubes are laid in place and similarly corresponding top members, then laid on top of the tubes when in position. The stress resisting members 57 and 58 may be of plastic treated veneer or laminations of veneer or of corresponding thin strips of high tensile chrome steel alloy or other desirable metal, or strips of wire, or textile or other forms of good tensile or fibrous material may be so employed. In addition, covering sheets of these materials as veneer, sheet metal, etc., singly or in various combinations and in combination with the bonding and strengthening plastic, may be laid in the forms under and over the plastic tubes—with or without the additional skeleton reinforcing members such as 57 and 58. After the interior pressure is applied in the tubes, all the assemblage is plastically united and with a smooth outer surface which is also provided with a plastic exterior coating by the proper amount of plastic placed on same in film sheets, coatings, impregnation or equivalent means prior to the form pressing. It should be particularly noted that my method of pressing interiorly and outward with my pliable tube walls against a solid form produces an especially even and desirably formed exterior in the case of veneer and the like, despite the presence underneath of structural reinforcing ribs and members normally tending to cause exterior ridges, etc. In my novel structures the ridges or corrugations instead appear on the inside of the plastic tubes (thereby also desirably enhancing their structural strength), because of their pliability and their pressure outward against the smooth holding or resisting form. This is in direct reverse of the present "rubber bag" method heretofore noted which in pressing the veneer from without on to a solid form with veneer backing rib members thereon, has to deal with the difficulty of having ribbed corrugations raised on the exterior face of the molded element over these backing ribs. My jacketed tube construction as in Figs. 2, 4, 5, 6, 7, 8, 9, 10, etc., similarly enjoys the same advantages as the flexible tube wall 2 as of Fig. 1, the tubes being larger than the embracing jacket, or sufficiently elastic if forced out by the interior fluid pressure, so as to fill in between and form a flush exterior surface with the jacket ribs, as 6, 7, 8 and 9 and as indicated in Fig. 9.

In Fig. 40 a modified and novel forming cover for my assembled plastic tubes in my trench or curbed forms is shown. In this instance, in lieu of concrete slab lids, I stretch across the curbs a fluid-tight sheet 60 of reinforced or corded rubber or other similar material with tubular portions formed in same for tightening, heating, etc. This can be built after the manner of the inflation type of rubber boat and in long lengths. Its edges are formed somewhat like a corded tire casing with clincher sides 60a of any suitable design which by inflation are engaged and automatically locked in properly designed grooves or recesses in the curbs 41, as indicated, after the manner of a clincher tire, and when deflated can readily be set in place or removed. The sheet 60 is preferably, but not necessarily, tubular across its surface as well as longitudinally along its edges or rim. In this form the cross tubes 61 connect at each end with the longitudinal tubes 62 of the clincher rim. The latter serve a dual purpose. After the sheet 60 is laid in place and in clinching position, the tubes 62 are connected up with the fluid pressure, water, air or steam, as the case may be, and this expands the tubes 62 on the outside of the form curbs 41 from the dotted line position indicated and so draws the sheet 60 tight across same and in tightly locked position. As the cross tubes 61 cross connect with the longitudinal chambers 62, they also are expanded so as to provide a stiff strong tight top form for resisting the pressure which is then turned into the plastic tubes 1 which are shaped and held in pressed position through the medium of 60. The curing heat required for hardening the plastic assemblage can by this means be supplied not only interiorly by the fluid circulating or imprisoned in the plastic tubes 1, but also externally by heated fluid made to circulate through the tubes 62 and the cross connections 61. In addition, if desired, external heat may be supplied on the bottom of the form by heating pipes (not shown) embedded in the concrete form floor 51. The form chamber in which the plastic tubes, etc., are assembled may have properly mesh protected vent troughs 63, provided and connected to the exhaust line 64, to permit the escape of air from the form as the plastic tubes are expanded with the interior fluid pressure, or conversely, if the tubes are previously expanded, when the form lids are pressed down upon them. Alternately, if desired, the air is exhausted from the closed form chamber prior to the final pressure inflation of the plastic tubes or concurrently therewith, by vacuum pump through the lines 64 which connect with the trough slots 63 which have fine holed cover plates 63a properly lubricated or otherwise protected against adherence to the plastic structure. After the plastic pressure treatment is completed, compressed air or the like may be applied through the line 64 to force the hardened molded structure up from the form, the sides of which either have the batter board 55 for insuring easy release or are otherwise tapered where the molded structure cannot be "sprung" from the form.

Figs. 41 and 42 show plastic tube pressed slabs with dovetailed edges, the tubes conforming in the pressing to lubricated removal filled strips similar to 55a in Fig. 39 which form dovetailing for joining slabs together. In Fig. 42 is shown a further important feature which I employ as desired in all my cellular plastic structures, i. e., the insertion of reinforcing web elements 65 or 65a with plastic, between the plastic tubes laid in the forms. These web members or stiffeners may be veneer, paper, plywood, metal or fibrous material, laminated or otherwise. A very desirable insert is the extra strong prepressed plastic veneer plywood known as "compreg" already described. If a ply, as previously described, with a compreg core bonded to outer veneer faces not previously treated with plastic on their outer side are now plastically coated and used for the inserts 65 or 65a, a very intimate bond will be secured with the contacting walls and/or jacket reinforcements or wrappings of the plastic tubes 1. These tubes are shown, as elsewhere, somewhat diagrammatically as to wall structure, it being understood that in all my cellular structures shown or described the tube walls may be any of the simple or compounded jacketed and reinforced structures variously shown throughout the patent, or modified forms or equivalents of same, or combinations or grouping of different types in the same assemblage. The web members 65 may be in open or truss formation to lighten same and so favorably increase the ratio of strength to weight as indicated by 65a in Figs. 42 and 43. Under this arrangement the adjacent plastic tubes have their walls meeting and plastically united in the web openings 66, thus firmly anchoring and strengthening the web members, etc. In Fig. 42 is also shown a particularly strong sheathing 5 forming the exterior faces of the cellular shell. In this instance these faces are formed of high strength weight metal such as chrome alloy steel, aluminum or magnesium in thin sheet form 5a and this may be further stiffened by a backing of one or more laminations of veneer 5b or other suitable strengthening material, all the layers including the metal being properly coated or otherwise associated with plastic or adhesive of proper nature to bond same together and to the plastic tubes 1 and any reinforcing members used with same so as to be integrally united into a hardened structural unit by the pressure process following their assemblage. This construction provides shells of great depth with little weight and with high tensile and compressive outer skins stressing with the strong inner webs in a beam structure particularly desirable for airplane wings, fuselages, etc., as well as other structures. When wanted the metal shells can be omitted using the veneer or other sheathing and vice versa the metal shells 5a can be used without the backing skins of veneer 5b or other material and instead bonded directly to the plastic tubes with or without additional reinforcement.

In Figs. 44 and 45 is illustrated some of the wide adaptability of my plastic tubes to forming curving and irregularly shaped structures owing to the tubes having no mandrels within them and their pliable construction. Thus, for example, if it is desired that the cellular panels formed in Figs. 36, 37 and 38 should have a strong corrugated shape lengthwise of the tubular setup, filler shaping forms 67 can be laid on the floor slab 51 and the tubes, laid in alignment on this, adapt themselves to same as noted. The upper form is then filled out with the corresponding or complementing shaping forms 68 so that when the assembled plastic tubes are expanded or held under pressure between same in the pressure hardening process the desired corrugated shell results. If, on the other hand, a longitudinally corrugated shell is sought, of the type indicated in Fig. 45, the filler forms 67 are laid on the floor slab 51 and the upper form filled out with the auxiliary shaping forms 68. As the plastic tubes 1 do not employ mandrels, they then can be laid in the contiguous lengthwise rows, as indicated, on the undulating compound curves of the forms 67 for any desired continuing length, which could not be done at all if requiring form shaping or supporting finishing mandrels in the tubes. With the top forms closed on the tubes and the tube pressure turned on, the curving structure of Fig. 45 is formed into a solid cellular unit. By similar means or with various modifications, as will be seen, practically any shaped structure can so be produced in cellular form by my invention.

In Figs. 46 and 47 are shown some of the details of the manifolds 42 and 43 of Fig. 36 which are merely suggestive and can be greatly varied for connection to the plastic tubes for their pressure filling. In this instance the ends of the plastic tubes 1 are received and locked in receiving ports 69 by wedge nozzles 70 which are cushioned, 71, so as to hold the tubes tightly without injury. The nozzles 70 are wedged and locked in position by any suitable locking and bracing device as suggested by the dotted lines in the chamber 42a of the manifold indicating a holding or bracing frame 70a which is wedged in place against the nozzles 70 by screw jacks 70b, leaving the tube inlet openings free to receive the fluid pressure with which the manifold chamber and the plastic tube system is filled and served from the intake lines 44 or 45, as the case may be. The manifold chamber 42a is closed and opened in the placing of the plastic tubes and removal of the later hardened integrated tube structure, by removing the cap plate 42b and the wall forming the port holes 69 is formed in an upper and lower half so that the upper half can be lifted off in removing the pressed structure formed.

Fig. 48 shows the structure of a cellular shell utilizing some of the various features of my plastic tube structures and suitable for aircraft wing and other structural elements. In this figure the plastic tubes 1 are designated 1a and 1b, the 1a being tubes with longitudinal and diagonal veneer, plywood or other tensile strip members 6, 8 and 9, which can be somewhat similar to the jackets of Fig. 6, for example, or Fig. 2 or 4, while the alternate tubes 1b, which are shown of a narrower width than 1a, are built for greater resistance and have their walls covered solidly or all over, instead of latticed or skeletonized with veneer, plywood or other tensile material, which can be similar to those of Figs. 5, 7, 11, 12 or 13 for example. The combination of these different types of plastic tubes provides alternately light broad members 1a carried between stronger somewhat narrower tubular beam supports 1b, so to speak. Other corresponding groupings can likewise be made, spacing the stronger tubes at less frequent intervals, etc. The entire cellular shell so produced by the assembled tubes with the plastic bonding material is further braced exteriorly by cross strips 57, similarly to Fig. 36 (and the cross diagonal bracing 58 of same can also be similarly added if wanted). The cross strips are also of veneer or plywood with plastic, compreg, previously described, being particularly desirable, or thin chrome steel or other preferred metal or tensile material can be similarly employed. These strips are laid under and over the plastic tubes 1a and 1b in the form and the tubes being pliable, form themselves around these, so corrugating their walls and producing an outer surface flush with same, the ridges resulting being on the inner sides of the tubes as indicated. This outer surface being covered with bonding plastic or other adhesive bonding agent is structurally united to the surface sheathing 5, after the manner of Fig. 42, etc., using chrome steel, other metal or tensile material or veneer, etc., or a combination of same with the usual plastic surfacings. Between the plastic tubes 1a and 1b, if greater web strength is needed, suitable web members such as 65 or 65a of Fig. 42 are also inserted with plastic. The whole structure is then united by the plastic hardening pressure.

In Figs. 49 and 50 are shown my plastic tube truss formation formed in my mass production curbed or trench form methods similar to those of Fig. 36, to any desired length, limited only by that of the factory floor or yard space, which can be cut up, after the plastic pressure forming, to any desired length and to stock lengths which make possible continuous inexpensive mass production. These trusses can be used for any structural purposes but because of the great strength in relation to weight are particularly suited for spars in airplane wings, for Zeppelin framing, etc., and in building construction, to long spans and for light scaffold framing, etc. In this floor or trench form, the side curbs 41 have concrete island forms 72 properly located between same. All the sides within the form can be very slightly battered so that the finished truss can later be sprung from same, or otherwise battered linings can be used as heretofore. The plastic tubes 1 are then laid in place in the slots so formed. One or more tubes running lengthwise forms the cord members 73 and 74. These can terminate in a manifold connection at the other end of the form after the manner of Fig. 36, or the tube can loop around as shown and return, thus providing an intake 73a and outlet 74a opening at the other end which is connected with the pressure and circulating line connections after the manner already described. The web trussing is similarly formed with one or more plastic tubes 75 with intake 75a and outlet 75b. This tube 75 zigzags between the island forms 72 and contacts or is adjacent to the cord tubes 75. At these contact or tangent points for further strengthening, if desired, a wrapping 76 of veneer, fabric, thin metal or the like embraces the cord and truss tubes. After these are all in place together with the usual bonding plastic on all the surface and contacting members, and with any desired jacketing or strengthening elements added, the concrete closure lids 52 are placed over same and clamped down, whereupon the interior pressure is applied within the plastic tubes as already outlined and the various elements integrally united to form the cellular trussing. The lids are then removed and the trussing removed after cutting in desired lengths (as at 54—54), when this is contemplated.

In Fig. 51 I show how a veneer plywood or other face of sheathing can at the same time be formed on one side of the truss integral therewith. This is accomplished by laying sheets of veneer 77 (or other sheathing material), with plastic coating or the like, in any number of plies desired, over the plastic tubes 1 and upper surface of the island forms 72 (which are properly lubricated or protected from adhesion). The concrete curbs are greater in depth than the truss so that a chamber remains above same and this is occupied by a pliable rubber or similar fluid-proof bag (or bags) 78, which are outwardly connected with intake and control valve 79. In this case the bag 78 is attached on its upper side to the lid 52 so as to be placed and removed as a unit with same, and is connected for inflation through the lid 52 by the intake 79 therein. After the lid closures 52 are clamped in place the fluid pressure is turned on through the intake 79 as well as into the plastic tubes 73, 74, and 75 and maintained at the proper hardening temperature so than the veneer and plastic ply or other sheathing 77 are flattened against the forming top surface of the island forms 72 and the plastic tubes 73, 74 and 75 and so as to be integrally united to the latter in the hardened assemblage. After this is accomplished the lids 52 and the then deflated pressure bag 78, attached thereto, the latter being made nonadhesive, are removed and the veneer faced truss removed from the form. Two of these with opposite face veneer sheathings can then be united with plastic glue (and bolting if desired) to form an enclosed box girder after the manner of Fig. 54. If further desired in this procedure (of Fig. 51), stiff rigid finishing plate with adhesive protection can be inserted between the veneer face 77 and the pressure bag 78 as indicated in Fig. 64 (92), so as to insure a particularly even, smooth and level surface. In the first instance it will be observed that the veneer plywood sheathing is pressed between the plastic tubes and the pressure bag in portions and between the concrete island forms 72 and the pressure bag in the remaining areas; in the alternate case, the same is true with the exception of the finishing plate 92 intervening in each case.

In Fig. 52 is shown a similar truss but built up in heavier construction, the cords being formed by a plurality of plastic tubes as is likewise the web trussing. The truss is also reinforced along the cords with plate members as 81 and 81a of different length and in stepped relation to each other and located in relation to the contemplated load strains. In this drawing the shorter plate 81a is placed centrally of the truss for a typical truss or girder supported at both ends. In a cantilever loading, however, as in the case of a wing spar, this extra strengthening is placed at the end, as next to the fuselage. Any number of stepped-off laminations may be used in this way with welding, riveting or adhesive connection between same. As my pliable plastic tubes compress and adjust themselves to any of these added members or inserts, it becomes a very simple matter to reinforce these cellular structures in this and similar ways at will. In like manner reinforcing plates 82, are placed in the forms with the plastic tubes to strengthen the truss web tubes 75, the surfaces in all cases being given proper adhesive to bond throughout with the plastic tubes or adjacent material when the pressure hardening treatment is applied to the assembled elements. It will be particularly noted that my construction is especially adapted to placing inserts between adjacent tubes before pressure treatment for connections, reinforcements or other purposes, as my pliable tube walls conform themselves to same and later through the plastic or adhesive bonding medium become an integral part with same. Thus in Fig. 52, when wanted, I place insert sleeves or tubes 83 between the plastic tubes in the assembly form for receiving intended bolt or rivet connections for such a purpose as uniting (after forming) two such trusses. The reinforcing plates 81 and 81a and 82 and the like, for greater strength, may be of chrome steel alloy or other metal or of veneer or plywood (and especially compreg), or fabric, paper, or other tensile material laminated as desired and properly associated with the bonding plastic for integrating the unions throughout. The inserts 83 are preferably of metal but may be of other materials likewise. In Fig. 53 the two tier depth of the plastic tubing of the truss of Fig. 52 is shown, the plastic tubes being so laid up in the forms. As need dictates a single tier only, or any multiple of tiers may be so laid up before pressing, the forms being built in depth to meet such set-ups. In 53 the truss is slightly tapered, as indicated in cross section, to draw readily from the forms but as already noted the forms can have battered removable linings and the truss formed without the draw taper. In Fig. 54 is shown two separately formed trusses like 52 but of single tier depth like that of Fig. 51 and with the plywood or other facing 77. These are joined, as noted, by the bolts or rivet connections 84 passing through the insert sleeves 83 so as to draw the truss members tightly together all along their length after suitable bonding plastic or adhesive P (preferably of the cold setting type) is applied to the contacting surfaces. To further enhance this union the opposing plastic tubes can be formed in their truss pressing with oppositely registering tongue and grooved sides after the manner of the end tubes in Figs. 41 and 42 as the tubes readily adapt themselves to such shaping in the forms.

In Fig. 55 is shown plastic tube truss construction similar to that of Fig. 49. In this case, however, the forms and tubing are laid out to form a changing depth to the truss. These can be laid out in unlimited length and then cut in sections at cutting points as A—A and B—B. This construction is particularly suited to aircraft wing ribs as well as spars and likewise to building and other construction. The concrete form curbs 41 are built to conform to these contours as noted. The plastic tubes forming the cords 73 and 74 and the web trussing 75 being of constant diameter and laid normally, produce correspondingly the constant diameter cords and web truss member throughout the length of same, as shown in Fig. 55. If it is desired to have the thickness of these diminish, however, as they approach the points A—A, so as, in the case of a wing spar or rib, to conform to a thinner wing thickness at these sections and points less stressed, I gradually diminish the depth of my plastic tube cords and also web truss if desired, and this I accomplish by one of two alternate means. The first is to build my plastic tubes of correspondingly graduated and diminishing diameters at these points and approaching same. To do this the sheet fabric or other material for forming the tube wall (as 2 in Fig. 1, etc.) is laid out and cut in the flat to the desired pattern as shown in Fig. 56, before being joined to form the tube, so that when joined it forms a tube of properly changing diameter as indicated in Fig. 57 to form the cords 73 and 74 of Fig. 55, only tapered as shown in Fig. 56, and the web truss tube 75 can be similarly treated. This permits such a spar or rib frame to taper to an extremely shallow depth at the end of the wing or at the trail edge respectively. Alternately, in lieu of this procedure and where a constant diameter tube is used, I increasingly flatten the plastic tubes in the form (thereby producing a tapering thinner but broader tube) to create the shallow sections, the form being designed to conform to this result. As will be seen this alternate method is illustrated in the later Fig. 63. All manner and variety of different changing shapes in the finished structural elements may be secured by these novel means.

In Fig. 58 is shown in plan a plastic tube frame for an aircraft wing where a single tube is carried continuously around in the properly slotted floor or trench form to form the complete structural frame with the single fluid pressure intake 85 and outlet 86 serving the entire structure and also producing a strong novel wing frame with strong resistance to shear and torsion which is of paramount importance in wings. It will be understood that in all these trussed or open frames as in Figs. 55, 58, 61, etc., the contact or tangent points of the adjacent plastic tube members may rely wholly on the intervening plastic for the bonding at these points, but I also, when desired, provide veneer, metal, fabric or fibrous wrappings about these unions as 76 in Fig. 49, which, in company with plastic, are placed around these in the forms prior to the final uniting pressure treatment and this provides further plastically joined bonds.

Fig. 59 indicates how a frame similar to that of Fig. 58 may have a plastic, laminated or other sheathing formed integrally with the plastic tube framing to provide a stressed skin after the manner of 77 in Fig. 51 and this can have an outer metal skin with plywood backing or any other arrangement of suitable materials plastically reinforced and bonded. The frame can also be tapered in thickness as in Fig. 57 and shells so formed and of opposite hand as regards the sheathing face, may be joined and secured together with adhesive and bolts or equivalent after the manner of Fig. 54 to form a completely enclosed skin stressed wing with this novel strong and light-weight interior tubular frame.

Fig. 60 shows how a frame like that of Fig. 58 may be made three tier deep in placing the plastic tubes in the forms made to accommodate same in lieu of only one tier deep. Any number of multiples can be so employed and similarly any number of separate superimposed frame members can be pressed simultaneously with lubricated separator plates between as shown in Fig. 39.

In Fig. 61 is shown another plastic tube truss suitable for forming the framing of the wings of a glider or airplane all in one piece. Such a frame is also applicable to any structural purpose such as roof trusses and the like. In this instance, I form the cord members 73 and 74 out of a single tube having the intake 73a and the outlet 74a while the trussing is formed by the plastic tube 75 with intake 75a at one end and outlet 75b at the other. This truss frame formed after the manner of that of Fig. 49 may be given varied shapes and may have its tips extended forward as indicated in dotted lines, if wanted, to procure a particularly strong wing frame. Roof trusses can be shaped and varied in similar fashion, the floor or slotted trench forms being so laid out.

In Fig. 62 is indicated a tubular structural girder or panel section formed with my plastic tubes, etc., in my slotted floor or trench forms and pressure system. The pressure formed slot is formed with the concrete sides 41 and bottom 51, in the earth or floor foundation 51a. The sides of the slot form are preferably battered and fitted with tapered lubricated and removable hollow linings 55 provided with fine sieved air escape face openings 55c which communicate with the top plate channels 52a connecting with the valved controlled vents 87. The bottom of the slot form is also vented having an air escape channel 63 with proper mesh covering connecting with the valve controlled pipe line 88. The plastic tubes 1, etc., are laid in the regular manner in the slot form in their superimposed positions and preferably, for the strengthening of the girder, top and bottom plates 81 coated with proper plastic or adhesive bonding material are placed in the top and bottom of the form, as noted, these being of high tensile metal or other suitable material or combinations of same and plastic, as already set forth. When the form is filled with the plastic tubes and all intended reinforcements and inserts, the cap plate 52 is locked in place over same and the fluid pressure brought to bear within the plastic tubes 1. Before this is done, the air can be exhausted from the form by means of the lines 87 and/or 88, or, instead, these lines 87 and 88 are left open so as to permit of free venting, and the pressure within the plastic tubes allowed to push the air out of the form as the tubes become fully inflated so as to fill the form and shape themselves to same and each other as noted. After the pressure treatment already described and the uniting and hardening of the plastic integrated structure thereby, the cap plate 52 is removed and the girder lifted from the form which in the beginning has been properly lubricated or protected. Application of compressed air through the line 88 gives helpful means for forcing the molded structure out of the trench form. The girder, as will be observed, is preferably provided with plastic tubes of smaller diameter to form the top and bottom compression and tension sections of greater strength, while the web members lying in the neutral stress zone are of larger diameter, requiring less strength and thus reducing the weight, etc.

In Fig. 63 is indicated a novel girder of the type of Fig. 62 with additional novel features. This tubular girder is of changing depth diminishing from left to right after the manner of a wing spar which can be constructed in this way. The frame member in this case is formed of plastic tubing of constant diameter in contrast to that of Figs. 56 and 57. The diminishing depth is accordingly accomplished by progressively widening the form and giving it a correspondingly rising floor with the result that when the plastic tubes are pressed they so form the girder or spar. In addition to the strengthening plates 81 on the top and bottom of the tubular frame, I also, in this instance, add novel truss web reinforcing plates 89. These are metal, wood or other suitable material as in the case of 81, properly coated with plastic or adhesive, and are set up against the plastic tubes 1 and the sides of the form before same is closed, and the pressure process applied within the plastic tubes which then embrace these reinforcements so as to form flush outward walls, due to the flexibility of the plastic tubes, which become structurally united with same while forming corresponding strengthening corrugations on their inside.

In Fig. 64 is shown a modified form of cellular wing spar, box girder, shell or other structural element and method of plastically pressure-forming same. In this case the plastic tubes 1, in any of their various forms, are laid in the trench form with the top and bottom plates 90 of laminated or other construction and of preferred materials and plastic, all after the manner of Fig. 62, with the exception that in this instance the side walls and intermediate web walls between the rows of tubes, are further stiffened by the insertion of the web plates 91, also of laminated or other construction and of wood and/or metal, etc., in combination with the plastic bonding coatings. On the top plate 90, if desired, for more rigid or smoother shaping, is placed a finishing plate 92, properly protected against adhesion to the top reinforcing plate 90. On this plate 92 is laid and brought to bear a pressure bag 78, which, when inflated through its valve controlled connection 79, fills out the form against the closure plate 52 which is locked in place, closing the form and resisting the fluid pressure now applied in the interior plastic tubes 1 and the exterior flexible pressure bag 79, after the manner of Fig. 51. As this is done the vent lines 80 are opened to permit venting of the air and, if desired, they can be vacuum pumped to more readily and completely remove this air from the form. After the plastic forming pressure treatment the closure lid, bag and finishing plate are removed and the now plastic integrated spar or box girder removed. For this purpose, as well as the quicker or better venting of the form, the vacuum and compression line 88 of Fig. 62 may also be incorporated in the form set-up. The spar or girder thus produced, it will be noted, while of light cellular construction, is built to resist bending stresses applied to any of its sides. This will be augmented if a ply with compreg core, as already described, is used for the web and top plate members 90 and 91, with my special plastic bonding faces for uniting with the plastic tubes. For maximum strength, I also employ thin metal sheets (as heat treated chrome alloy steel) for the outermost plastic or adhesive bonded lamination, for all sides of the girder as already described, and these can be designed as shown to completely cover the veneer or other backing, by virtue of the flanged top and bottom members of 90 which particularly strengthen the beam structure from a stress consideration. If desired, further metal reinforcing plates may be inserted in the forms between the horizontal joints of the plastic tubes for or as part of the web plates.

In Fig. 65 is shown a cellular girder or spar structure similar to that of 64, with the vertical reinforcing plates 91 omitted so that the plastic tubes or their wrapped or jacketed walls form the sides of the girder. This structure can be plastically pressure formed either after the manner of Figs. 36, 38, 39, 62, etc., or, instead, the method and form set-up of Fig. 64 may be employed. Fig. 66 indicates a modified form of structures such as shown in Figs. 62, 63, 64, and 65, for example, where the top and bottom stiffening plates 81 or 90, in either single or laminated form, are corrugated or otherwise shaped to extend in two planes for greater strength in these tension and compression members. The pressure bag 78 can apply directly against the stiffener 90 to which its pliable form completely conforms itself, as indicated, or the structure can be pressed with the additional lubricated finishing plate 92 (specially shaped) of Fig. 64, or, instead, without pressure bag after the manner of Fig. 62, in the latter case the closure lid 52 having a corrugated or otherwise shaped augmented face conforming to that of the corrugated or otherwise shaped top plate 90. In Fig. 67 is shown a modified form of web stiffener as applied to cellular plastic structures such as that of Fig. 64. In this instance the stiffener web plates 91 for the interior walls, as noted, are also of corrugated or otherwise deformed construction to give two plane form to these. The plastic tubes embracing these web stiffeners 91 on either side in pressed plastic union become similarly corrugated or shaped to likewise enhance their structural shape and strength. My special compreg construction already described is particularly suited to these web members.

In Figs. 68, 69 and 70 are shown some of my novel forms of combining veneer, plywood, or laminated wood and metal, or other combinations of desirable materials to form stressed skin and beam members in integrated plastic hardened structures. In each case the supporting or shaping form 93 for the plastic structure is slotted, as noted, to create the beam structure. In Fig. 68 plastic impregnated coated (or equivalent) veneer is laid in loose lamination 5, in this case a balanced 3 ply construction, over the form 93 and so as to dip into the beam slots. Next, the plastic tube 1 is laid in the slot and over the laminated material 5 and the upper form member 93a plate or bag, indicated in dotted line, is brought under pressure on same in conjunction with the interior pressure in the plastic tube 1 in any of the modifications of method of forming which I employ and which will subsequently be still more fully disclosed. The plastic tube in expanding or being compressed into the beam slot tends to draw the veneer or sheet laminations 5 tight and remove surface wrinkles thereby. The plastic tube is also preferably one of my forms with wrapping or topping of the veneer or whatever sheet material is used for the surface of the sheathing similar to Figs. 5, 7, 10, 11, etc., that after pressing, a continuous homogeneous top is presented and this preferably smoothly surfaced with plastic from coating or plastic bond sheets or films which are placed on top in the forms.

In Fig. 69, a similarly formed and plastically bonded structure is provided with the metal exterior sheathings 94, formed preferably of thin heat-treated chrome steel alloy or other high tensile metal sheet and with a veneer or plywood interior backing wall 95 which, with the plastic tube 1, form the core of the projecting beam which the exterior metal soffit sheathing 94 is shaped to. The top of the plastic tube or its reinforcing wrappings or coverings, as are employed at will in any of my various ways, are covered by the upper metal exterior sheathing 94 extending over same. More than one plastic tube may be used in juxtaposition to form and fill out the beam core. This assemblage in this and similar varied arrangements possible, plastically integrated under pressure as before described, provides a novel and remarkably strong stressed skin structure for aircraft, boat, car and other construction providing, as it does, strong metal skins spaced apart by light depth providing plastic bonded veneer members and cellular beams. Veneer or fabric or other materials with the plastic impregnating and bonding agents may of course be substituted for the metal sheets 94 when so desired.

Fig. 70 presents a further modified structure similar to that of Fig. 68, being built in the same way with the exception that the chamber slot for receiving the beam has plies or laminations 96 of wood or other combined materials, with the necessary bonding plastic packed into the beam slot on the loose veneer or equivalent sheets 5 which are loosely laid in the form prior thereto, in lieu of the plastic tube of Fig. 68, when the plastic tube element is not available or desired. The assembled structure is then plastically united and hardened with only exterior pressure brought to bear on the forming members (dotted lines) 93a or 93 or both, embracing same. The forms, and other operative details for the Figs. 68, 69 and 70 are similar to those already illustrated and described or those which follow.

In Figs. 71 and 72 are shown a special modification of the plastic tubes 1 wherein the walls are crimped, pleated or corrugated to provide extra bending flexibility to permit the tubes, when so wanted, to best adapt themselves to all manner of curves and sharp turns in any direction in their structural assemblage. The pleating or crimping can extend continuously the length of the tubing as indicated in the left hand section of Fig. 72, or, it can be located at spaced apart and predetermined intervals and lengths as indicated in the right hand section of same. It will be recognized that these crimped or pelated walls can expand or contract in any direction in turning, coiling or expanding the tube in any direction preliminary to forming the cellular plastic structure. These tube walls may be of any materials or construction similar to those heretofore described, etc. The inner wall 3 of suitable fluid-proof or tight character is preferably a coating or impregnation on the structural wall 2 but can instead be an independent wall separate or attached to the wall 2 as conditions may in some cases dictate. The structural wall 2 is preferably of fabric but for economic considerations where permissible, it can be of suitable paper, rag or wood pulp or other material and with plastic coating or impregnation or a combination of these with fabric or the like and all of these can be combined with plastic treated veneer wrappings, etc. The walls of these tubes, as in the case of the others described herein, can be formed from sheet material with any material with any desired type of joining (not shown) or, as in the case of fabric, can be made seamless, all as before set forth. Also, as indicated in Fig. 73, the plastic tubes instead of being formed so as to naturally expand or fill out in circular cross section, can be formed with a naturally rectangular shape with accordion pleated sides after the manner of a camera or other expanding bellows and also with stiffeners of veneer, plywood or other material (not shown) included within the laminated pleat walls.

Fig. 74 indicates the simplest wall structure of the pleated tube wall form with the inner fluid-tight lining 3, the structural wall 2 and the plastic wall or coating thereon, P. In the left-hand portion of the figure the structural wall 2 is paper or other unwoven material of any suitable nature and preferably formed in a seamed tube, while in the right-hand portion of the figure the wall 2 is of fabric or woven material which can be either seamless or seamed as preferred.

In Fig. 75 are shown more numerous wall laminations which can be greatly varied at will as to number, materials and combination of same. Thus, in the left-hand portion is shown a wall with the fluid protective member 3, next a fabric wall 2a with plastic 2b, fabric 2c, plastic 2d, fabric 2e and plastic 2f in order. In the right-hand section is shown a similar construction of fluid-proof wall 3, fabric 2a, plastic 2b, paper 2c, plastic 2d, paper 2e and plastic 2f. Veneer may be substituted for various of these laminations, as desired, and these plastic tubes are also combined with any of the jackets of veneer strips or sheets or other materials shown elsewhere herein.

In Fig. 76 is shown how the pleated walls of adjacent plastic tubes, when placed in juxtaposition and pressure treated in the forms, tend to adjust and conform themselves to each other to form strong corrugated web walls within the hardened plastic structure.

In Fig. 77 is shown a novel form of my plastic tube structure for a novel and special method of pressure forming and for certain special purposes. This can be made in small diameter tubes or similarly in larger tubular structures forming cylindrical bodies such as fuselages, boat and car bodies, etc. One of the particular features of this construction is that the plastic tube 1 has an outer fluid-tight wall 97 in addition to the inner fluid-tight wall 3 and between these are sandwiched the plastic coated wall 2 with as many plastic coated laminations of veneer and/or other reinforcements as needed. The outer and inner fluid-tight walls 97 and 3, are hermetically joined and sealed, after the manner indicated, at both ends of the tubular structure which can be a straight tube or one of varying diameter or egg shaped, etc. At one or both ends (as well as at any other desired points) the interior and fluid-tight wall chamber, generally of loosely laminated assembled wrappings or windings or jackets with adequate plastic bonding material interposed throughout, has an air vent 98 as noted. The tube or cylinder so arranged is placed in a fluid-tight enclosing pressure chamber 99 so that the fluid 100 preferably water when the nature of the plastic permits, completely surrounds the tube inside and out (and completely fills the chamber 99 if hydraulic pressure is subsequently used). The air is first exhausted through the outlets 98 so as to produce a vacuum within the wall of the tube, and/or the outlets 98 are connected through the chamber wall to the outside by non-compressible connections indicated by dotted lines 101, so that air in the interior of the tube wall can escape and be forced out when pressure is applied through the medium of the fluid in the chamber. With a water filling 100 of the chamber, and, at the plastic curing temperature, hydraulic pressure is preferably applied through the intake 102 and this can be raised to any pressure which the chamber will withstand, it being borne in mind that the greatest plastic strengths are developed by the highest pressures. The water, or whatever pressure fluid is employed, now presses the walls of the tube from both its outside and inside exteriors, causing the interior layers of plastic treated materials to be compressed into a hard structural unit, the pressure fluid being heated, if necessary, to the proper curing temperature. The completed tubular structural unit is then removed from the pressure chamber. If, before the pressure treatment, the wall of the tube is not resilient and self-sustaining so as to hold its intended or uncollapsed shape, I correct this difficulty and preferably by having the united and sealed inner and outer tube wall ends at both ends of the tube lock into a housing fluid-tight wall connection forming an outlet or intake through the pressure chamber wall (after the manner of the manifold tube connections of Figs. 46 and 47 or subsequent Fig. 104). I then introduce, through such valve intake, light fluid pressure inside the tube (which is now not connected with the fluid outside the tube), so as to fully expand the tube to its proper shape but not rupture same. Following this expansion the exterior fluid pressure is introduced about the tube and the laminated tube wall pressed between these two pressures at any desired poundage, etc., to complete the hardening of the tube structure. In doing this, if desired, the fluid pressure on the inside of the tube may be kept just slightly above that of the outside so as to keep the tube properly expanded but not enough to bring any rupturing pressure to bear. As already stated, the interior wall sandwiched between the outer and inner fluid-proof walls, may be of any desired plastic or plastic bonded construction. In this instance, the tube shown in Fig. 77 has the inner fluid-proof wall or coating 3 on a fabric wall 2 (seamless or seamed) coated or impregnated, etc., with plastic P, then wrapped or jacketed with veneer 2v followed by a wrapping of my tensile fibre plastic bonding film 27 of the type used in Figs. 34 and 35 (and with the fibres 28, preferably on both surfaces of the film sheet 27), then another wrapping or jacket of veneer 2vv, followed by plastic coating P and the outer fabric wall 2f and the outer fluid-proof coating or wall 97 with a sealed fluid-tight joint 4 (lapped or lock jointed as may be necessary) or seamless. This structural arrangement can, of course, be greatly varied and some adaptations for larger and cellular wall constructions will later be noted.

In Figs. 78 and 79 are shown how a single continuous plastic tube may be coiled in mat formation 103 so as to form a large two wing or other flat section with a tube outlet 103a at one end and intake 103b at the other for the fluid inflation or pressure treatment of the entire plastic bonded structure. The coiling starts with the intake and at 103a and terminates at the outlet end 103b, being laid in the shallow curbed (41) or trench forms of the type already shown. To secure a flush tube termination the coiling can be offset at the starting point so as to end up as indicated in Fig. 78a. Otherwise the tube terminal 103b can be cut off flush as indicated by dotted line 103c in Fig. 78. The mat coil 103 can also be formed in a warped rather than a flat plane, if wanted for a wing design of that nature, as indicated by the dotted lines 103d of Fig. 79 and can also be curved or angled in plan to any desired shape in a manner similar to the dotted lines 103e, shown in Fig. 78. Jacket and web reinforcements can be added to and between the plastic tubes of the coil as wanted and after the manner of Figs. 42, 63, etc., as wanted and for light cellular shells of great strength, I also provide under and over the coiled tubing a lattice 104 of plastic impregnated or coated veneers in any desired ply, or, instead, of thin metal strips as indicated, or of other desired material or combination of materials along with the necessary plastic bonding agents. The lattice strips may be like those of Figs. 3 and also with compreg core as described, or like Figs. 27 or 28, etc. They may also be interwoven, or for greater rapidity and economy of production, superimposed like those of Figs. 6 and 78. If of metal, preferably heat treated chrome alloy steel strip, they can, if desired, be spot welded at their crossing contact points, and when combined with the plastic tube mat 103, are properly coated with suitable adhesive or plastic for bonding with same in the pressure and temperature treatment in the final hardening and integrating of the entire assembled structure within the containing form. It should be noted that the plastic tubing 1 is designed by virtue of its pliability, excess size, etc., to intrude between the lattice interstices so as, in combination with the plastic, to form flush outer surfaces on the mat section 103 and correspondingly interior strengthening corrugations within the plastic tubes. Also, if desired, further coverings or sheathings 5, as fabric, veneer and/or plastic sheet, etc., may be laid in the forms prior to the pressure treatment to cover, conceal and further strengthen the lattice shell. This mat coil 103 is particularly suitable for glider as well as airplane wing construction and, if it is desired to have the opposite wings of separate construction, the mat coil is cut in two across the center, after forming on the dotted line C—C. Long panel sections of the type of Fig. 36 may be mat coiled in this way and extend in the same curb forms as of Figs. 36, 37, 38, etc. for hundreds of feet in length and then be integrated in the closed form with the interior pressure treatment through the single intake 103a and outlet 103b and then be cut up into panel sections, as in Fig. 36.

In Fig. 80 is shown how the mat form 103 of Fig. 78 may be made to conform to a fuselage body 105 (the latter also preferably of coiled formation, and as will be later developed), by having a curved central section fitting the fuselage on which it is later superimposed and attached making a very strong construction. A similarly formed mat 103e (indicated in dotted line) in reverse position, can be attached oppositely to the bottom of the fuselage in constructing a biplane form if wanted. In Figs. 81, 82 and 83 are shown cross sections of these mat coil wings or structural sections 103, of Figs. 78, etc., indicating how they may be made flat, curved and/or of changing thickness (the latter as in Fig. 83 being accomplished by spreading the spacing of a constant diameter plastic tube in the coiling and correspondingly converging the opposing platen forms so as to narrow and taper the thickness of the wing by a changing form depth, as desired, an important feature used as desired throughout my plastic tube and method constructions).

In Figs. 84 and 85 is indicated how a wing and fuselage construction can be arranged by uniting two upper and lower separately formed wing shells 103 and 103e similar to Fig. 80 and combining same with a metal, plastic or other formed leading and trailing edge sections 106 and 107, as in Fig. 85, with suitable joining connections (not shown), so as to form a strong tubular shelled wing in monocoque construction. The two sections are also joined at the end by a preformed housing 107a, receiving and suitably connected to the ends of 103 and 103e and forming the wing tip of metal plastic or other desired material. The two wing sections 103 and 103e embrace the fuselage 105, as noted, and are joined to same by suitable connections as, for example, connection bolts 109 which connect through plates 108 and connecting insert sleeves which are laid in the forms in proper position in the assemblage of the plastic tubes, etc., and with plastic or adhesive coatings so as to be subsequently integrally embraced by the hardened plastic tube walls shaped around same and with the plates flush with the exterior surfaces and the insert bolt sleeves held between the tube walls (after the manner of Fig. 52 and the later Fig. 142, etc.). If this joining is to be of permanent nature, the contacting surfaces of the wings 103 and 103e with those of the fuselage 105 are also coated with suitable plastic or adhesive prior to drawing same together with the connection bolts (or substitute rivets or equivalent).

In Figs. 86, 87 and 88 are shown another modified form of reinforcing plastic tube jackets of veneer, plywood or other strip material, with plastic coatings or the like, designed for quick economical mass production and easy attachment or wrapping on the plastic tubes. The holding strip 110, of veneer, plywood, fabric or tensile material, has the veneer or ply strips 111 and 112 fastened to same by fasteners or clinchers 113 at spaced apart intervals and at a diagonal angle as indicated. The band so formed and covered or impregnated with plastic bonding material is wound around the plastic tube 1 so that the tube is shingled on four sides by the veneer or tensile material in loose overlapping relation. When the plastic tubes, thus wrapped, are subsequently pressed in the forms by my interior pressure, the cellular walls so formed, have a veneer shell with strong diagonal ribbing formed by the veneer overlaps and likewise the strip 110, while the veneers 111 and 112 are so spaced to repeat in symmetrical alignment on four sides of the tube so that when the tubes are pressed down and together in the form they form the veneer tube walls after the manner of Figs. 30, 32, etc. These have a flush outer surface due to the pliability of the plastic tubes pressing the veneer laps flush against the opposed form surface while forming any unavoidably resulting corrugations on the interior of the plastic tube rather than on the exterior shell surface by virtue of the interior fluid pressure, etc. The plastic tube with a jacketing of this nature and particularly with the crimped or pleated walls of the type of Figs. 71, 72 and 73, it will also be noted, is readily adapted to curved shapes in placing same in the assemblage and molding forms.

In Fig. 89 is indicated an alternate method of winding this band jacket on the plastic tube by passing the carrying band 110 over instead of under the shingle members 111 and 112 in contrast to the winding of Fig. 87.

In Figs. 90 and 91 is indicated a wing and fuselage construction similar to that of Fig. 84 as applied to a large four motored plane having the motors mounted in nacelles in each wing. The plastic tube sections forming the wing shells 103 and 103e in this case are formed with curved areas so as to conform to the fuselage 105 and similarly the motor nacelles 114, all of which is accomplished by correspondingly shaping the forms within which the mat coiled plastic tubing is laid and pressure treated. The fuselage 105, is of coiled plastic tube construction, the forming of which will be subsequently more fully illustrated. This can be formed in a continuous body length or as indicated in Fig. 92, it can instead be in two sections joined together centrally of the wing shells which embrace same on the exterior of the fuselage by bolting or other suitable connections and/or plastic gluing, producing an exceptionally strong reinforced joining. These exteriorly embracing wing members 103 and 103e, partially encircling the fuselage, may be as in Fig. 91, thus forming a slightly raised but not objectional exterior offset, but if a flush exterior is preferred, I coil this portion of the fuselage for receiving the embracing wing shells in corresponding countersunk form so that, as shown in Fig. 92, the enveloping wings lie flush in this countersinking, and this can be done whether the fuselage is in joined sections, as in Fig. 92, or in continuous length as contemplated in the fuselage of Fig. 91. The fuselage, as noted in Fig. 91, has the shell formed by coiled plastic tubing and overlaid or wrapped with the strip lattice reinforcement 104, similarly to that of the wing members and as in Fig. 78, and this, both interiorly and exteriorly, or merely the latter, as desired. Likewise, if so wanted, this can in turn be covered with plastic coated and bonded veneer or plywood 5, interiorly and exteriorly, or just the one facing. The nacelles 114 are also preferably formed of my coiled plastic tubing as indicated (which house the motors 114a) but may also be of metal or other plastic construction.

Fig. 93 shows a section of the typical fuselage or wing plastic tube formed shell with the flush lattice reinforcing 104 inside and out and having (in the right hand portion of the figure), additionally, the veneer or plywood covering 5, for which sheet metal or fabric or fibrous film sheet, etc., can likewise be used.

Fig. 94 shows the shell construction similar to Fig. 93 with both inner and outer surfaces of the cellular wall shell having the sheathing 5 of Fig. 93 in addition to the lattice 104. Fig. 95 shows a similar wall shell but with a double plastic tube coiling forming a two tier shell with the sheathing material 5 and the lattice 104 included not only interiorly and exteriorly but also inserted between the two coil layers which is, of course, done in assemblage of the coiling, etc., in the forms prior to the plastic pressure treatment.

Fig. 96 shows a two tier plastic tube shell similar to that of Fig. 95 with the omission, however, of the veneer or skin wall and lattice between the two tiers but retaining them in the exterior and interior surfaces as before, and formed, in this case, with an exterior metal sheathing 5m plastically joined to the veneer or ply backing 5w. In this instance, furthermore, the lattice, instead of being formed by strips of solid or laminated material, is formed of plastic tubes 104a of small diameter and of any form of reinforced wall desired, which are coiled in the opposite diagonal directions and in spaced apart lattice relationship over the larger plastic tube walls, the same as the solid lattice strips in Fig. 91, etc. In the plastic pressure hardening, these tubes 104a are inflated and hardened with the interior pressure the same as, and simultaneously with, the other plastic tubes 1 forming the cellular walls of the shell.

In Figs. 97 and 98 are shown beam members formed integral with the fuselage (or other) cellular shell by means of plastic tubes which are laid in the forms with beam grooves to receive same under the plastic tubes overlaid on same and later joined therewith by plastic bonding under simultaneous interior pressure treatment. By arranging the beam tubes so as project to a greater or less degree, as desired, up into the plastic tube shell, a strong bond is provided with the plastic integrated shell structure as indicated.

In Fig. 97 is shown a longitudinal beam or stringer member which runs longitudinally of the coiled fuselage shell at predetermined spaced apart intervals. For an extra strong metal sheathed shell I first place the adhesively coated inner metal 94, as heat treated chrome steel alloy, on the form and shape to conform to the beam slots as in Figs. 68 and 69. The plastic tubing coiled over this comes to form the compression member of the cellular projecting beam to which it becomes plastically united by the pressure treatment of all the tubes, while the adhesively coated outer metal sheathing 94, laid on top of the coiled plastic tubes in the assembling in the form, greatly enhances the strength of this shell and compression (or tension) member.

In Fig. 98 is shown an analogous structure with the difference that the pendant cellular beam runs crosswise of the fuselage forming ribbing parallel with the coiled or shell tubing instead of crosswise of same. In this figure is shown, also, a plastic bonded wood veneer or other backing 95 and how the inner metal sheathing 94, may be formed with an out-turned flange 94a both to reinforce the beam and to provide means of attachment for a metal edged or other formed bulkhead 115 (or similarly other attached members) by spot-welding (or other connections) at S—W, as indicated, after the fuselage shell has been pressure formed and removed from the forms.

Figs. 99 and 99a show how I reinforce my cellular plastic shells, when wanted, by stepped up lamination of sheathing or sheet reinforcement coincident with increasing stress requirements. Thus, as in a wing shell, the outer sheathing 5a extends, for example, the length of the wing; further back the second sheathing, 5b, is added and again further back, the third sheathing 5c, and so on. Because of the pliability of the plastic tubing which can be compacted and distorted to conform to the added thickness of the outer shell occasioned by these additional sheathing or reinforcement insertions, my construction with the inner pressure for the plastic tube inflation and hardening, produces a smooth even exterior, while any offsets created by the stepped up shell thickness appear on the interior of the tube as indicated. For avoiding abrupt and objectionable changes in the thickness and consequent stress resistance of the shell, so stepped up, I preferably sawtooth or otherwise graduate the stress resistance at the border of the added sheathing members when same are sufficiently rigid to recommend this, and this after the manner of the metal members 199 subsequently shown in Fig. 141.

In Figs. 100, 101 and 102 are shown further modified forms for the fuselage, wing and other shells and in multiple tier or laminated plastic tube construction. In Fig. 100 a two tier tube shell, coiled or otherwise, has the tubes overlaid with staggered joints, as previously indicated (in Fig. 39), so developing a strong bond between them as well as pressing the tubes into a strong compression shape which tend to interlock and round into each other at the vertical joints. In this shell, too, metal wire wrappings 116 are employed on the inner and outer surfaces of the shell in lieu of the band lattices 104 of the previous Figs. 78, 91, etc. These woven or welded wire members, in any desired mesh, are laid in the forms under and over the plastic tube layers in the same way as the lattice strip sheets and similarly embraced by the plastic tubes which under pressure are forced into the mesh openings so as to produce a flush outer surface and corrugated inner walls in the tubes as indicated.

Fig. 101 shows a similar shell structure with plastic veneer, ply, or other sheet sheathing 5, single or laminated, added in the forms with the plastic binding and finishing coatings and laid over the wire mesh 116. Also, in this instance the wire mesh 116 is also interlaid between the upper and lower plastic tube tiers, embedding in same as noted. The superimposed tubes in this shell are in vertical alignment instead of staggered as in Fig. 100 producing through vertical as well as horizontal walls which can be further reinforced with insert material as already illustrated. In addition, the wire mesh 116 on the two outer faces of the cellular wall is hooked, tied or locked together by the wire spacers 116a which are placed between the rows of plastic tubes at the desired spaced apart intervals to serve a threefold purpose: First, they serve as a reinforcement; second, they serve as spacers determining automatically the thickness of the cellular shell (in connection with which they are made of the necessary varying lengths where the cellular shell is of changing thickness); third, they form, with the opposed wire sheathings 116, a holding cage, so to speak, within which the enclosed plastic tubes 1 are compressed and retained when the latter are expanded by the interior hardening fluid pressure. In this latter capacity the wires 116a, in conjunction with those of 116, can serve as a holding form as well as a structural reinforcement when the wire mesh of 116 is sufficiently fine and the pressure not too high. With higher pressure and the larger meshes, the wire can be supplemented by auxiliary holding forms or bags or membrane pressure which, however, are not required to sustain the entire pressure loads because of these wire holding members.

In Fig. 102 is indicated how the two tier plastic tube shell of the coiled fuselage similar to 105 of Fig. 91, as well as other allied structures can be reinforced with the rib inserts 65 or 65a placed between the adjacent tubes at suitably spaced apart points or in every instance, as the case may be. This shell, as shown, is further provided with the outer metal sheathings 94, backed with the plastic bonded veneer, plywood, or other plastic reinforced or plastic backings 95. The plastic bonded reinforced web ribs inserted in the forms between the plastic tubes 1 may be solid as 65 or in any open truss form design suggested by 65a and equivalents in Figs. 42 and 43. When wanted these reinforcing inserts 65 or 65a may extend outward of the shell (after the manner of 65a) and so both increase the strength as well as provide means of connection to other frame or shell members, as for example fuselage bulkhead 115 which can be spot-welded to same at S—W, or otherwise bolted, riveted or otherwise suitably joined.

In Figs. 103 and 104 is indicated one form of my method for forming my plastic tube fuselages 105 of the type of Fig. 91 and in one of my unique pressure trench forming chambers. I employ a variety of form structures for the core of the fuselage on which to coil or lay the plastic tubing, as may seem preferable for the case in hand, but in this particular one I form my interior body form of the fuselage by building a light hollow cylindrical shell 117 shaped to the intended lines of the fuselage and braced with backing ribs 120 on the axis 118 which has bearings 119 at either end in the supporting chamber cross wall 121 so that this hollow core form can be revolved at will (and by motor or other power—not shown) and thus greatly facilitate the coiling of the plastic tube 1 on same as indicated by dotted line 122. The rigid core form 117 can be built of relatively light construction and, so as not to heavily load the supporting shaft 118 and to make this possible and still have the hollow core sustain heavy surface pressures in the plastic pressure treatment of the plastic tubular shell mounted on same, the core is constructed fluid-tight and with a valve controlled fluid injection and circulating line 123 with connecting vents 124 which permit the filling of all the core chambers 125 which interconnect with openings as 126 with sustaining pressure fluid as compressed air, which is turned on at one end through the valve controlled line 123, connected up for that purpose, and vented by a similar outlet to the line at the other end of the form so that the fluid can be circulated through heaters (not shown) if the nature of the plastic bonding agent or agents employed in the shell setup require an elevated temperature (as is more generally the case) which can be easily maintained by these circulating provisions. Where the circulation is not required it, of course, is not necessary to have more than one opening to the fluid pressure line 123 through which the pressure can be delivered, maintained and raised or lowered at will. This core form 117 can be built of light construction of cement or reinforced concrete, preferably wire lath or expanded metal built up with gunnite cement with a cement gun. Light metal construction with properly reinforced sheet metal shell can also be used. In so much as the shape of the core structure is supported against exterior pressure by interior fluid pressure, this light construction is possible and the fluid tight form, so employed, filled with compressed air or steam or other suitable fluid for pressure. On this form 117, is coiled the plastic tubing 1 with any jacketing or reinforcing and inserts desired, as already outlined, the tube starting at one end as in Fig. 104 against the end form flange 127 and by revolving the form with the tubing fed from reels above the form core 117 is properly covered with the continuous plastic tube which terminates against another flange (like 127, not shown), at the other extremity of the core form where the outlet end of the tube (not shown) is received and housed in connection with a valve controlled outlet which is similar throughout to the arrangement of the intake end 128 where the plastic tube 1 is received, through pressure protection connection 128a, in the port hole 129 in the wall 121 and held in sealed position by the injected wedge nozzle 131 and against the cushioning 132, the nozzle 131 being on the injection or intake valve controlled line 130. When the plastic tube 1 is completely coiled in place with all plastically treated members of the intended assemblage in position, the final outside sheathing 5 of the fuselage shell, if also added, is laid wrapped or coiled on and properly anchored on the coiled tubing by band ties or any other suitable or necessary holding means (not shown). It should be particularly noted that the sheathing 5, when of wood veneer or ply or the like can be coiled on in a long continuous plastic treated or coated strip (or strips fastened end to end to become continuous) by the same method employed in coiling on the plastic tubing and as indicated in the lower left-hand fragment of Fig. 104. Where an inner as well as an outer sheathing 5 is employed, as in Fig. 94 for example, the inner sheathing strip of veneer, ply or any other tensile material used for the sheathing, may be similarly coiled in place on the core form which can be revolved to receive same when so arranged. The lattice strip members themselves, as 104 of Fig. 95 or the corresponding tubes 104a of Fig. 96 may be similarly placed by this coiling method and the revolving of the core form. In the case of the lattice 104, however, it will generally be found more expeditious and economical to place these in large pre-fabricated sections, and likewise when preferred the veneer or ply sheathing can be so applied in large sections. If the sheathing includes the outer wall of sheet metal (as 94 in Fig. 102), shaped or held to the contour lines of the fuselage and preferably mounted over the plastic tube coiling with the latter lightly inflated, as with air, from the intake line 130 so that the tubing is properly shaped out in position, the plastic coated assemblage is now ready for the final polymerizing or plastic hardening pressure treatment. A preformed sheathing of plastic ply wood sheets, and more particularly the compreg ply already described, having adequate stiffness and with interior plastic coating for interior bonding with the plastic tubes, etc., may serve in the same way, as will any other form of sheet material of sufficient stiffness. In such stiffness is not provided in the exterior sheet wrapping of the coiled fuselage, however, I then add temporary and removable sheeting as sheet metal (otherwise omitted) properly shaped and lubricated or otherwise protected against adherence to the plastic formed fuselage, and this additional form sheet is indicated as 133 in Fig. 103. With either arrangement the fuselage set-up is now ready for the pressure treatment. The pressure chamber, as shown, is trench formed in the factory floor where the interior pressure is in part resisted by the mass ground 51a resistance formed solidly against the concrete trench walls 41 and floor 51. At the ends, the chamber is closed by the reinforced concrete cross walls 121 which set in place in the trench at either end of the fuselage with ceiling cushioning 59 about its edges after the manner of Fig. 104. The opposing trench walls, 41, have attached thereto fluid-tight diaphragm sheets 134, extending the length thereof on either side of the chamber and preferably housed in a chamfered recess in the walls 41 as indicated, so that when deflated and sucked by vacuum against the wall 41 (as indicated by dotted lines 134) to which they are hermetically attached along their edges 135, they are out of the way of the workmen setting up the fuselage assemblage in the pit and do not have to be handled in any way as their inflation and deflation is brought about automatically through the valve controlled pressure lines which supply the pressure against the diaphragms or deflate them to a vacuum as required. An important feature of my diaphragms is that their surface area of membrane is such as to completely fill, without completely stretching or extending same (so as to threaten their rupture), more than or at least fully half the void space within the pressure chamber not occupied by the filled fuselage form and assemblage. The diaphragms are themselves formed of a suitably flexible fluid-tight material which will readily and closely adapt itself to any form it is pressed against by the fluid pressure from within, so that when expanded by pressure from the intakes 136 they press tightly with equal pressure over the entire surface of the fuselage sheathing 5 or temporary forming cover 133 to which they closely conform themselves. The diaphragm can be, but is not necessarily, of an elastic nature as it relies primarily not on elastic stretching but on otherwise superfluous volume or area of its material for filling the intended space which it is to occupy when in expanded position. In doing this, it will be noted that the diaphragms expanding from the side walls come to meet and press against each other, in this instance on the central axis of the chamber, and press throughout against the floor 51 and the concrete closure lid 52 (or lids, according to the trench form length as in the case of Fig. 36, etc.). The closure lids 52 are swung into place and locked after the assemblage on the form is completed, as previously described, prior to the diaphragm inflation. The chamber is provided with means for air escape as the diaphragm members are inflated, forcing the air out of the chamber. In Fig. 103 this is taken care of by valve controlled lines 137 connecting with mesh covered channel troughs 138 which are located longitudinally of the floor and closure lid or lids as indicated, and vent the air from the chamber as the opposing diaphragms are pressed toward each other by the pressure from within, to meet in the center of the chamber over the fuselage assemblage which they embrace as indicated. This pressure from without presses and holds the plastic tubes in their properly squashed or pressed position while the pressure within the tubes from the line 130 equalizes same so that the pressure is applied on both sides of all the plastic or plastic bonded walls and materials imprisoned between the opposing pressures. In practise it may be found desirable sometimes to differentiate the opposing interior and exterior fluid pressure to a slight degree so that the expansion or contraction between the forming surfaces may be extended one way or the other to secure desired forming results and this is easily accomplished by change of pressures between the diaphragm lines 136 and the plastic tube line 130. Where special heat for proper curing of the plastic in the form is required, as distinct from cold set plastics, this heat is very advantageously applied through the medium of the fluid filling or circulating through the plastic tubes as already brought out. If desired, however, the fuselage or other assembled structure can also be heated from without by likewise providing heated fluid within the pressure diaphragms. Thus common plastic polymerizing temperatures of 160 or 260 degrees F. are easily provided by hot air, water or steam pressure either from within or also without the cellular structure, and this applied for a brief period forms the completely bonded and integrated materials into a hardened fuselage or similar structure which is then ready for removal from the forms. In the present case this next procedure is slightly different from that with a molded structure which does not surround a fixed form as in the present fuselage set-up. To remove the fuselage from the enclosed core form 117 the molded shell is now sawed longitudinally along the top and bottom on dotted lines 139 (the saw being cushioned on the woodstrips 139a embedded in the concrete form for that purpose) and the two severed halves of the fuselage are then readily lifted off the revolvable form 117. Prior to this, of course, the fluid or pressure has been withdrawn from the plastic tube system and likewise from within the diaphragms, the latter being thereby vacuumed back into the receiving recesses of walls 41 and out of the way, giving free working access to the pressure chamber which is the work and assemblage room as well, throughout the construction. The two halves of the fuselage are now, after removal from the chamber, rejoined. Because of their registering tubular shell, this is easily and securely accomplished by inserting dowels (later described in Figs. 108 and 109) in the tube ends secured with plastic or other suitable adhesive of the cold setting variety. The fuselage is thus united with inseparable joints preferably disposed along the top and bottom central axis plane of same as indicated.

In Figs. 105, 106, and 107 are indicated a novel way of coiling and framing the fuselage shell of my plastic tube coiled variety, also applicable to any form or shape of tubular or cylindrical body. As spacers and position holders for the coiled plastic tubing as well as reinforcing structural framing for the fuselage body, I provide inner and outer longitudinal plates 140 and 141, running the length of the fuselage (or section of same being formed, if formed in more than one section as already described). These are strutted apart by stiffeners or struts 142, on properly spaced apart centers so as to either come between each turn of the plastic tube coiling or between those located at predetermined intervals after the manner of Fig. 112. (More details of this arrangement will be seen in connection with Figs. 117 to 119 inclusive.) The longitudinal frames of a truss type, so formed, can be located at any desired spacing around the fuselage shell but normally, and as shown in these figures, will be located on the opposed vertical and horizontal axes. In preferred arrangement the struts 142 are joined to the base or under plates 140, but the outer plates 141 are not placed on and joined to these struts until after the plastic tubes have been coiled in place over the plates 140 and between the struts 142. After this coiling has been completed, the top plates 141 are laid on the top of the struts and attached thereto, forming the longitudinal box trusses through which the rows of plastic tubing pass and later become plastically united with, in an integrated structure of remarkable strength and lightness. The longitudinal structure of plates 140 and 141 may be further braced, if desired and as shown, by similar cross plates 143 and 144 which can also be strutted apart by a rib (indicated by dotted line 145) running lengthwise of same and attached to the plates and sandwiched between the tube coils running inside and along this cross rib plate. The same conventional plastic tube coiling starting with the intake tube end 129 may now be employed in forming the fuselage shell as in Figs. 103 and 104 and the right-hand section of Fig. 105. The pitch of this conventional coiling can be just slightly off the vertical, sufficiently to advance one tubing space in a complete revolution, but it also can be arranged vertically or at right angle to the axis of the fuselage or tubular member if advantage is taken of my offset on the starting of the coiling, as indicated in Fig. 78a. The coiling can also have any desired pitch as wanted and where particular resistance to shear and torsion is preferred, the pitch can be at 45 degrees throughout although not quite as convenient an angle in the revolving and coiling of the core form. For exceptional resistance to torsion and shear, so important in airplane construction, I alternately employ a novel coil form as indicated in the left-hand section of Fig. 105, and where a plural tube tier shell is wanted, two coilings can also be combined, imposing one upon the other. A diagram plan of the layout of my novel coil winding is shown in Fig. 107, the plastic tube after passing between the top strut separators 142, passes diagonally, normally at a 45 degree angle, to the side struts 142 and through them back at an angle of 45 degrees to the bottom struts 142, then through them and forward at 45 degrees to the opposite side struts 142 and through them and back at 45 degrees to the top strut, so completing a complete coil turn, the repetition of which is continued by passing through the next adjacent top strut passage and continuing on repeatedly in this way until the fuselage form is covered with this continuous plastic tube winding. In two tier construction, as indicated in the left-hand section of Fig. 105, one tier can have the 45 degree angled tubing passing over the under tier which underlies same at the opposite 45 degree angle, fortifying against shear stresses in either direction, as indicated. In three tier construction this again can be combined with a tier of the regular transverse coiling as shown in the right-hand section of Fig. 105 and this can be either underlaid or overlaid or sandwiched between the angled coiling. The shell can be laminated indefinitely with repeated layers in any desired combinations, so building up for large size structures light strong shell walls of great depth and strength and with relatively small weight and quantity of the plastic and/or plastic bonded materials. This same novel system of coiling, etc., may be likewise employed for wings and other structural elements. By forming the plates 140, 141, 143, 144, the struts 142 and the web ribs 145 of heat treated chrome alloy steel or other strong metal and spot-welding, riveting or otherwise rigidly joining these members together, a strong structural framework is provided for the fuselage, or whatever the structure may be, and this, becoming plastically integrated with the cellular shell formed by the plastic tubing and reinforcements, accomplishes the ideal in monocoque or other construction. In lieu of metal, these structural frame members may similarly be formed of my compreg ply or other plywood or veneer construction with plastic bonding, impregnation, etc., and other desirable materials may be similarly used. When top plates 141 are laid on the struts 142 after the plastic tube coiling has been placed between the latter, the plates 142, if chrome alloy steel or other suitable metal, can be spot-welded or otherwise joined to the struts 142 and the so enclosed plastic tubing, pressed in position, becomes, when pressure expanded, flush with the outer surface of the plates. For bonding with the plastic tubes or other covering material the structural frame members are preferably coated with plastic or suitable adhesive. If veneer or plywood or the like is used for the structural plates and struts, these can be temporarily tacked together or held in place after providing plastic coatings, etc., and the permanent structural joining of the parts accomplished in the final pressure treatment which unites and hardens the entire assembled structure in the forms or forming membranes. The ribs 145 between the cross plates 143 and 144 in the right-hand portion of Fig. 105 in the case of the conventional transverse coiling therein may be joined to the cross plates before the tube coiling, as this does not interfere with same and these cross braces are joined by metallic or plastic union, as determined by the materials used, etc., with the longitudinal structural plates. In the case of the left-hand portion of Fig. 105, the ribs 145 are not used between the plates 143 and 144 in view of the special coiling. In that arrangement, struts, similar to 142, only spaced and positioned at a diagonal angle to conform to the angle of the tube coiling, can be used at desired spaced apart points between the plastic tube walls.

Figs. 108 and 109 illustrate how the cellular plastic tube shells, after being sawed in halved sections (as in Fig. 103 on lines 139), can be strongly joined together again with a joint stronger than the shell itself. To do this, I use dowels 146, which can be either solid pins, or, as herein shown, tubular dowels which not only minimize weight but also preserve a continuous hollow circuit within the coiled tubing extending throughout the structure which can have many unique and valuable uses, as will be subsequently noted. The dowels are preferably designed with tapering wall not shown of graduated resistance which is further graduated by serrating the ends, after the manner indicated, so as to avoid deleterious abrupt changes in stress resistance otherwise presented in this reinforced section of the skin shell. The dowels are of reinforced plastic or plastic bonded materials or of metal and are properly coated with plastic or other bonding adhesive and inserted in the oppositely abutting tube ends which are drawn tightly together and the joint set-up. If, in this forming, pressure and/or heat for pressure treating a plastic bonding agent, not of the cold setting variety, is required, this can be supplied through the coil system of the shell and pass through the tubular dowels in the manner of the original pressure treatment.

The continuous interior tubular circuit which is uniquely provided by my coiled plastic tube structures has many novel features, aside from structural, which can be taken advantage of when wanted and particularly in aircraft construction. Thus, by exhausting the air in the interior connected cell structure of the fuselage shell, a vacuum insulated fuselage is obtained suitable for resisting cold or heat as in stratosphere, desert or other flying. On the other hand, if freight transport planes are carrying perishable goods, the entire plastic tube coil system can be, not only vacuumed, but, instead, refrigerated by circulating suitable refrigerating gases or fluid through the tube system connected with circulating pump or connections. On the other hand, as in stratosphere flying, when wanted, the fuselage temperature may be maintained by circulating heating gases or fluids through the tubular shell and for such purpose the exhaust gases from the engines may be circulated with vacuum pumps through the system for heating purposes. By this means, also applied to the cellular system of plastic wings similarly constructed, the icing of same may be prevented without further applied devices or construction. Also the tubular circuits in both wings and fuselage may be taken advantage of for storage of fluid fuel, water, or fluid cargo, or gases for automatically extinguishing fire if the shell is attacked by same. Also when used as a vacuum insulating system, the weight of the plane is correspondingly lightened. These and other advantages are made possible by my unique plastic tube structures not only for airplanes but for boats, cars, and various carriers and structural elements.

In Figs. 110, 111 and 112 are shown modified means of forming my plastic tube cellular structures, such as car bodies as well as fuselages, boat hulls and the like, with the plastic tube assemblages. In Fig. 110, the plastic tubes 1 are extended lengthwise of the tubular structure instead of being coiled transversely as in the previous coil formed fuselages and as in Fig. 111. These longitudinal tubes particularly when forming a straight tubular cylindrical body and with constant diameter tubing, can be laid to any length as in the manner of Fig. 36, etc., a thousand feet long or more if wanted, and then the continuous formed cylinder cut up into shorter lengths as described in connection with Figs. 36, etc. In Fig. 110, transverse frame plates 143 and 144 spaced apart and braced by web struts 142, after the manner of Fig. 112, are set up on spaced apart centers and connected at the four corner points by longitudinal plates 140 and 141 which are attached thereto. The plates 140 and 141 are preferably strutted apart near their edges by longitudinal web ribs 145 which are joined to the plates 140 and 141 so as to form strong box girder frame members or stringers extending the length of the structure and located at the four corners of the tubular structure, a position developing the maximum resistance to bending moments from all sides. The framework so formed is cross braced against shear and torsion by the braces 146 and 147 in each panel of the four sides and these can be both on the inside and outside faces of the cellular wall formed by the plastic tubes 1 as shown, or instead, only on one face. An outside and an inside sheathing skin 5 may also cover the plastic tube assemblage as in previous structures or be omitted as preferred. This, as before, may be of metal, veneer, compreg or plywood, fabric sound or heat insulating board or other desired material, properly coated with plastic or adhesive, and the metal frame members, as chrome steel alloy, may be welded or otherwise joined to each other in addition. In laying the plastic tubes in the frame members detailed in Fig. 112, one or the other plate 143 or 144 is not placed and attached to the struts 142 until the tubes are laid in place between same and then this closing plate is added and secured to the struts at their contact points, preferably by spot-welding in the case of chrome alloy steel, or with suitable tacking or temporary holding means in company with plastic coating in the case of plywood or the like which will become structurally bonded in the final pressure treatment of the entire assemblage. Thus, the outer plate 144 is attached to the struts on the bottom and outer sides when same are set up in the form, while across the top section the inside plate 143 is the one attached. After the plastic tubes are laid on this supporting and spacing frame the closure plate, 143 in the first instance, and 144 in the other are placed on the struts, completing the transverse framing. In the case of the longitudinal plates 140 and 141 and their longitudinally attached web ribs 145, and likewise the inside and outside cross bracing members 146 and 147, the same relative procedure is followed. In the case of the sheathings 5, these can cover the entire surface areas or merely the portions between the metal plates, or a compromise of these two arrangements.

The method of pressure forming of the structure of Fig. 110 and the like may follow several of my modified forms but a very simple application is indicated in connection with Fig. 111. In this related figure the plastic tube shell has the tubing transversely wound through supporting longitudinal corner frames 140—141 after the manner of Figs. 105 and 106, and with or without the cross plates 143 and 144 and the additional braces 146 and 147 (which can also be added in the case of Fig. 105 when wanted), instead of being laid longitudinally as in Fig. 110, but the pressure forming can be the same. In this case the terranean trench form and pressure chamber, in one, is shaped along with the closure lids 52 to form the complete four sides of the body mold, as well as the pressure chamber. Inside of the body assemblage, and before same is closed in, I introduce the flexible fluid-tight bag 148 with valve controlled connection line (one or more) 123, for fluid inflation and interior resistance pressure against the fluid pressure which is introduced throughout the plastic tubes forming the cellular walls, which is done as already described after the manner of Fig. 36, etc., or Figs. 103 and 104, the plastic tubes being connected to manifold, or single intake, or intake and outlet, valve controlled lines, after the manner already set forth. Slightly differential pressures may also be used as between the plastic tubes 1 and the bag 148, being varied one way or the other, if wanted, for controlling the pressure forming and shaping to best advantage as conditions and experience dictate. As in previous cases, heat, when wanted, can also be furnished simply in the plastic tubes or also in the bag 148. The fact that this bag is placed inside the assembled body in contrast to the present-day autoclave procedure wherein the assembled body, however large, long, and extensive, has to be gotten inside the bag, and the fact that by my combined set-up, I pressure form my entire body in a single operation and at high as well as low pressures, constitutes a most important innovation and step forward in quick, economical, and mass production of large plastically bonded or formed cellular and/or tubular structural bodies of a variety of shapes and uses. In extensive mass production moldings of great lengths, these can be cut up in the shorter desired sections and removed from the forming chamber after the previous withdrawal of the pressure fluids, pressure bag (or bags), etc., and removal of the closure lid sections. For convenience for handling and removal where a pressure bag 148 of excessive diameter or length would be required, I employ a plurality of bags laid in juxtaposition, end to end, in shorter lengths and/or in plurality (in any desired number) crosswise of the core chamber, the latter as indicated by dotted lines centrally of the core showing alternately two bags 148a and 148b filling the cross section of the interior forming space, the several bags in all cases having inter or direct connections to the pressure lines 123, etc.

In Fig. 113 is indicated a further modified form and pressure method for forming similar tubular bodies as fuselages, car bodies, etc. In this instance an inner and outer sheathing of metal, as heat treated chrome steel alloy, low carbon steel or any light aircraft metal, enclose the cellular structure to be formed both inside and out and with welded or otherwise strong joining of the metal sheets, and, for the strongest structures formed under the higher pressures, these joints throughout are fluid-tight. In the right-hand section of Fig. 113 is indicated such a structure, the interior and exterior metal wall sheathings, 149 and 150 respectively, are strutted apart and tied together at spaced apart intervals by tie rods, stays or separators 151, which come between the adjacent or contacting walls of the plastic tubes 1, and for which they also serve as spacers in assemblage, which are coiled on the inner metal sheathing and drum 149, formed thereby, in one or more tiers or laminations, as many as desired, and, in this case as shown, a two tier shell. After the plastic coiling is in place, the outer metal shell 150 is laid in place, joined, and connected to the separators 151. Where additional longitudinal strength is desired, opposing longitudinal plates 152 of chrome alloy steel or other desired metal are interposed between the separators 151 and the metal walls 149 and 150, as indicated in the lower section of Fig. 113, and spot-welded or otherwise attached to the metal walls and separators forming a structural frame bracing similar to that of Figs. 105, 106, etc. The hollow wall formed by the enclosing metal sheets, in which the plastic tubing and any reinforcing additions for same (along with their complete plastic coatings) repose, is closed throughout, including the ends, except for the usual plastic tubes' injection and outlet connections which are made tight to the sheathing wall, and similar valve controlled air venting connections to the interior wall chamber corresponding to 98—101 of Fig. 77, and serving a similar purpose. The inner surfaces of the metal walls 149 and 150 and likewise the other metal members, are preferably coated with the plastic or other suitable adhesive for bonding throughout with the plastic tubing and veneer or other reinforcing members which may be included therewith; or where more convenient, these enclosed elements may be provided with enough of the plastic or adhesive, alone, for the complete bonding. When the metal shell is completed about the enclosed plastic tubing, etc., the interior pressure treatment within the plastic tubes 1 is turned on through the intake, as 130 in Fig. 104, and the tubes pressed in place within the metal exterior walls forming the hardened cellular backing for the metal walls throughout. For lighter forming pressures no forms are required, as the metal shell members 149 and 150 serve in that dual capacity. Where higher pressures require some support for the inner sheathing 149, I support this with fluid pressure within the hollow core chamber 153 formed by the metal sheathing which is made fluid-tight and connected up with fluid intake 123 for this purpose. The outer metal sheathing 150 being in tension, can still resist strong pressure from within without additional form resistance but where the interior pressure in the plastic tubes is raised above that point of resistance, I enclose the outer sheathing also by fluid resistance under pressure, so that both the inside and outside of the tubular shell is surrounded with the necessary fluid pressure after the manner of Fig. 77, the similar treatment of which has already been described. Alternately, in lieu of fluid pressure introduced directly against the inner sheathing 149 which for such purpose must be set up with fluid-tight joints, my bag pressure system indicated in Fig. 111 may be employed, the bag (or bags) 148 being placed inside the chamber 153 and filled with the fluid pressure to support the wall 149 as indicated by dotted line 148 in the lower left-hand section of Fig. 113. In this section is also shown an alternate positioning of the plastic tubes 1 within the metal shell, the tubing extending lengthwise as indicated, instead of being transversely coiled as already shown and described. A still further modification of the structure is shown in the upper left hand section of Fig. 113, wherein the outer metal walls 149 and 150 are of corrugated or specially shaped form, the plastic tubes 1 lying between the shaped walls, as noted, and in this instance extending lengthwise, parallel with the corrugations and in plastic combination with same, making a very strong compressive shell for certain uses. Similarly the corrugations of these metal walls 149 and 150 may extend transversely instead of lengthwise and to fit a transverse coiling of the tubing as already outlined. Other variations of the structure and combination of same, and the forming along with other features of my invention, may be made to meet varied requirements. It should also be noted that in the pressure treatment the interior chamber between the walls 149 and 150, in which the plastic tubes 1 lie, can have the air evacuated to produce a vacuum through the air vents similar to 98—101 of Fig. 77 as already noted, the metal sheathing walls having been made fluid-tight to permit of this, or instead, these vents may be left open and the air within the chamber so automatically vented when the plastic tubes are fully inflated by their interior fluid pressure. In this latter case, the metal wall joints do not need to be fluid-tight unless exterior fluid pressure is also used as alternately described, in which case the metal walls are correspondingly made fluid-tight.

In Figs. 114 and 115 are indicated a modified variation of my assemblage and plastic pressure treating in my mass production trench forms as applied to the forming of large fuselages or similar bodies. In this instance, the terrain (51a) reinforced concrete pressure chamber is augmented by the filler form 154, of concrete or other suitable material to form the mold for the lower half of the fuselage, for which it is properly shaped throughout its length. The core mold for the fuselage is provided by a strong substantial rubberized or fluid-tight collapsible bag form 155 fabricated after the manner of a heavy barrage or blimp bag and particularly of the inflationable type of rubber boats now common for war purposes. By the same construction as the latter, this is made to reproduce the inner form of the fuselage when inflated under pressure, and is set up and so inflated prior to the laying of my plastic tube coiling which is then coiled on same similarly to Fig. 104, etc. To facilitate this in this case, however, I mount the bag form 155 on an upright frame 156 at both ends which rises above the trench form at each end to receive and support the inflated bag form 155 which is provided with abutting ends, as noted, which have a projecting axis 157a at both ends which are housed and rotate in bearings 157 in the supports 156. This bearing is designed to slide up and down on the supports 156 which serve as a track which continues down into the trench form on the closure walls 121 at either end, on which the supports 156 are mounted in proper alignment. By this means the inflated bag form 155 and its plastic tube wrappings can be raised or lowered from or into the trench form at will. To facilitate this handling, I preferably use for inflating the bag form, a lighter-than-air gas such as helium or the like, and after the core bag form is so inflated in position above the trench form, as shown in the upper portion of Fig. 115, I proceed to apply my plastic tubing on same. In this case, this is applied in coiled formation which is greatly facilitated, due to the fact that the core form is made to revolve on its axes 157 as the reels, carrying the palstic tubing on a movable carriage, travel along longitudinally of the fuselage so as to properly feed the tubing on to the revolving core form 155. Any desired number of tiers of coiling can be so applied and either in the conventional coiling of Figs. 91 and 104 or in special form as that of Figs. 105 and 107. When the coiling is completed, the plastic tube vents through the axes 157, at either end, so as to provide the intake 130 and outlet 130a connections for the subsequent pressure inflation and any desired circulation of the interior pressure fluid, as previously described. Before this latter is done, however, the associated reinforcements and plastic material, including any covering sheathing which may augment the plastic tubing, is properly secured in place and the covered core form is then lowered on the vertical end tracks into the trench form in proper registering and aligned position in the receiving form 154. In such position it is shown in Fig. 114 and the lower portion of Fig. 115. In this instance, it is shown with a single tier conventionally transverse coiled shell of plastic tubing 1 with inner and outer sheathings 5 which can be of any of the varied forms, or omitted, as preferred. I now add, when conditions so require, another novel feature in the way of a light auxiliary shaping form 158 which may simply be light metal or wire reinforced cement plaster or other sheet form 158 which conform to the contour of the exterior of the fuselage, or where greater strength for handling and resistance is required, this is augmented by the necessary light reinforcing ribs 158a at properly spaced apart intervals. Where these auxiliary sheet forms are used, they are now laid in place over the upper half of the plastic tube covered core and supplementing the lower form half 154, with which they connect and anchor, as indicated (158b). When the covered fuselage core is finally arranged in place in the form with or without the auxiliary form 158 as required, the closure lids 52 are set and anchored in place closing the chamber ready for the pressure treatment which will polymerize the wall covering of the fuselage core and integrate the entire cellular structure. In addition to the interior pressure introduced into the plastic tube system through intake 130 and circulated by means of outlet 130a, heated or otherwise as is necessary, and all as already described, I also introduce the necessary pressure into the upper void portion of the trench chamber to sustain the form 158 against the outward pressure of the plastic tubes 1. For this I use any of my modified means, as may be preferred, but in this case I provide a novel diaphragm arrangement, each closure lid 52 having attached thereto, and preferably in a receiving recess 52a, a diaphragm 134 of suitable fluid-tight flexible fabric or material which will readily conform under pressure to the surfaces with which it is brought in contact and which has sufficient area so as to more than fill the void space in the chamber above and about the fuselage covering or form 158, upon which it is brought to bear, the several diaphragms each filling their portion of the form chamber and with their extended ends meeting and abutting each other as indicated in Fig. 115 and, as they are pressure filled from the valve controlled injection lines 136, which in reverse are later used to draw the air or pressure fluid from within the diaphragm and draw them up into their respective recesses 52a where they are then out of the way when the closure lids 52 are removed by overhead crane or other power and the pressure hardened fuselage or other body lifted from the form and pressure chamber. In expanding under interior pressure, the diaphragm 134 forces the air out of the form chamber through the valve controlled lines 137, connecting with the properly mesh protected longitudinal venting channels 138, the lines being left open for such purpose. In contrast, as before described, the chamber may also be first or simultaneously vacuumed by these same lines, in which case, however, the chamber should be air-tight which is accomplished by the tight anchoring of the closure lids 52, throughout, in conjunction with sealing cushion pads or packing 59 which is provided, as noted, for the bearings of the lids on the trench walls 41 and on each other (59a), etc. When this latter is done, so as to provide a fluid-tight chamber, it is also possible, as an alternate procedure, to omit the diaphragms 134 by making the auxiliary form 158 fluid-tight in its connections throughout and along its bearings on the sealing cushions 59b in conjunction with anchor clamps 53a. Under this alternate arrangement, fluid under pressure can be injected direct from lines 137 to fill the chamber void, bearing directly on the auxiliary form 158 to properly hold same against the pressure of the covered plastic tubes. In any and all of these arrangements it is understood that the interior fluid pressure in the interior inflated form 155 is being simultaneously maintained with the other pressures which bear down on same. In this connection it may be necessary to increase this pressure in the interior bag form 155 and if required introduce other or additional fluid in place of or in addition to the lighter gas first installed therein, all of which is provided for through the injection and outlet lines 123 controlling same. The fuselage is thus finally formed and integrated under the action of three fluid pressures reacting on each other, i. e., the pressure in the supporting core bag 155, the plastic tubes 1 and the outer diaphragms 134 or chamber. These pressures can all be the same or can be slightly differentiated when it is found desirable to favor one or more for special form reactions. Similarly when heat action is required with the fluid pressure for the plastic curing, this can be supplied interiorly as usual through the plastic tubes alone, but, if wanted, can also be applied exteriorly by heating the fluids in the bag core and/or the exterior diaphragms or chamber. After the fuselage or equivalent body is so plastically formed or bonded it is raised from the opened trench chamber on its vertical end supports, removed therefrom and the core form bag 155 deflated and, in collapsed condition, removed from the end opening 127a of the fuselage provided for that purpose in forming same.

In Fig. 116 is shown a modification of the fuselage or tubular body and pressure arrangement of Figs. 114 and 115. In this case the diaphragm 134 is dispensed with and its purpose served instead by the pressure bag 159 connected to the pressure inflation lines 136. In combination with this upper pressure bag, the form filler 154 of Figs. 114 and 115 may still be employed (as also the auxiliary form or sheathing 158 or 158a), but in Fig. 116 I also substitute for the rigid bearing form 154 another pressure bag 160 for the lower portion of the mold, this being similarly served by pressure injection lines 136. The interior mold element is provided by the core form bag 155 the same as in the previous two figures. In this instance, however, it is fabricated with formed slots 161 (indicated in dotted lines), when it is desired that the plastically formed or bonded shell should be provided with projecting beams, ribs or other members, after the manner of Figs. 68, 69 and 70, or 97 and 98, or 117 and 118. The fuselage shell is also reinforced in Fig. 116 with the longitudinal plates 140 and 141 with separator struts 142 and cross bracing 143 and 144, etc., of Figs. 105 and 106, through which the plastic tubing 1 is transversely coiled, as before. Supporting blocks, 162, are laid at spaced apart intervals in the bottom of the trench form over which the lower pressure bag 160 is laid. On this is rested the shell assembled fuselage preparatory to the pressure integrating treatment as in the other cases. The framework formed by the plates 140 and 141, etc., comes to bear on the support blocks 162 beneath the fluid-tight flexible fabric of the pressure bag 160, now deflated through the lines 136. This done, the upper deflated pressure bag 159 is laid on top of the fuselage and connected to the pressure lines 136 ready for inflation. The fuselage shell preferably has the sheathing 5, or equivalent, covering the plastic tubing 1 on which the pressure bags 159 and 160 come to bear as they are pressure inflated through the lines 136 and the plastic tubing 1 is likewise pressure inflated as heretofore. Prior to this, the closure lids 52 have of course been locked in place and the air of the chamber so formed either evacuated by vacuum pumps through the vent lines 137 with channels 138. The pressure bags 159 and 160 meet and press against each other, as noted, in their expanded position as well as completely embracing and pressing the exterior of the assembled fuselage. Also, where the trench forms are of great length, the bags are made of suitable length for best handling and laid end to end so as to abut each other when inflated. Correspondingly when the width of the chamber demands, a plurality of bags are also used transversely in place of the single bag, as later indicated in Figs. 130 and 131. The rest of the plastic pressure hardening procedure remains as already described.

In Figs. 117, 118, and 119 are details relating to the use of frame members 140, 141, etc., with the plastic tubing as in Fig. 116, also previous Figs. 105, 106, etc. In Fig. 117 the plastic tube is laid in the beam slot 161 of the core form 155 so as to come directly against the plate 140 which is coated with plastic or suitable adhesive which will properly join the same in the plastic pressure treatment. The struts 142 may have either solid webs or open or truss webs after the manner of Fig. 42. The upper left-hand portion of the Fig. 117 shows sheathing 5 overlaid on the plastic tubing and frame plates and pressed by the pressure bag 159 (or diaphragm 134 as in Fig. 114). The corresponding upper right-hand portion of the Fig. 117 indicates the use of auxiliary form 158 or form sheet 158a and the pressure bag 159 (or diaphragm 134) as in Fig. 114. Both the transverse section of Fig. 117 and the longitudinal section of Fig. 118 show how the plastic tubes 1, laid between the struts 142 connected to the plate 140 and covered by the plate 141 which is then connected to the struts, conform, when pressure inflated, to the contours of these embraced frame members and inserts which is one of the important features made possible by my novel invention. The same applies to the plastic tube laid in the lubricated slot form 161 and likewise conforming to same under pressure and attaching itself in structural unity to the plate 140. In Fig. 119 is also shown how metal connections as angle iron 163 can be projected or subsequently attached to the frame plates as 140 for later connections, as bulkhead 115. This can be done by leaving bolt holes in the plate and adding the angle iron or the like after the plastic treated shell has been formed and removed from the molding members; or instead, the mold form as 155 can be suitably slotted as shown to receive the angle iron 163 which is in such cases then attached to the plate 140 prior to the pressure integration of the assembled shell.

In Figs. 120, 121, and 122 are indicated further modified means of forming fuselage, car and boat bodies and the like. In this case the body has its cellular plastic tube shell formed in sections as noted, which are later assembled and joined to form the completed structure. Figs. 121 and 122 show such a fuselage formed of four pre-formed longitudinal sections, constituting, respectively, the upper and lower sections 164 and 165 and the two side sections, 166 and 167. The form and arrangement of these may be greatly varied in practice and design and the longitudinal sections may also be formed in separate shorter and later joined lengths, as well, when so preferred. In Fig. 120 is indicated the molding of the upper section 164 using a single tier of plastic tube coiling instead of the two tier tube structure of Fig. 121. Any number of tiers can obviously be employed as heretofore set forth. The coiling shown here and in Fig. 122 is of my mat variety, after the manner of Fig. 78, but in this instance is carried into three dimension, so to speak, so as to form a bowl-like structure rather than a flat mat. Such a coiling and structure by itself is suitable for boat hulls, in properly designed form as well as other various concave structures. The plastic tube 1 coiling in this Fig. 120 is done on the form filler 154 which is set up in the trench form, as shown, to form a hard pressure sustaining core shaped to the intended lines of the body section to be plastically formed. The shell can have an optional inner sheathing 164a underlying the plastic tubing and, similarly, an outer sheathing 164b overlaid on same (not shown in Figs. 121 and 122 but indicated in Fig. 120). The pressure on the exterior of the shell assemblage in this instance is procured through the medium of the flexible fluid-tight diaphragm members 134 on either side of the trench chamber and preferably recessed as noted and as in Fig. 103. These, when inflated, occupy the lower portion of the chamber void while the upper portion may be filled and pressed by either my diaphragm arrangement of Fig. 114 or my pressure bag of Fig. 116 or variations thereof. In place of either of these, however, I show in Fig. 120 an alternate form which is adaptable to this and my other set-ups, as well, and which can be used when found preferable in this and similar cases. Instead of a diaphragm attached to the chamber walls or lid, as before, I provide a large sheet 168 of the flexible fluid-tight material of sufficient size to fill, when pressure actuated, the upper void of the chamber form as indicated. Its edges extend outward over the trench walls 41 with anchoring holes which slip over the anchor bolts 53 and when the closure lids 52 are locked in place on same, the sheet 168 is gripped between the cushion bearing pads 59 so as to form a fluid-tight joint around the entire perimeter of the pressure sheet. When the set-up is completed, fluid pressure is then introduced through the valve controlled lines 136 to inflate the diaphragms 134 and the anchored sheet 168, which is so pressed away from the closure lids 52, and so that all these pressure membranes meet, as indicated, and embrace the plastic shell 164 under pressure, while all membranes are of a size to cover readily the bearing surfaces of their allotted spaces so as not to be ruptured by over-expansion by the fluid pressure which can be raised to any desired point (as can be the temperature) and resists the simultaneous plastic integrating interior fluid pressure in the plastic tubes (injected as usual through intake and outlet 129 and 129a) which are so resisted from without. The vacuuming or venting of the air in the pressure chamber, etc., in conjunction with this, can be handled as desired, as already described, in conjunction with lines 137 and their protected vent troughs 138, and likewise any differentiating of the various pressures involved, can be resorted to as already outlined.

For the later assembling of the formed body sections, I preferably tongue and groove the opposite registering edges formed by the plastic tubes which so conform in the pressing to filler strips 55a after the manner of Figs. 39, 40 and 41, and these shell edges are likewise provided with connection bolts 109 and plates 108 which are inserted in the forms in company with the plastic tubing and any other reinforcing members of the plasticized assemblage, as already described, and embraced and integrated therewith in the later pressure treatment. Subsequently, in assembling the units or sections, the tongue and grooved edges are coated with suitable adhesive or plastic, and the sections drawn tightly together by the bolts 109, or equivalent connections, and the entire body so united as indicated in Figs. 121 and 122. In this way, the upper and lower sections 164 and 165 can be directly united in a two section body or, as shown in Fig. 122, the intermediate side sections 166 and 167 can be interposed to form a four section body. These side sections may be either regular plastic tube panel sections or they may be, as shown in Figs. 121 and 122, in truss formation formed after the manner of Fig. 49, etc. This gives a strong light body cross section and also provides openings for windows, etc., when wanted. For the latter purpose the truss form can also be of the style of Figs. 123 and 124, the truss sections being formed with the plastic tube cords 73 and 74, and the web trussing tube 75, and in single, or as shown in this case, plural tiers or thicknesses and with any other of my various strengthening members added at will. Where a rectangular rather than egg-shaped or curved body is desired, in contrast to that of Fig. 122, the plastic tube coiling is done to a correspondingly shaped form 164 but to conform to the rectangular ends indicated by the dotted lines 164c noted in Fig. 122.

Fig. 125 illustrates in principle the manner of my handling of the plastic tube placing, for mass production, in my long curbed or trench chamber forms. Along side of these (as subsequently noted in Fig. 131), I not only provide tracks 41b for the movement of traveling cranes for handling my closure lids and the plastic formed plastic structures and materials forming same, etc., but also (41b) for traveling mounts or cars 41d carrying the reels 41c on which the plastic tubing is wound ready to be unreeled into or on to the forms for receiving same. By grouping the reels 41c in proper size, number and position on the car or cars 41d, the whole plastic tube covering of a structural formation as, in Fig. 125, (similar to Fig. 36), can be laid simultaneously and in one trip along the length of the long mass production trench forms. If lengths of continuous plastic tubes run out, new lengths on additional reels can be coupled on to same, sealed with proper adhesive and holding means. In the case of long coiled structures like the fuselage or body of Fig. 115, etc., the reel mount car has its track travel parallel along the side of the trench form, broadside instead of crosswise, and the plastic tubing travels off the reel onto the fuselage core form as the latter revolves and the reel car moves forward in unison therewith. Trackless car mounts or overhead crane carryways can of course be substituted for the floor tracks and employed in the same way.

Fig. 126 indicates an improved method I alternately provide, in the forming of the plastic bonded structures, if it is desired for any reason to enclose the assembled plastic structure inside of a pressure bag as is the present common method of pressure forming which, however, I have greatly improved on with my varied methods which are not hampered by this limitation. Under the present autoclave procedure, the bag which encloses the plastically prepared unit is connected by an outlet line leading through the autoclave wall to the outside atmosphere so that, when the fluid pressure is applied within the autoclave upon the bag enclosed unit, the air in same can be vented and forced out of same into the outer atmosphere. In lieu of this, the air is sometimes pumped out of the bag and the bag so sealed and not connected to the outer air. A combination of the two procedures has also been used. The objection to the procedure which relies on venting the bag without the further venting connection through the autoclave wall (and patent has been granted for this wall vent on the following ground), is that a perfect vacuum cannot be produced within the bag and that small amounts of trapped air remaining, can still later be vented to the outer atmosphere under the heavier autoclave pressures (which commonly are applied at between 60 and 90 pounds per square inch), if this outer connection is provided. It will be seen, however, that there still remain disadvantages to this latter patented improvement, requiring as it does, not only that the bag assemblage has to be placed in the autoclave in relation to the outward connection which becomes more complicated when several bagged units are placed and must be so connected at one and the same time, all of which is an operative handicap, but further and of still greater importance, the fact remains that the trapped air which may be vented by this means, is working against and resisted by the outer atmospheric pressure, normally 15 pounds to the square inch, so that the effectiveness of this outer possible venting is correspondingly reduced. To avoid these handicaps and obtain greater effectiveness, as well as freedom of action, and reduce the set-up and connecting time within the autoclave, which is important in the rapid operation of same with their limited capacity, my novel procedure will be noted in Fig. 126. Therein, the flexible fluid-tight molding bag 168b surrounds the plastically prepared assembled unit as a plastic tube coiled and/or veneer covered drum 169, the bag being sealed and clamped (170) in the customary way, after placing the plastically prepared assembled unit 169 therein. The bag is then vacuumed by pumping the air out through the valve controlled outlet 171 and the vacuum sealed by closing said valve, the bag 168b being thereby forced by atmospheric pressure to tightly embrace the form of the unit 169 on the surface lines 168a. I now novelly connect the line 171 to a vacuum cylinder 172 by valve controlled connection 172a on same, the air having been removed from the vacuum cylinder. Next the valve connections 171 and 172a are opened connecting the bag 168b with the vacuum cylinder 172. The bagged mount 169 rests on support blocking 173 which in practice, for ready handling and placing in the autoclave, is customarily mounted on a platform car (not shown) for assemblage outside and later quick introduction into the autoclave. I preferably place my vacuum cylinders 172, connected to the bags directly on these car mounts (not shown), so that each is a complete unit in itself and so introduced without loss of time or concern as to positioning in the autoclave when ready. So arranged, the unit is placed in the pressure tank 174, in this instance one of my trench chambers, with the heating line 175 if wanted, and the valve controlled pressure injection line 176 for introducing the fluid pressure in the chamber. This is turned on, introducing the desired plastic curing pressure and temperature, whereupon any trapped air pocketed in the bagged unit is forced by the increased pressure into the vacuum cylinder 172 without the atmospheric resistance otherwise encountered were the bag being vented through the wall of the autoclave as heretofore, and thereby securing the more perfect evacuation from the air pockets. The set-up, so far described, is for any molded veneer and plastic bonded assemblage, without regard to my cellular plastic wall improvements which are still further provided for in this arrangement in connection with the cellular walled coiled drum 169 to be pressure treated. In order to provide for the interior pressure in the plastic tube formed walls of same, I also provide intake and outlet connections 177 and 178 through the walls of the bag 168b with fluid-tight connection to same so that only the interior plastic tubing 1, and not the bag itself, is provided with exterior open connection. With these openings, the plastic tubes 1 will now, when preferred, be interiorly pressure treated by the same fluid pressure entering the chamber from the pressure line 176. When otherwise wanted, however, I connect the plastic tube outlets 177 and 178 with my customary injection and circulating valve controlled lines 130 and 130a (as indicated in dotted lines), as heretofore, for the fluid pressure treatment and control of the plastic tubular system within the bag. In this way it will be understood that this novelly improved bag enclosed autoclave method of mine can be employed for either ordinary plastic bonded veneer laminations or plastic solids and the like, or for my novel cellular structures.

In Figs. 127, 128 and 129 is shown my application of my plastic tube structure to the airplane propeller blades now made either of metal or solid plastic bonded laminated wood. For this purpose I preferably provide a rigid removable mold 179, properly cast or shaped for forming the blade 180. In this mold or form is placed the preferred form of plastic tubing 1, in single or plural arrangement as desired. In order to produce interior rib bracing walls, however, it is preferable that a plural number of tubes, in this case two, be used. These can have a closed end at the outer extremity and are wrapped, encased or jacketed with any desired reinforcements, generally fabric or veneer or a combination of both, with the customary plastic impregnation, coating or other equivalent bonding arrangement. It is preferred in order to secure the superior strength required in propellers that the veneer elements employed be impregnated with plastic by vacuum methods and that in their subsequent pressure treatment in the blade mold the high pressure treatment producing compreg with a strength comparable with steel be used. In Fig. 128 is shown how a central rib is formed lengthwise of the blade by the laying of the two plastic tubes 1 lengthwise in the form. These tubes can have their own individual veneer wrappings as in previous figures, etc., and/or a veneer ply or metal sheathing 5 overlaid on the grouped tubes as in similar previously described structures. In either case, the thickness or number of laminations of the veneer or equivalent sheathing material is preferably increased as same approaches the hub end of the blade, the plastic tubes 1 of which, pass through and are housed in the hub 181, which is preferably of chrome steel alloy or other strong metal which is properly placed in the mold form with suitable bonding adhesive or plastic coating so as to firmly grasp and bond with the plastic tubes anchored within same, as noted, when the interior pressure treatment is applied through the plastic tube intake openings at 129 in the usual manner. The plastic tubes themselves may be of constant diameter throughout or may be designed to enlarge as they proceed from the hub and in their fabrication have any changing diameters best suited to the blade design, this being made possible by my novel construction eliminating the use of mandrels for the forming of the hollow blade. In Fig. 129 is shown how the veneer wall is gradually thickened, as above set forth, as it approaches the hub end from the tip of the blade, the laminations being stepped up as from 180a, 180b, and 180c (and so continued on as desired) and similarly to Fig. 99, the pliable plastic tube walls adapting themselves inwardly by folding contraction to same so as to produce a smooth regular blade exterior with the thickened and corrugated walls within conformed thereto, as previously outlined. For larger blades more plastic tubes (and so with more interior rib walls thereby created), can be used in the blade set-up.

In Figs. 130 and 131 is indicated how one form of plastic tube formed cellular airplane wing may be set up and pressure treated in my pressure trench form chambers. In this case the wings are formed by my mass production method in long continuous lines of longitudinally placed plastic tubes 1 in my trench or curbed floor forms between the concrete curbs 41 which are laid or filled out to the outlines of the wing as noted in Fig. 131 and, subsequent to their pressure forming are cut apart into single or double wing units on the dotted lines 54—54. The wings in plan may have parallel or converging leading and/or trailing edge, or other varied design, and the plastic tubes 1, which extend longitudinally in the trench form may be of constant diameter or, as indicated in Fig. 131, of changing diameter diminishing at the narrower and thinner portions of the wings and increasing in the wider and deeper portions, after the manner described heretofore in connection with Figs. 56 and 57. The plastic tubes are set up after the manner of Fig. 36 with manifold connections, etc. On the sides of the trench form curbs 41 are indicated the tracks 41b for the overhead movement of the reel cars (41d of Fig. 125) which lay the plastic tubing in the trench form as already described. The concrete floor 51 of the trench is filled out with cement, plaster, or other filling 54, when necessary and screeded or formed to the special soffit design of the wings to be formed. The plastic tubes 1 are laid on this in either single or plural tiers or a combination of same and with tubes of the same or of different diameter in relation to each other. In Fig. 130, the tubes are of different diameter and some in single and some double tier or a greater number of tiers. The leading edge and the trailing edge, in this instance, are formed of a single tube. Any preferred aerodynamic form may be followed in the wing design. With the plastic tubes, are incorporated any of the reinforcements, sheathings, inserts, tube jackets, etc., common to my invention as already outlined, and any variation of my pressing method may be resorted to. In Fig. 130 this latter is handled after the manner indicated in Fig. 114 with either one of my plastic coated and subsequently incorporated sheathings 5 (not shown) or/and an overlaid lubricated temporary sheeting 158, or a light ribbed shield form 158a as Fig. 114 laid on and enclosing the upper surface of the wing and forming the bearing for my outer forming pressure which can be applied by flexible diaphragm, the same as in Fig. 114 or instead, as shown in Figs. 130 and 131, with a plurality of flexible fluid-tight bags in this case 182, 182a, and 182b, formed in separate lengths and connected end to end as indicated in Fig. 131. and, when pressure inflated, completely filling the unoccupied voids of the trench form without bringing any rupturing strain on the bag walls which closely embrace the surface, sheet covering, or form shield of the wing top throughout and provide the necessary resistant pressure for the interior fluid pressure applied in the plastic tubes through the medium of the manifolds or intakes and outlets 44 and 45, etc., as described in connection with Fig. 36, etc. The plural pressure bags 182, 182a and 182b have peculiar advantages of their own as it is possible in this way to differentiate the pressures on different sections of the shield form 158 or 158a when used. Thus the side bags 182 and 182b can carry a slightly heavier pressure than the central bag 182a, if wanted, with the result that the arch of the light shield form 158 or 158a is better preserved and any tendency to flatten inwardly avoided, particularly if at the same time the interior pressure in the plastic tubes 1 is also differentiated slightly higher than that of this resistant bag 182a. The pressure differentiations are of course applied to only a very slight degree to accomplish the desired reactions and results along this line. Also, in inflation of the pressure bags in their plural arrangement, it is possible to better facilitate the venting of the air. Thus by inflating the side bags 182 and 182b slightly in advance of the central bag 182a the air is more readily cleared from the chamber through the control vent 137. This does not as fully apply when the chamber is first vacuumed by means of the valve controlled lines 137 from bottom sides and top of the enclosed chamber and as already described, either process being used in this case, as before. It will be observed that at the two points of the wing generally carrying the conventional wing spars, I reinforce my plastic tubes with web inserts 65, after the manner of Fig. 41, or with the modified or open truss form 65a indicated in Figs. 42 and 43, and between these in the major forward spar I carry a greater number of plastic tubes, and correspondingly smaller, so as to increase the wall bracing and actually create a strong cellular box spar within the wing and running the length thereof. The concrete trench form and pressure chamber in Fig. 130 is shown with concrete faced with a sheet steel lining 52b which can be used in building any of my form or pressure chambers in combination with the concrete backing where wanted to strengthen further against high pressures. The steel reinforcing bars 52c are also indicated for the reinforced concrete which in building the various forms and chambers are designed and placed to meet the fluid pressures and stresses to be met. The closure lids 52 which are lifted by means of the rings 52a can have, in addition to the sealing or packing cushions 59, tongue and grooved edge connections (not shown) with the walls 41, etc., or any other pressure sealing as required by the pressure employed.

In Figs. 132 and 133 are indicated further modifications of wing structure. Herein, the wing is formed of longitudinal extending plastic tubes 1 in a single tier of varying depth and width or tube while between adjacent tubes are inserted in the forms, truss reinforcing frames 183 of plastic treated wood in laminated veneer, or my compreg ply, or other suitable arrangement, for bonding with the plastic tubes in the pressure treatment. Similar members of plastic or adhesive coated metal or other materials may similarly be used. These truss reinforcements are of course designed to fit their particular locations. This wing of Fig. 132 (as well as other forms) after being pressure formed can then be wound with a transverse or diagonal coiling of plastic tubing 1, as indicated in dotted line 184, for which it serves as a form core and this outer shell then given the pressure treatment so as to form a bonded cellular sheathing shell about this inner structure. The wing can also be provided in either case, or both, with any of my outer sheathing skins (not here shown) previously shown and described.

In Fig. 134 is shown wings of the type of Figs. 130, 131 and 132 in which the surface truss bracing 57 and 58 (right-hand side of figure) is indicated which is applied to the under and upper surfaces of the plastic tube set-up after the manner of Figs. 36, 48, etc. On the left-hand side of the figure is indicated the sheathing 5 which is added over these reinforcements, or the tubes alone, when wings as of Figs. 130, 132, etc., are to be provided with the overall sheathings already outlined. If the wings are to be mounted on the fuselage separately they are cut in two on the dotted cross line 54—54. Flaps 184, ailerons 185, and wing tips 186, can be added to the wing as noted, attached to inserts placed in the plastic tube assemblage before forming after the manner already outlined. An arrangement of the longitudinal plastic tubes 1 is shown in Fig. 134 wherein the outer trail edge tubes 1a and the central tubes 1b form converging rib walls while the remaining tubes 1 form parallel rib walls so producing a strong bracing against the wing stressing and permitting a few of the plastic tubes 1a and 1b by special design to take up the convergence of the wing plan after the manner of a gusset, while the remaining and greater number of the tubes can be of standardized constant diameter design, thus simplifying the tube fabrication and placing. This principle can be used in various such tube combinations.

In Figs. 135 and 136 is indicated a modified form of plastic tube wing structure wherein the outer shell is formed of plastic tubes running longitudinally of the wing while each such tube is joined with and reinforced by plastic tube bracing forming continuous longitudinal trussing as well as transverse ribs between the opposed outer shells with which this interior framing is plastically united in the regular plastic tube pressure treatment. In this design the leading edge section 187 is separately formed of longitudinally placed plastic tubing (although metal or any other pre-formed section of proper shape can be likewise substituted). This is provided with proper insert connections molded in with the plastic tubing, etc., as heretofore, which, together with plastic gluing in the connected joints, forms a firm union of the leading edge with the body of the wing with which it interlocks as indicated. In this way, the body of the wing, itself, can be conveniently formed by laying the plastic tubing under and over intermediate tapered or collapsible transverse forms which can be withdrawn from the leading edge side of the wing after the plastic tubing, etc., has been integrated with the customary pressure treatment. Similarly, a preformed trailing edge 188 is joined to the metal connection 189 which is bonded in, in the forming of the plastic tubes, the tongue 189a bedding between the longitudinal plastic tubes 189b and 189c which close the wing edge and which are also embraced by the inwardly extending flanges of 189 with which the plastic tubes under pressure form a flush surface by virtue of their interior pressure treatment. The connection 189 also has outward extending flanges as shown which extend into the trail edge section to which they are suitably connected, preferably by welding (w) if the trail edge section is of suitable metal as chrome alloy steel. For the pivoting sections of the edge, as for flaps or ailerons, the connection 189 is formed with suitable edge and projecting pivot brackets (not shown), in lieu of the projecting flanges, for holding same.

In Figs. 137 and 138 are indicated means for simplifying the laying of my coiled plastic tubing for forming coiled wings or other shells. Thus, in Fig. 137, I indicate how two wings, 137a and 137b, the shell of which is formed with transversely coiled tubing 1 can be made at one and the same time by being formed in unison with their trail edges abutting on the line A—B which permits continuous and easy coiling over the large leading edge curves 138e on the outer edges. After the completion of the wings by the pressure treatment, the continuous shell is cut along the trail edge on the line A—B to form the two separate wings. The open tube edges so produced on the trail edges, are then suitably closed up or joined with a formed edge member, joining of which can be easily accomplished by dowels into the tubes, if wanted, after the manner of Fig. 108, or by my embedded insert connections as preferred. In Fig. 138 an alternative expedient is shown where the plastic tube coiling 1 can be directly and most conveniently returned over a thin edge or abrupt turn (as on the thin trail edge of the wing 138a), when undesirable kinking of a tube wall may be met with, by employing, in the forming, a small lubricated dummy core 190, of suitable diameter, about which, the plastic tubing makes its return coil in each instance. After the final pressure forming the shell can then be cut along the line A—B, as in the case of Fig. 137 and the lubricated core 190 removed and used again.

In Fig. 139 is indicated a wing formed with transverse plastic tube winding in two tiers and extending in oppositely diagonal directions (generally at 45 degrees to the wing axis). This produces an exceptionally strong and unique shell for resisting the heavy torsion and shear strains to which a wing is subjected, and may be employed in a monocoque design as in this figure or in any of the other wing structures having interior framing support. For further longitudinal and transverse strengthening, I also preferably combine with the plastic tubing 1, laminations or wing wrappings of my lattice reinforcement 104, etc., as indicated and after the manner of Figs. 73, 91 to 96, etc., or my wire substitute as 116 of Figs. 100 and 101. As already noted, these can be placed on the inner and outer surfaces as well as between the coil tiers and can also be covered and plastically combine with veneer, metal or other sheathings, indicated as 5, and in accord with any of my varied figures.

In Fig. 140 is shown a similar wing coiling with the exception that the under plastic tubing approximates a right angle coiling transverse of the wing axis while the outer shell is formed of tubing extending longitudinally of the wing. In this instance the lattice reinforcement 104 extends diagonally to strengthen against the shear and torsion stresses. A combination of the windings of the two Figs. 139 and 140 can of course be made in still deeper or multi-tiered shells where the windings in all these four directions can be combined in plastically bonded laminations. Other and similar variations can be made at will.

In Figs. 141 and 142 is shown another modified form of wing in which my plastic tubes 1 extend longitudinally of the wing and have closed ends as indicated in detail Fig. 142 with an attached tube opening 191, at both ends, after the manner of a tire inner tube by which means the fluid pressure can be injected or circulated as desired in each tube from end to end. The plastic tubes are housed at each end in a formed metal receiving end 192 and 193 respectively. At the end toward the fuselage, the metal housing 192 has connections as pintles, bolts or the like, 194, which are arranged for connecting the wing section in place to the fuselage or wing stub joining. The tube intakes 191 project through the metal housing and connect up temporarily, for pressure inflation in forming the plastic bonded wing, with the intake or injection valve controlled line 195 while the similar tube openings at the tip and connect similarly through the tip housing 193 with the valve controlled outlet line 196. The housings 192 and 193 are also fabricated with tie rod or stays 197 which anchor in the top and bottom extending plate edges and lie between the walls of the adjacent plastic tubes which, in the interior pressure treatment, form around same a strong conforming embrace, as indicated in Fig. 142. The interior surfaces of the metal housings 192 and 193 are coated with suitable adhesive or plastic for bonding with the plastic tubes, veneers and/or the regular plasticized reinforcements, etc., which I add in the forming as desired.

The extending edges of the housing 192 are serrated 198 so as to strongly reinforce the longitudinal ribs of the wings which the plastic tubes form in sparlike construction and particularly to graduate the stress resistance to avoid abrupt transmission from the metal housing connection. The plastic tubes 1 in this instance are shown with my lattice veneer or band windings or jackets for shear resistance but any of the various coverings and reinforcements may be used as well as the all over sheathings, etc., and the inter-tube rib reinforcements as 65 or 65a previously discussed. The longitudinal plastic tubes are also preferably further reinforced and bonded together by the exterior transverse wing encircling veneer, metal or other plastic bonded bands (as 57 of Figs. 36 and 48). These form flush with the exterior of the plastic tubing, etc., in the interior fluid pressing as do the metal surfaces of the serrated edges of the housings 192 and 193, the edges being rounded or protected against cutting the tubes. The housing can also of course be formed of pre-formed non-metallic materials as plastic bonded compreg, plywood, fibre, etc.

In Fig. 143 is shown still another of my modified wing forms in which the wing is formed with the lattice covering 199 of metal or plastic veneer, compreg, plywood or other strips, covered as desired with a plastically bonded sheathing 5 of any desired type. This lattice structure is set up in the forming chamber with a single fluid-tight inflation bag 200 which is formed, handled and pressure treated the same as my smaller plastic tubes, and designed to fit within the wing interior and with its pliable walls of ample dimension to avoid rupturing strains and so that they press up between the lattice members 199 and form a flush surface against the resisting forms within which the wing is pressed in accordance with any of my modified methods and set-ups. This forms an exceptionally light strong type of monocoque wing particularly suitable for gliders and small light planes. More than one bag can be used interiorly in lieu of the single bag 200 and these become a part of the integrated structural unit and provide a waterproof lining within the wing.

In Figs. 144 and 145 is indicated another modification of my wing structure in which a strong metal spar 201 is introduced in the form of a fluid-tight sheet metal box girder 201 extending the length of the wing. This is provided with bolt or other connections 194, formed on the end for fuselage or wing connection, and with a fluid intake connection 202, and similarly the fluid outlet 203 at the other extremity. To the front and rear of this preformed fluid-tight box spar girder 201 and extending longitudinally therewith, is added collapsible forms 204 and 205, for forming the leading edge and the trailing edge, respectively, for completing the body of the wing. These forms, 204 and 205, I preferably provide in the form of fluid-tight shaped and collapsible bags, after the manner of rubber boats, etc., which are so fabricated as to take, when inflated, the intended shape of the wing section which they occupy. They are provided with intake openings 206 and 207 and, if wanted, similar outlets at the other end. In their inflated shape these form bags are temporarily strapped or otherwise attached to the box girder 201 in their proper positions so as to present when so grouped the form of the intended wing structure. This form so composed is next coiled or overlaid with my plastic tube encasings, 1, in one or more tiers and in any of my modified structural set-ups. For facilitating this part of the procedure, I preferably mount the assembled form as indicated in Fig. 147, in a vertical position on a revolving base 208, when the plastic tubing is to be applied by transverse or diagonal coiling. The base 208 is revolved and the plastic tubing 1 fed off of the reel delivery. This concluded together with the addition of any of the plastically coated reinforcements, sheathings, inserts, etc., which it is desired to include as heretofore, the assembled unit is encased in the outside pressure resistant form or means 201a indicated in dotted line and the customary pressure treatment applied within the plastic tubing together with the maintaining of the proper and desired fluid pressures and temperatures within the form bags 204 and 205 as well as similarly within the fluid-tight light metal box girder 201 which is thus also so sustained against the pressures applied against it. The upper and lower exterior faces of 201 are preferably provided with my metal separators 142 (after the manner of Figs. 118, 119, etc.) spot-welded, riveted or otherwise strongly attached thereto which act both as spacers for receiving the tube coiling turns which pass between them at any desired intervals, as well as thoroughly bonding the girder 201 to the cellular plastic tube shell after same are integrated in the final pressure treatment. In addition the contacting surfaces of the metal girder and separators are previously covered with suitable bonding plastic or adhesive. The collapsible bags 204 and 205, on the other hand, are normally provided with non-adhesive or lubricating coverings which prevent their adherence to the formed wing assemblage and, after the pressure treatment, are deflated through the injection intakes or outlets so that a vacuum is created which causes the bags to be readily removed for their repeated use. Where on the other hand the cost, etc., permits, the bags can be used as my other plastic tubes and designed to become a permanent and structurally auxiliary part of the wing. In such case they are coated or include the necessary plastic bonding coating or equivalent and remain, after pressure treatment, as an integrated part of the wing. It is also possible to use mechanical collapsible forms or mandrels for 204 and 205, particularly as the tapering of the wing shape makes their subsequent removal less difficult.

In Fig. 146 is indicated a modified form of the wing structure in monocoque construction wherein the inner core 210, of the wing, is preformed, preferably of corrugated sheet metal or other metal with the corrugations following the lines of the plastic tubing 1 which is coiled or overlaid on this plastically coated core in any desired number of tiers, etc., as heretofore. The metal core 210 is fluid-tight as before with closed ends and intake and outlets 202 and 203 for filling same with sustaining fluid pressure during the interior pressure treatment within the plastic tubing 1 while the exterior pressure resistance form, or equivalent, for the wing, is provided by any of the varied ways already outlined. The wing surface can also be provided with exterior sheet metal sheathing (5) indicated in dotted line, with or without plastic veneer or plywood bonding and vice versa. Also if metal sheathing is employed, this outer metal wall can be metallically joined to the inner metal core by the metal separators as already illustrated. Also additional tail or trailing edge pieces, etc., can be added when necessary as indicated by dotted lines 209, these being suitably attached by my customary insert means embedded between the plastic tubes. In Figs. 148 and 149 are indicated in detail the shell structure of Fig. 146 in a two tier and also single tier plastic tube structure. In Fig. 148 the outer tier is overlaid on the inner tier in the opposite direction, as noted, while in Fig. 149 a single tier is shown with the corrugated core. The core lining in all cases while described as adhesively coated metal, can of course be also preformed of plastic or other materials and combinations of same when preference so dictates.

In Fig. 150 is indicated another modified wing form constructed of preformed sections of plastic tube units subsequently united. Thus the cellular girder spar 211 is formed in the regular way and this fits or countersinks into the two plastic tube wing shells 212 constituting the upper and lower wing portions, respectively, formed as heretofore indicated. These later dovetail and connect with suitable inserts in front forming the nose or leading edge and are joined at the other end in an encasing preformed trail edge form 213 in company with the customary insert connections and also a dovetailing of the shell sections. The spar 211 is provided with the embedded insert sleeves, 214, through which, in assemblage of the preformed parts, the bolts, or suitable connections stays 215 pass and anchor in the countersunk and flush bearing plates 215a in the wing shells. All the joints of the several sections are covered with plastic or adhesive and, when drawn together by the bolt or other connections, become both plastically and mechanically secured together.

In Figs. 151, 152, 153 and 154 are indicated still another modified form of allied wing structure. In this case preformed transverse wing tanks 216, are first fabricated and of shapes fitted to their intended position in the wing. These may be of fluid-tight metal and when laid out on spaced apart centers are jointed on top and bottom by longitudinal stringers 217 on the spacing desired which are welded (S—W) or otherwise strongly connected to the tanks so as to create a strong structural framework in itself. Over this is laid the plastic tubing 1 forming the cellular skin and in any desired number of tiers, etc., as heretofore, along with the plastic or adhesive bonding coatings, the tubes conforming themselves to and embracing the stringers 217 which are preferably of I beam section and correspond to the separators and spacers previously described. The tanks 216 are connected also to the preformed metal leading edge 218 which also forms not only a strong structural element but also a fluid-tight tank which has intake 202 and outlet 203 as well as connecting inlets 219 into the transverse tanks which also are preferably provided with outlet connections 220 at their other ends if it is desired to provide air-vents by this means or connections for circulating fluid pressure particularly at a temperature when the plastic tubes 1 are inflated with their interior pressure treatment for forming the hardened plastically bonded wing. The tanks 216 resist this tube pressure upon them and retain their shape by having fluid pressure injected in them to provide for this. Between the tanks, and extending crosswise of the wing to form additional rib members are the cross plastic tubes 1, indicated in detail, Fig. 153, with further plastically bonded reinforcing plates 65 of veneer, plywood, my compreg ply, or other material which bond to the tubes 1 and the sides of the tanks 216 which are welded to the I beam stringers 217 along their contacting surfaces S—W, prior to the placing of the plastic tubes between the latter, to form the stressed skin shell structure. As shown in Fig. 154 this plastic tube cross rib can also be made up with a plurality of plastic tubes and of strong beams cross section, as indicated, while, in this figure, the transverse tanks are also formed of plastic tube walled preformed fluid-tight drum forms 216a, as indicated, and these tanks are similarly fluid-inflated to sustain same when the pressure is introduced in the tubular shell and rib pressure treatment, as heretofore. To facilitate the assemblage of plastic tubing and any accompanying reinforcements, etc., as before, I preferably stand the assembled wing framework of Fig. 151 consisting of the tanks, stringers, leading edge and trailing edge (213, which is also preferably of metal), all rigidly connected (and preferably by welding), on its edge as indicated in Fig. 152, so that the leading edge 218 forms the supporting base for same and rests and fits in the base form 51. With this sustaining framework thus in vertical position the plastic tubing is laid on and held in sustained position by the stringers 217 as the determined spaced apart intervals. After this is completed, along with any additional desired sheathings, reinforcements, inserts, and connections, together with the necessary plastic or adhesive coatings of the surfaces, the wing assemblage is outwardly encased with the exterior mold forming elements (218a indicated by dotted lines) in accordance with any of my varied means and the entire structure plastically integrated by my interior pressure treatment. The wing structure so completed it will be seen, has a complete inter-connecting interior tank storage system (216—218) for fuel or other fluid materials which is advantageously divided into a number of separate chambers which serve a dual purpose in the construction described. It will be understood that these and the other various wings have suitable end connections included and integrated therewith in their forming for connecting with the fuselage and these may be similar to those of Figs. 141, 144 and 145 if desired or at any other suitable form best adapted to the particular set-up.

In Fig. 155 is indicated a modified forming of fuselage or other tubular or cylindrical bodies which is closely related to that of Fig. 113. In this case the fluid-tight corrugated inner metal or steel lining, 149, is welded or otherwise joined to longitudinal metal or steel stringers 221, and on this supporting core form is wound, in the usual way, my plastic tubes 1 in the desired number of tiers and coil form. With this, is added any desired sheathings, etc., as usual. Between the plastic tubes and bearing over the beam supports 221 are included the usual metal struts or separators and spacers 142 preferably welded to the steel lining 149 and on these struts are then welded or attached the longitudinal plates 141 (as heretofore). About this complete plastically prepared assemblage is drawn a strong tensile resisting sheet form 222 the edges of which are firmly locked together by suitable clamping 223 so as to resist the interior pressure introduced within the plastic tubes 1 which in turn is supported by the fluid pressure introduced within the metal core lining 149 by intakes 123, etc., as before. The jacket 222 can be of heavy corded rubber construction, strong enough to resist the expanded pressure from within, or of strong sheet steel construction. In being drawn around the body shell it is held and supported by the plates 141 and supporting struts 142; these and the stringers 221 being located at any and as many desired points on the shell as preferred (in this instance four and on the major axis planes). When the plastic tubes 1 are then given the fullest pressure the jacket rounds out to its proper form. The jacket itself is provided on its inner surface with anti-adhesive means of lubrication so that after the shell body is pressure integrated, the jacket is unlocked at 223 and removed for reuse, leaving the fuselage or body with its permanently steel or metal lined and framed core joined to the cellular plastic bonded and formed shell. This method and structure is of course equally adaptable to other structural forms and other than metal material may also be used for the core lining and framework if preferred.

In Fig. 156 is indicated a method of joining separately formed cellular walled drum sections having corrugated steel or metal linings where fuselage or other bodies or tubular structures are formed by my method in separate lengths for convenience, and then united thereafter to produce the entire structure. The drum sections to be joined as shown are of the type of Fig. 155 with the exception that the lower portion of the figure indicates those in which the structural frame stringers 221 have been omitted, while the upper section includes same. The completed drum sections A and B, with their cellular plastic tube formed shells, are placed end to end with the steel corrugated ends of their linings 149 projecting and overlapping each other as indicated, these being constructed to so register and being left uncovered by the plastic tube wall in the original plastic forming. In this registered position they are welded together at S—W as noted or otherwise rigidly connected. The frame members 221, when included, are similarly joined preferably with the addition of fish or splice plates 221a welded or otherwise joined. The open uncovered slot between the drum ends so connected by the metal lining is then filled in by a winding of plastic tubing as shown, in dotted lines together with any desired reinforcements and sheathing, etc., if used (not shown), and this is held in place and shaped by the enclosed jacket form 224 which encircles the drum splice end while the interior pressure treatment is then passed into the enclosed plastic tubing in the splice joint, the surfaces, etc., of which, are all properly associated with the plastic or adhesive to completely integrate the joint and so make a strong sound cellular connection of the abutting drum or fuselage sections.

In Fig. 157 is shown a modified form of my tubular cellular bodies which incorporates the steel or metal lining or wall member 149, preferably corrugated, and in this variation the corrugations extend lengthwise of the tube instead of conforming to transverse tube coiling as before, in the previous figure etc., thus providing exceptional resistance to longitudinal bending moments as in fuselage and car bodies, etc. The corrugations are filled out by a tier of plastic tubing likewise extending longitudinally while over this is coiled, transversely, a second tier of plastic tubing. With these are combined my diagonal or other lattice strip or wire wrappings, if wanted (as in Figs. 91, 93, 94, 95, 96, 101, etc.), and any sheathings, reinforcements, inserts, etc., as heretofore. The tubular body is plastically integrated the same as before described.

In Fig. 158 is indicated the application of my construction to varied forms of girders, beams, spars and other structural elements for many fields requiring light strong framing structures. In this case the plastic tubes 1, in any of their varied forms, etc., are laid longitudinally within a basket-like casing 225, the top side being hinged or bent open for this procedure and later closed and tied, 226, as indicated. The wire mesh can be of any design preferably including diagonal shear and torsion resisting wires combined also with longitudinal and transverse wires as needed. At the corners of the box girder construction formed are also preferably included heavier longitudinal wires or rods 226a for massing metal at these most strategic points of stress resistance. An intermediate layer of wire mesh, 227, is also included between the superimposed tiers of plastic tubing. The girder can also have an outer sheathing 5, if desired, of the customary plastic bonded veneers, fabrics, or combination of any desired materials, as heretofore. When assembled in the shaping and restraining form, as in Figs. 39, 62, 64, etc., they are giving my interior plastic tube pressure treatment which forces the tube walls into the wire mesh and produces a smooth flush exterior walled girder of exceptional strength and lightness and which can be produced by my mass production methods, trench forms, etc., in stock sizes, lengths, etc., at a minimum of cost and labor for universal use. The designs can of course be greatly varied within the scope of my invention.

Fig. 159 shows another modified form of metal connection for uniting preformed cellular plastic tube units applicable not only to drum shapes as those of Fig. 156, but to any type of sections and particularly panel shells such as the metal bordered or reinforced sections forming airplane wings, fuselages, etc., as set forth in my aforesaid pending application Serial No. 455,350, filed August 19, 1942. For this purpose the prefabricated panels or sections formed of the pressure integrated plastic tubes 1, are molded with adhesive coated metal border members 228 and when the sections are to be united they are brought together so that the metal faced edges abut as shown in Fig. 159. The metal border sections are formed with projecting flanges 229 shaped to form grooves in relation to the edges 230 which project as noted as extensions to the channel web of the shape so formed. This can be in rolled or drawn metal or in stamped and folded sheet metal approximating the general form for the purposes to be attained. The web of the channel shape may be solid or in open or trussed form as indicated. After abutting the opposing channel edges of the preformed cellular sections they are then united by spot or other welding of the edges 230 together on the top and bottom sides of the channels which is made possible by virtue of the sunken grooves in the flanges 228, thereby permitting proper access for the welding SW. Riveting or bolting can also be substituted for the latter when wanted as the groove recesses 228a also provide for this. After the metallic joining of the sections the flange grooves are then filled with suitable putty or filler, flush with the metal surfaces which are also flush with the plastic surfaces enclosed. The latter may be provided with any of my customary sheathing over the plastic tubes, etc., as before if desired all of which form flush with (or can cover) the metal flange exterior surfaces in the interior integrating pressure treatment in the tubes which are also united with the metal contacting faces coated with suitable plastic or adhesive for that purpose.

In Fig. 160 is shown a modified form of plastic tube box girder, spar or the like, corresponding to Fig. 158. In this form, however, the beam has the plastic tubes 1 boxed within top and bottom tensile and compression plates 231 formed to embrace and strongly interbond with the plastic tubes which become joined to same by the plastic or adhesive coatings integrated under the interior pressure treatment. The plates 231 are preferably of steel or other metal but also can be plastic bonded compreg or other strong substitutes. These are interconnected on the beam sides by strut and truss web braces 231 and 232 (although the wire of Fig. 158 may be similarly employed) which are joined preferably by welding in the case of steel. The joint lines between the superimposed tube tiers, which can be of any desired number, as well as their vertical joints, can also be reinforced with the wire reinforcement or with any other of the plastically bonded inserts common to my construction as already set forth. The integrating of the plastically prepared beam assemblage is completed with my regular pressure treatment in the forms described, and similarly to that of Fig. 158. For combining such structural frame members, as in the case of a wing spar, with a shell or wing skin I make special provisions in the plates 231 on which the shell is laid. Thus, if it is to be a plastic tube shell crossing the spar as in coiled or transverse placing, the plates are provided in fabrication with my usual separators or spacers 142 in channel, I beam or other suitable shapes welded or attached to the plates 231, after the manner of Figs. 117 and 118 and embracing the tubes in similar manner thereto, so as to become strongly united with the cellular shell when same is subsequently given the interior pressure treatment. If, on the other hand, it is desired to attach a plywood sheathing to the formed spar by nailing and gluing, as is frequently done, the slot 234 which is formed in the bearing plates 231 receives and firmly holds the nails 235 after the manner of Fig. 162, while also providing a strong stiffener for the plate and a secure bonding tongue projecting between the plastic tube walls embracing same.

In Figs. 161 and 162 are shown modifications of this holding slot, the modified form 234a being wedge shaped to receive and hold expansion bolts 235a or the like or formed for nailing 235b when such attachment is preferred. It will be understood that when the sheathing 5 is nailed or anchored in these slots, the contacting surfaces of the plates 231 are also coated with plastic bonding or suitable adhesive material P to further unite with the applied sheathing when this is drawn tight to same by these anchoring means.

In Figs. 163 and 164 are shown modified forms of preformed plastic tube spars or box girders with wire reinforcements and provisions for subsequently joining same to plastic tube skin shells in a secure union. In Fig. 163 the box girder, formed of the plastic tubes 1 in the customary way, has the wire reinforcements 236 of welded or interwoven wire preformed in two large channel shapes embedded in the plastic tube assemblage as indicated and with the flange portions extending outward and exposed at the top and bottom. After these girders are preformed by my pressure treatment, the skin shells for the wings or corresponding structures, are formed by laying the plastic tubing 1, indicated in dotted lines, across these spar girders and uniting same together by the plastic coating and pressure treatment of the shells onto the girders so that the extending wire flange members are impressed onto and embedded by the plastic tubes forming the shell, thus making a strong connection with the girder element. The treatment in Fig. 164 is similar, only here the subsequently added shell has the plastic tubing 1 (indicated again by dotted lines) laid longitudinally in relation to the box girder preformed of the plastic tubes 1, etc., and the wire reinforcements 236a, embedded in the girder, have their flanged sections exposed and raised above the surfaces of the girder so that the plastic tubes of the later laid shell pass under and between these and the tube wall of the girder. Thus, when these plastic tube shells are then given the integrating interior pressure treatment, they embed about and form a flush surface with the exposed wire flange arms creating both a strong union and a highly efficient girder shape with the shells, as stressed skin compression and tension members, intimately joined therewith.

In Fig. 165 is indicated how the plastic tube shell and panel structures can be advantageously reinforced by combining same with expanded metal lath 237, and particularly with the type which has the extending metal ribs 237a in common usage. By interlaying my plastic tubes 1 between these ribs 237a and pressing them together in my regular treatment, a very strong shell is secured with the plastic tube walls embedding the expanded wire mesh 237b which is joined with same by the plastic bonding or adhesive material with which it is preferably coated as well. To avoid any cutting of the inner walls of the plastic tubes by the wire lath edges, the tubes are preferably properly armored by plasticized veneer or other covering 237c, similar to any of the types already described, or by an all-over sheathing (not shown) interposed between the lath and the tubes and conformed and plastically integrated to both under the pressure treatment. As indicated in dotted line a covering tier of plastic tubes 1 and/or any of my customary sheathings can be overlaid on this before the pressure treatment. This basic formation can be used in any of my plastic tube structures whenever desired.

Fig. 166 shows an improved form of my plastic tube trusses similar to those of Figs. 49 and 52, etc., designed of my plastic tubes 1 with the cord and web members laid up in the form as indicated and tied together after the manner of Fig. 49. Also, there is included the embedded sleeper nailing or gluing strips 238 which the plastic tubes form about and plastically embrace. This forms an anchorage basis for attaching a later shell as of a wing shell on a spar (by nailing and plastic bonding or the like).

Fig. 167 shows how my plastic tube construction with its facility for inserting and embracing of insert members between the tubes in the assemblage and pressure forming is particularly adapted for forming novel light-weight ladders and structural scaffolding which because of their unusual lightness and strength offer revolutionary opportunities in a field where weight, as in aircraft, is such a great handicap and of vital consideration. In the ladder form of Fig. 167 (which can also be used as a structural truss member, particularly by disposing the cross members 240 diagonally and on the proper stress resistance lines), the rounds 240 are inserted between the two plastic tubes 1 on either side in assembling same in the enclosing form prior to the interior pressure treatment in the plastic tubes which integrates the assemblage in my usual way. In the ladder form the cross members 240 which serve as rounds can be solid or of any construction but are preferably preformed tubes of any kind and for lightness and strength are preferably formed in my plastic tube construction in long lengths and then cut up into the short sections, the ends of which are inserted between the plastic tubes on either side which are to form the side pieces or cords for the ladder framework. The face casings 239, after the manner of 234 of Fig. 160, are likewise laid in proper position in the forms in relation to the plastic tubes 1 and the structure then plastically and pressure integrated by means of the interior pressure treatment in the tubes. The face casings 239 can be of any material or merely veneers or plywood or my compreg laid in the forms with the proper plastic coatings but for maximum strength I preferably form same of heat treated chrome steel alloy which also presents hard smooth wearing surfaces which are free from corrosion. The end connections for extension ladders (not shown) are also provided in the usual way and these designed to insert properly in the forms in position to secure the proper embrace between, or in the ends of, the plastic tubes so as, in company with proper adhesive coverings, to become structurally and securely united with same.

In Fig. 168 is shown a modified form of my plastic tube beam or cord form similar to that of Figs. 160 and 167 in which the tension and compression casing members 241 have inturned flanges 241a which not only provide a stronger enlarged stress resistance member but also embrace the plastic tubes 1 within them with which they become plastically united in the interior tube pressure treatment. This arrangement can be similarly employed in larger box girders, etc., including a larger number of plastic tubes, etc., and as in Figs. 158 and 160.

Fig. 169 presents a similar cased plastic tube beam structure, the design of which is particularly adapted to receive plastic tube shell panels separately formed and as indicated in dotted lines, and having tube formed tongue edges which fit into the curving web of the supporting beam as indicated and which can be joined thereto with bonding plastic or adhesive in the joints together with any metal connection inserts after the manner already set forth. The casings 242 for the plastic tube 1 in this instance are in channel shape forming strong stress resisting flange members of the beam. The design and material of this can be varied as can the number of plastic tubes embodied in the beam but for maximum strength, etc., the heat-treated chrome steel alloy is preferred as before.

In Fig. 170 is indicated how my plastic tube structures with any desired jacketing or reinforcing, as already outlined, may be successfully employed in the multiple assemblage with inserts between to form one of the most exacting forms of structural frames where only a minimum of weight is permitted to withstand the most violent and abrupt stresses, namely a tennis racket frame, which is a much more difficult problem in the strength-weight ratio consideration than the aircraft structure. In this instance the plastic tubes are laid with any desired reinforcements, inserts, etc., in a prepared mold the shape of the racket and tapered insert pins, (not shown), properly protected against plastic adhesion, inserted between the opposed plastic tubes 1, to form the stringing holes 243 after the plastic tube assemblage is given the necessary interior integrating pressure treatment and removed from the forms and the pins removed from the stringing holes 243. The plastic tube wall 2 while not limited as to the nature of the material used is preferably of strong tensile fabric (flax or linen being such a one) and this is preferably incased or wrapped or otherwise combined with layers of veneer and plastic. One arrangement, and after the manner of Fig. 5, is indicated by the dotted lines of 9, in which case the spiral wrapping of the under plastic tube 1 is wound in the opposite direction from the upper, or each tube can be wound in the two opposite diagonal directions (as 8 and 9 of Fig. 5 or 4). These are only a few of the exterior casing arrangements and these can be varied at will as to both materials as well as to distribution in the form. They all should have a heavy layer of plastic exteriorly as well as the interior bonding coatings, for the best wearing and minimum of air friction as well as appearance, etc., and this, of course, applies to all my aircraft and various other structures, herein, where any of these considerations are involved.

Fig. 171 indicates the application of my plastic tube structures to tubes and tubular forms of a novel nature and having a wide range of structural use. In this way, tubes of very light gauge metal or other walls can be given the strength of much heavier gauges besides acquiring other new and valuable properties, including reduction of vibration, metal fatigue, corrosion, conductivity, attack by hostile fluids, bending resistance, etc. In this instance for an ultra strong structural tube, the outer wall 244 is formed preferably of heat treated chrome steel alloy of light or desired gauge, and of either the seamed or seamless type, within the plastically coated interior of which is inserted one, or preferably as shown, a plurality of my plastic tubes 1 of the desired construction, and wrapping, reinforcement, etc., and of any desired number, in this case, four, themselves incased within a tube 245 of plastically coated or associated materials such as veneer, fabric, etc., singly or in any desired laminations or groupings. Between the adjacent walls of the plastic tubes may also be included, if wanted, any of my customary reinforcing web members, etc., already described and not shown in this particular figure. The tube 245 may, when preferred, be of course omitted, the walls of the plastic tubes and their jackets being relied on to produce all the necessary wall material. After the plastic tubes 1, etc., are assembled in the tube 244, their ends are connected up and closed in the usual way with the intake and outlet manifolds or nozzle connections, as heretofore, and my interior pressure treatment applied to complete and integrate the structure which can be formed in any length and then cut to shorter ones as desired. Under most conditions the outer tube wall 244 is adequate to serve as the outer pressure resisting form but in cases where such is not the case this can be further temporarily incased by a reinforcing form. Alternately, if the interior tube structure, without the wall 244, is all that is desired, the tube 244, instead, is made in the shape of a containing form, being halved and locked along the dotted lines 246 so that same, with proper interior protection against adhesion, can be removed after the forming of the multi-crosswalled tube. My tubes, as above formed, can be of any desired shape or changing and varying diameter and, for such purposes as aircraft struts and the like, are in conventional tear drop streamlined cross section and somewhat the same for racket frames which in this way can be provided with a plurality of interior cross walls in contrast to the one of Fig. 170. The structure of Fig 170 has no limitations and can be applied to large structural bodies in addition to small tubing, etc.

It will be understood that where metal or other inserts are combined in my various cellular structures with my plastic tubes that precaution is taken to see that any contacting edges are properly rounded or otherwise protected with suitable coatings at such points as may be required to prevent their cutting the tubular membranes, when brought together under pressure, or that the tube wrappings or sheathing elements are such as to provide this protection.

It should also be noted that where openings for windows, doors, or other purposes are desired in any of my cellular shell structures and particularly fuselages, as Figs. 91 and 115, where same are not provided for in the original molding, as in Fig. 122, that my construction is such that these can be readily cut out after the molding is completed and the necessary framing members, etc., set in and secured in place. This is the more readily accomplished because the open tubular ends of the severed tubes offer particularly strong anchorages for connections such as dowel inserts and engaging pintles, etc., as already brought out. If in this connection, it is desired in such case still to retain the tubular circuit in the severed portion of the shell, this, also, can be done by providing tubular frames for setting and sealing in the cut openings made to interconnect with the severed tubes so as to maintain such sealed circuit within the plastic tubular system. These, furthermore, can even be set up with the tubing and in proper position and sealed connection, before the pressure hardening treatment, and simultaneously secured therewith.

Furthermore, while I make extensive and novel use of exterior flexible form-adapting membranes in the molding of my cellular structures, my forming methods are in noway confined to same and, instead, mechanical press forms with or without mechanical pressure may be relied on. Still further, my construction permits of a very novel use of these as it is possible to set or lock such mechanical forms in place with opposing platens correctly spaced apart and apply the forming and polymerizing pressure by fluid injection within the plastic tubes within the form, instead of applying same mechanically upon the exterior platens in the customary way. This, also, greatly simplifies the heating problem, as the heated fluid can be circulated through the tubes or its temperature otherwise maintained so as to maintain the molding at the proper temperature, and particularly, interiorly, in these deep cellular structures either with or without heating the platens as heretofore has had to be done. Also, in all procedures, my novel fluid injection or fluid circulation within my plastic tubes can also be novelly employed to warm and soften, to make more pliable, wrappings of veneer, etc., while same are being, or after same are placed in molding position so as to more readily adapt same to forms, reinforcements, etc. At the same time, the fluid pressure may be fluctuated alternately to better ease and locate the plastic tubes, etc., into assembled coordinated position, the tubes and materials for the most part being in loose assemblage, before applying the final hardening pressure; and, again, the fluid pressure may be started at a low pressure and gradually increased to the high pressure for the final set. A differential of pressure may also be set up between opposing membranes and fluctuated back and forth in securing desired positioning, elimination of air pockets, etc., all of which, it is believed, is novel to the art.

As has been brought out, it should also be noted that while I novelly integrate, in most cases, my fluid-impervious membranes, as in my tubes or in some forming bags or diaphragms with the other material, so as to serve as a permanent structural part and reinforcing of the molded structure, these, in cases where so wanted and planned, can be removed after the integrating pressure treatment is completed and the membranes deflated, the latter in such case being provided with the proper protective antiadhesive coverings or coatings for such procedure.

It will be understood that I do not desire to limit my invention to any particular use or to any specific materials or combinations thereof or to cellular structures alone and that I am aware that the details of construction and method of procedure may be considerably varied without departing from the principles and spirit of my invention and I reserve the right to make all such variations as fairly fall within the scope of the following claims.

I claim as my invention:

1. The method of forming a hardened cellular structural unit including assembling pliable-walled tubular elements, in association with adhesive, in juxtaposition within confining and shaping elements, applying fluid pressure within the tubular elements, changing the shape of the tubular elements, conforming same to each other and to the confining and shaping elements and integrating and indurating the tubular elements.

2. The method of forming a cellular walled hollow strtucture including coiling flexible tubing in association with adhesive about a hollow core form, integrating this assemblage to form a cellular shell by applying interior fluid pressure at the proper temperature and for a sufficient period of time throughout the coiled tubing, this pressure being resisted outwardly by an exteriorly applied flexible membrane supported by the necessary fluid pressure and inwardly by the hollow supporting core form supplemented by any necessary interior fluid pressure which is provided therein.

3. The method of forming a hollow plastically united structural body including forming a fluid-tight hollow sheet metal core, covering same with flexible tubing, in association with adhesive, applying integrating fluid pressure at the proper temperature throughout the interior of said tubing while resisting said pressure outwardly, with an incasing envelope covering said assembled material and properly spaced away from the interior sheet metal core and inwardly by supporting the fluid-tight sheet metal core with the necessary interior fluid pressure injected therein, subsequently withdrawing the several fluid pressures after the integration and hardening of the hollow metal lined structural body so formed and removing the exterior pressure resisting envelope.

4. The method of making reinforced cellular structures including positioning a plurality of lengths of tubular members, having pliable walls, in juxaposition and with not less than one reinforcing member interposed between same and in association with adhesive, reshaping and conforming the pliable adjacent walls of the tubular members to each other and to the interposed reinforcing by means including fluid pressure within the tubular members and integrating the several members in such position to form a hardened structural unit.

5. The method of forming a molded unit having at least one hollow portion formed in conjunction with a hollow membranous element under pressure including developing pressure within said membranous element while holding same in contracted shape, so that its hollow interior has a cubical content less than when expanded to its largest shape without stretching its membranous walls, and permanently incorporating said membranous element in such shape in said molded unit.

6. The method of forming an integral molded unit of multi-cellular form including combining a plurality of lengths of pliable hollow membranous elements adhesively integrated under pressure while protected against rupture by expansible folds and permanently incorporating same in said molded unit with at least portions of said membranous elements retaining folds not completely expanded.

7. The method of forming a molded hollow multi-cellular shell, as for a fuselage including winding a pliable tubular membranous element in position with winding turns adjacent for forming a multi-cellular wall about an inflated membranous core form in conjunction with revolving the inflated core, and thereafter reshaping and integrating by means of an adhesive substance said adjacent turns of said tubular element to form a multi-cellular wall while applying fluid pressure therein and fluid resisting pressure within said inflated core.

8. The method of forming an integral molded multi-cellular structure including forming hollow or tubular elements having self-sustaining but flexible walls, combining same in a confining form, compacting and incompletely reshaping same together by applying exterior pressure, and finally and completely reshaping and more intimately compacting same in relation to each other and adhesively integrating same in such relation through the medium of fluid pressure applied throughout the interior of said tubular elements and resisted on all sides by said confining form.

9. The method of forming an integral molded multi-cellular structure including combining a plurality of lengths of pliable hollow-formed material having expansible folds and adhesively integrating same under pressure including interior fluid pressure developed within said hollow-formed material protected against rupture by said expansible folds, and with at least a portion of some of said folds not fully expanded.

10. The method of making cellular structures including positioning a plurality of lengths of tubular members, having pliable walls, in juxtaposition and in association with adhesive, reshaping and conforming the pliable walls of the tubular members to each other by means including fluid pressure within the tubular members and integrating the several members in such position to form a hardened structural unit.

ROY H. ROBINSON.

REFERENCES CITED

The following references are of record in the file of this patent:

UNITED STATES PATENTS

| Number | Name | Date |
|---|---|---|
| 280,745 | Hyatt | July 3, 1885 |
| 490,556 | Gerhard | Jan. 24, 1893 |
| 1,335,105 | Frederick | Mar. 30, 1920 |
| 1,475,623 | Egerton | Nov. 27, 1923 |
| 1,552,808 | Sulzer | Sept. 8, 1925 |
| 1,595,811 | Anderson | Aug. 10, 1926 |
| 2,029,048 | Atwood | Jan. 28, 1936 |
| 2,100,492 | Sindler | Nov. 30, 1937 |
| 2,202,042 | Blount | May 28, 1940 |
| 2,261,264 | Lutz | Nov. 4, 1941 |
| 2,276,004 | Vidal | Mar. 10, 1942 |
| 2,296,781 | Farny | Sept. 22, 1942 |
| 2,312,332 | Gramelspacher | Mar. 2, 1943 |
| 2,348,291 | Goldman | May 9, 1944 |
| 2,369,006 | Banks | Feb. 6, 1945 |

FOREIGN PATENTS

| Number | Country | Date |
|---|---|---|
| 637,029 | Germany | Oct. 21, 1936 |